US010013891B2

(12) United States Patent
Otwell

(10) Patent No.: US 10,013,891 B2
(45) Date of Patent: Jul. 3, 2018

(54) LEARNING SYSTEM AND METHOD THAT DISPLAYS ACTIVITY STREAMS BASED ON STUDENT CONTACTS

(71) Applicant: Laureate Education, Inc., Baltimore, MD (US)

(72) Inventor: Kenny Hugh Otwell, Columbia, MD (US)

(73) Assignee: Laureate Education, Inc., Baltimore, MD (US)

(*) Notice: Subject to any disclaimer, the term of this patent is extended or adjusted under 35 U.S.C. 154(b) by 170 days.

(21) Appl. No.: 13/956,167

(22) Filed: Jul. 31, 2013

(65) Prior Publication Data
US 2014/0038156 A1    Feb. 6, 2014

Related U.S. Application Data

(60) Provisional application No. 61/677,990, filed on Jul. 31, 2012.

(51) Int. Cl.
*G09B 5/00* (2006.01)
*G09B 5/02* (2006.01)
(Continued)

(52) U.S. Cl.
CPC .............. *G09B 5/02* (2013.01); *G06Q 10/06* (2013.01); *G09B 5/00* (2013.01); *G09B 5/08* (2013.01); *G09B 5/125* (2013.01); *H04L 29/06* (2013.01)

(58) Field of Classification Search
CPC ... G09B 7/00; G09B 5/02; G09B 5/14; G09B 7/02; G09B 5/00; G09B 5/10; G09B 5/05;
(Continued)

(56) References Cited

U.S. PATENT DOCUMENTS 6,086,381 A     7/2000   Downs et al.
6,974,328 B2   12/2005   Aspe et al.
(Continued)

OTHER PUBLICATIONS

Bernau et al., User's Guide for Oracle WebCenter Portal: Spaces, Nov. 2011.*

(Continued)

*Primary Examiner* — Eddy Saint-Vil
(74) *Attorney, Agent, or Firm* — Venable LLP; Jeffri A. Kaminski

(57) ABSTRACT

A learning management system and method delivers an instructional material to a student workstation after authenticating an student's entry into a learning session that is associated with a plurality of contacts. Stored electronic addresses in a database include a first electronic address that is associated with a first contact and a second electronic address that is associated with a second contact. The first contact is associated with the learning session and the second contact is not associated with the learning session. A first activity stream associated with the first contact and a second activity stream associated with the second contact is selectively displayed to the student such that upon detection of student's entry into the learning session, the first activity stream is displayed without displaying the second activity stream and the second activity stream is displayed upon detection of student's exit from the learning session either with displaying the first activity stream or without displaying the first activity stream.

23 Claims, 34 Drawing Sheets

(51) Int. Cl.
*G09B 5/08* (2006.01)
*H04L 29/06* (2006.01)
*G06Q 10/06* (2012.01)
*G09B 5/12* (2006.01)

(58) Field of Classification Search
CPC .......... G09B 5/08; G09B 5/125; G06Q 50/01; G06Q 10/06; H04L 29/06
USPC ........................................................ 434/350
See application file for complete search history.

(56) References Cited

U.S. PATENT DOCUMENTS

| | | | |
|---|---|---|---|
| 7,496,628 | B2 | 2/2009 | Arnold et al. |
| 8,064,817 | B1 | 11/2011 | Ziv-El |
| 2002/0194179 | A1* | 12/2002 | Siefert .................... G06F 17/22 |
| 2003/0041121 | A1 | 2/2003 | Levine |
| 2004/0191745 | A1* | 9/2004 | Takano .................... G09B 7/02 434/322 |
| 2006/0115803 | A1 | 6/2006 | Kalisiak |
| 2007/0136475 | A1 | 6/2007 | Leppisaari et al. |
| 2007/0213790 | A1* | 9/2007 | Nolan ................. A61N 1/37247 607/59 |
| 2008/0057480 | A1 | 3/2008 | Packard et al. |
| 2008/0227077 | A1 | 9/2008 | Thrall et al. |
| 2009/0291426 | A1 | 11/2009 | Polivka |
| 2009/0311658 | A1 | 12/2009 | Polivka |
| 2011/0171622 | A1 | 7/2011 | Lippert et al. |
| 2012/0082974 | A1 | 4/2012 | Shustorovich et al. |
| 2012/0089635 | A1 | 4/2012 | Elchik |
| 2012/0237908 | A1 | 9/2012 | Fitzgerald et al. |
| 2012/0288846 | A1 | 11/2012 | Hull |
| 2012/0315616 | A1* | 12/2012 | Fourman ....................... 434/350 |

OTHER PUBLICATIONS

International Search Report and Written Opinion in PCT International Application No. PCT/US14/48535, dated Jan. 23, 2015.
Office Action in U.S. Appl. No. 13/956,238, dated Feb. 26, 2015.
Office Action in U.S. Appl. No. 13/956,249, dated Apr. 2, 2015.

* cited by examiner

LEARNING SYSTEM AND METHOD THAT DISPLAYS ACTIVITY STREAMS BASED ON STUDENT CONTACTS

CROSS REFERENCE TO RELATED APPLICATIONS

This application claims priority to U.S. Provisional Patent Application Ser. No. 61/677,990, entitled "SYSTEM AND METHOD FOR INTERFACING WITH STUDENTS OVER A NETWORK", filed Jul. 31, 2012, the contents of which are hereby incorporated herein by reference in their entirety.

FIELD

The present invention is generally directed to learning systems and methods, and in particular, the present invention relates to displaying activity streams in such learning systems and methods.

BACKGROUND

With developments in the education industry, students seek access to course-related information and their own course work, anywhere, anytime. Students want current, relevant, interesting and engaging course materials and assignments taught by teachers, instructors, counselors and advisors who are aware of student's educational and professional path and goals based on a clear map of course progress and degree program. Enabling and facilitating students' online activities around their campus is a major consideration in providing the desired student experience.

Online education now demands providing educational services to a diverse global audience from different cultural backgrounds. Education providers face the challenge of providing high quality education across a diverse student population. Educational programs must provide skills that students can apply in their lives and professions to make a real difference in the real world. Educators must strive to create a community of learners connected to one another. A learning management system (LMS), as referred to in the art, is software for delivering, tracking and managing training of students. LMSs range from systems for managing student training records to software for distributing courses over the Internet and offering features for online collaboration. In many instances, LMSs are used to automate record-keeping as well as to register students for classroom and online courses. Self-registration, faculty-led learning, learning workflow, the provision of on-line learning (e.g., read and understand), on-line assessment, management of continuous professional education (CPE), collaborative learning (e.g., application sharing, discussion threads), and learning resource management (e.g., instructors, facilities, FIG. 1 depicts a known LMS 10, including one offered by Blackboard, WebCT, Moodle, eCollege and others, which allows a faculty member to place his or her courses, in whole or in part, online. As depicted, the faculty 12 plays a central role for mediating between a student 13, presenting course content 15 and assessing a student 14. LMSs 10 usually provide all-inclusive learning environments for faculty and students, with the faculty 12 disseminating instructional material specific to a course of study amongst students. As such, the faculty member serves as the facilitator, assessor and content developer.

Conceptually, there is no difference between the role of a teacher in conventional LMSs 10 and the role of a teacher in a bricks and mortar classroom. In both cases, the students are grouped and assigned a specific teacher. The teacher introduces all course content and materials into the classroom and mediates and assesses the learning process of the student. Thus, under LMS 10, the web is a tool to replicate, as closely as possible, the traditional classroom environment and the LMS 10 is limited by its system boundaries, just as the physical classroom is limited by four walls and doors.

With advances in content and media delivery technologies, the LMS model has not fully taken advantage of the available features for educating students. For example, such advances allow students to access educational content not only via laptops and desktops, but also smart phones, PDA's, iPods, Netbooks and eBooks. It is, for example, estimated that the majority of prospective student market has a smart phone or PDA, with advances content delivery capabilities via downloadable applications or by content streaming. These new devices have enabled users access to podcasting, wikis, blogs, web cams, eBook readers, MP3 players, social networks and virtual learning environments.

Conventional LMS developers' attempt in incorporating new features into their existing systems in some cases can result in significant developments cost in redesigning their content to incorporate the functionality of these new technologies. In other cases, the developers may have to open up their system platform through application programming interfaces (API's) to "bolt on" new technological capabilities. LMS redesign investment may be expensive, especially when new development work may not be able to keep up with the proliferation of ever advancing technologies and features. Opening up platforms through APIs may present a significant competitive disadvantage to LMS vendors and service providers who have invested heavily in their proprietary instructional material delivery systems.

Additionally, educational services are increasingly offered over global networks of institutions and universities. For example, Laureate Education Inc., the assignee of the present application, currently offers accredited campus-based and online courses in a wide variety of programs, including undergraduate and graduate degree programs and specializations, to nearly a wide range of students in numerous countries. Such a global educational network requires supporting learning environments that are tailored to bring to students a global perspective blended with a local point of view, creating a truly multicultural, career-oriented educational experience for students. For example, the educational experience may be a career-focused or licensing program, a multi-year undergraduate degree program, or master's and/or doctorate degree program in any one of a number of fields including engineering, education, business, health care, hospitality, architecture, and information technology, etc.

The advent of social networking platforms is impacting the way(s) in which learners engage with technology in general. Curriculum uses of social networking services also can include sharing curriculum-related resources. Educators tap into user-generated content to find and discuss curriculum-related content for students. Responding to the popularity of social networking services among many students, teachers are increasingly using social networks to supplement teaching and learning in traditional classroom environments as they can provide new opportunities for enriching existing curriculum through creative, authentic and/or flexible, non-linear learning experiences. Some social networks, such as English, baby! and LiveMocha, are explicitly education-focused and couple instructional content with an educational peer environment. The Web 2.0 technologies built into most social networking services promote conferencing, interaction, creation, research on a global scale, enabling educators to share, remix, and repurpose curriculum resources. In short, social networking services can become research networks as well as learning network.

The use of online social networks by school libraries is also increasingly prevalent, and they are being used to communicate with potential library users, as well as extending the services provided by individual school libraries. Educators and advocates of new digital literacies are confident that social networking encourages the development of transferable, technical, and social skills of value in formal and informal learning. In a formal learning environment, goals or objectives are determined by an outside department or agency. Tweeting, instant messaging, or blogging enhances student involvement. Students who would not normally participate in class are more apt to partake through social network services. Networking allows participants the opportunity for just-in-time learning and higher levels of engagement. The use of social networking allows educators to enhance the prescribed curriculum. When learning experiences are infused into a website that students utilize every day for fun, students realize that learning can and should be a part of everyday life.

Social networking services foster learning through what is described as a "Participatory Culture." A participatory culture consists of a space that allows engagement, sharing, mentoring, and an opportunity for social interaction. Participants of social network services may avail themselves of this opportunity. Informal learning, in the forms of participatory and social learning online, is an excellent tool for teachers to sneak in material and ideas that students will identify with, and therefore, in a secondary manner, students will learn skills that would normally be taught in a formal setting in the more interesting and engaging environment of social learning. Sites like Twitter provide students with the opportunity to converse and collaborate with others in real time. Social networking services provide a virtual "space" for learners.

Social networks focused on supporting relationships between teachers and their students are now used for learning, educator professional development, and content sharing. Ning for teachers, TermWiki, Learn Central, TeachStreet and other sites are being built to foster relationships that include educational blogs, eportfolios, formal and ad hoc communities, as well as communication such as chats, discussion threads, and synchronous forums. These sites also have content sharing and rating features.

Laureate Education Inc.'s U.S. Patent Publication No. 2009-0311658 A1, the entire contents of which are hereby incorporated by reference, discloses "System And Method For Collaborative Development Of Online Courses And Programs Of Study" over a social network. A database stores an initial framework that defines a sequence of learning units for creating a desired learning environment for students. The learning units are identified by corresponding learning unit identifiers. A plurality of workstations coupled to the network are used for entry of reviewer information by the participants using the learning environment created for the students. The reviewer information comprise one or more comments entered by one participant about a learning unit and a rank entered by another participant about the comment, with the rank being correlated with a defined ranking standard. A processor processes the rank according to a predefined criteria to produce a ranking result that is associated with a learning unit identifier. The ranking result is used for associating learning content to the learning unit identified by the learning unit identifier.

Laureate Education Inc.'s U.S. Patent Publication No. US 2009-0291426 A1, the entire contents of which are hereby incorporated by reference, discloses an "Educational System For Presenting One Or More Learning Units To Students In Different Learning Environments", where each unit is associated with an assessment information relating to students. A digital rights and asset management application controls access to the content associated with each one of said one or more units according to corresponding unit identifiers. An assessment application, e.g., a grade book application, stores assessment information derived from presenting the content to said one or more users in the first and second interactive environments, including social networks, with the unit identifier correlating the assessment information with the units.

Social networking sites share a variety of technical features that allow individuals to: construct a public/semi-public profile, articulate a list of other users that they share a connection with, and view their list of connections within the system. The most basic of these are visible profiles with a list of "friends" who are also users of the site. A profile is generated from answers to questions, such as age, location, interests, etc. Some sites allow users to upload pictures, add multimedia content, or modify the look and feel of the profile. Others, e.g., Facebook, allow users to enhance their profile by adding modules or "Applications." Many sites allow users to post blog entries, search for others with similar interests and compile and share lists of contacts. User profiles often have a section dedicated to comments from friends and other users. To protect user privacy, social networks typically have controls that allow users to choose who can view their profile, contact them, add them to their list of contacts, and so on. Some social networks have additional features, such as the ability to create groups that share common interests or affiliations, upload or stream live videos, and hold discussions in forums.

Companies have begun to merge business technologies and solutions, such as cloud computing, with social networking concepts. Instead of connecting individuals based on social interest, companies are developing interactive communities that connect individuals based on shared business needs or experiences. Many provide specialized networking tools and applications that can be accessed via their websites, such as LinkedIn. Others companies, such as Monster.com, have been steadily developing a more "socialized" feel to their career center sites to harness some of the power of social networking sites. These more business related sites have their own nomenclature for the most part but the most common naming conventions are "Vocational Networking Sites" or "Vocational Media Networks", with the former more closely tied to individual networking relationships based on social networking principles.

An activity stream is a list of recent activities performed by an individual, typically on a single website. For example, Facebook's News Feed is an activity stream. When users are logged into Facebook, a News Feed presents constantly updated list of their friends' Facebook activity. The News Feed highlights information that includes profile changes, upcoming events, and birthdays, among other updates. The News Feed also shows conversations taking place between the walls of a user's friends. An integral part of the News Feed interface is the Mini-Feed, a news stream on the user's profile page that shows updates about that user. Unlike in the News Feed, the user can delete events from the Mini-Feed after they appear so that they are no longer visible to profile visitors. News Feed shows top stories and most recent stories in one feed, and the option to highlight stories to make them top stories, as well as to un-highlight stories. The News Feed allow users to view recent stories first.

Since the proliferation of activity streams on websites, there have been calls to standardize the format so that websites could interact with a stream provided by another website. The Activity Streams project, for example, is an effort to develop an activity stream protocol to syndicate activities across social Web applications. Activity Streams is an open format specification for activity stream protocols, which are used to syndicate activities taken in social web applications and services, similar to those in Facebook, Newsfeed, FriendFeed, the Movable Type Action Streams plugin, etc. Several major websites with activity stream implementations have already opened up their activity streams to developers to use, including Facebook and MySpace. Facebook Desktop for Adobe AIR lets users see a running timeline, or stream, of the activities of their friends on a desktop computer or even on a cell phone. Though activity stream arises from social networking, nowadays it has become an essential part of business software. Enterprise social software is used in different types of companies to organize their internal communication and acts as an important addition to traditional corporate intranet. Such major collaboration software like Jive Software, Yammer, or Chatter offer activity stream as a separate product. At the same time other major software providers, such as tibbr, Central Desktop, and Wrike offer activity stream as an integrated part of their collaboration software solution.

With advances in information technologies, there exists a need for an educational system that allows a student to engage in a wide range of activity streams.

SUMMARY

Briefly, according to one aspect of the present invention, a learning management system and method delivers an instructional material to a student workstation after authenticating an student's entry into a learning session that is associated with a plurality of contacts. Stored electronic addresses in a database include a first electronic address that is associated with a first contact and a second electronic address that is associated with a second contact. The first contact is associated with the learning session and the second contact is not associated with the learning session. A first activity stream associated with the first contact and a second activity stream associated with the second contact is selectively displayed to the student such that upon detection of student's entry into the learning session, the first activity stream is displayed without displaying the second activity stream and the second activity stream is displayed upon detection of student's exit from the learning session either with displaying the first activity stream or without displaying the first activity stream.

According to some of the more detailed features of this aspect of the present invention, the first contact is a mandatory contact and the second contact is a student-selected contact such that the student-selected contact comprises a contact designated by the student to be in a set of contacts associated with the student and a mandatory contact comprises a contact that is not designated by the student to be in the set of contacts associated with the student.

According to other more detailed features of this aspect of the present invention, the second activity stream is displayed concurrent with displaying the first activity stream upon student's exit from the learning session. The first activity stream can comprise a first message from the first contact and the second activity stream can comprise a second message from the second contact. At least one of the first activity stream or second activity streams can comprises a message transmitted from the student. The first activity stream can comprise a first status update from the first contact and the second activity stream can comprise a second status update from the second contact. The instructional material can concurrently be displayed with the first activity stream.

According to still other more detailed features of this aspect of the present invention, the first contact is associated with at least one of another student, an instructor, a course performance assessor, a course developer, or a course administrator. At least one of the first or second activity streams can comprise a live stream. A message corresponding to the second activity stream can be transmitted to the student upon detection of student's exit from the learning session.

According to another aspect of the present invention, a learning management system and method delivers a first instructional material to a student when the student enters into a first learning session that is associated with a first course. A second instructional material is delivered to the student when the student enters a second learning session that is associated with a second course. Sored electronic addresses in a data base for a plurality of contacts are associated with the student. The student is associated with a set of student's contacts comprising a first contact associated with the first course and a second contact associated with the second course. A first activity stream associated with the first contact and a second activity stream associated with the second contact are displayed to the student such that upon detection of student's entry into the first learning session, the first activity stream is displayed without displaying the second activity stream, and upon detection of student's entry into the second learning session, the second activity stream is displayed without displaying the first activity stream.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

Embodiments will now be described in connection with the associated drawings, in which:

FIGS. 5-27 depict exemplary interfaces in accordance with one or more embodiments.

DETAILED DESCRIPTION OF THE DRAWINGS

Exemplary embodiments are discussed in detail below. While specific exemplary embodiments are discussed, it should be understood that this is done for illustration purposes only. In describing and illustrating the exemplary embodiments, specific terminology is employed for the sake of clarity. However, the embodiments are not intended to be limited to the specific terminology so selected. A person skilled in the relevant art will recognize that other components and configurations may be used without parting from the spirit and scope of the embodiments. It is to be understood that each specific element includes all technical equivalents that operate in a similar manner to accomplish a similar purpose. The examples and embodiments described herein are non-limiting examples.

Figure 1:
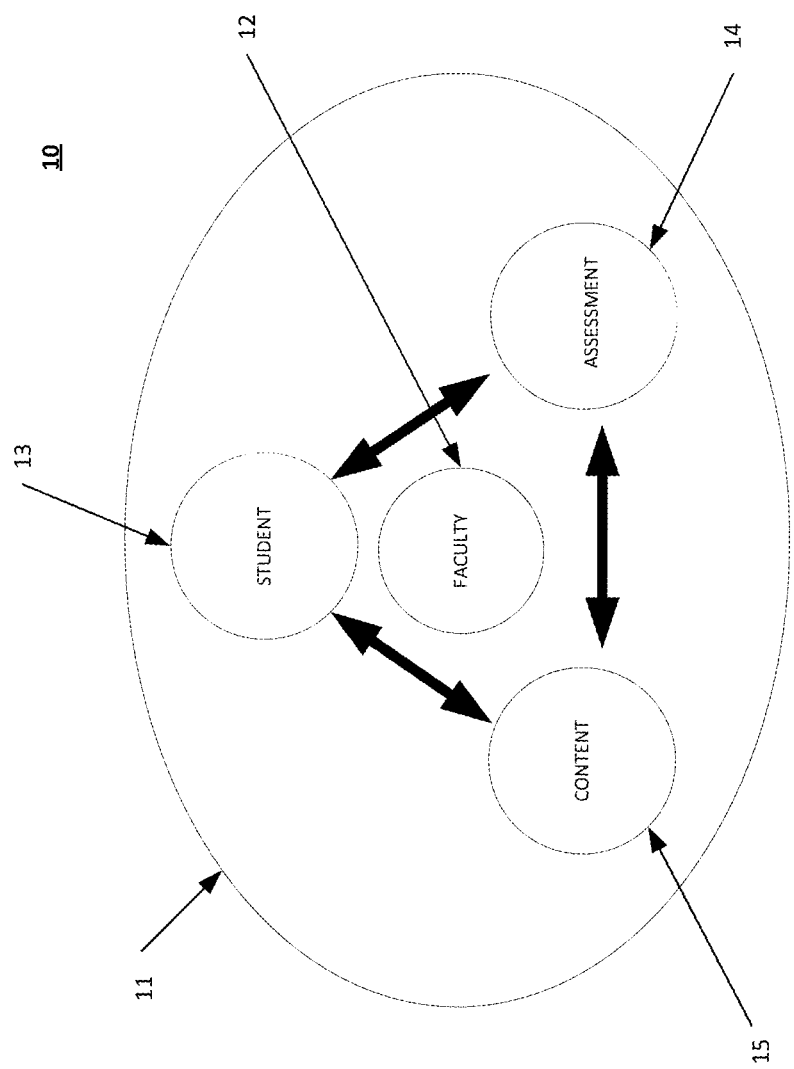
FIG. 1 depicts a known LMS.
Figure 2:
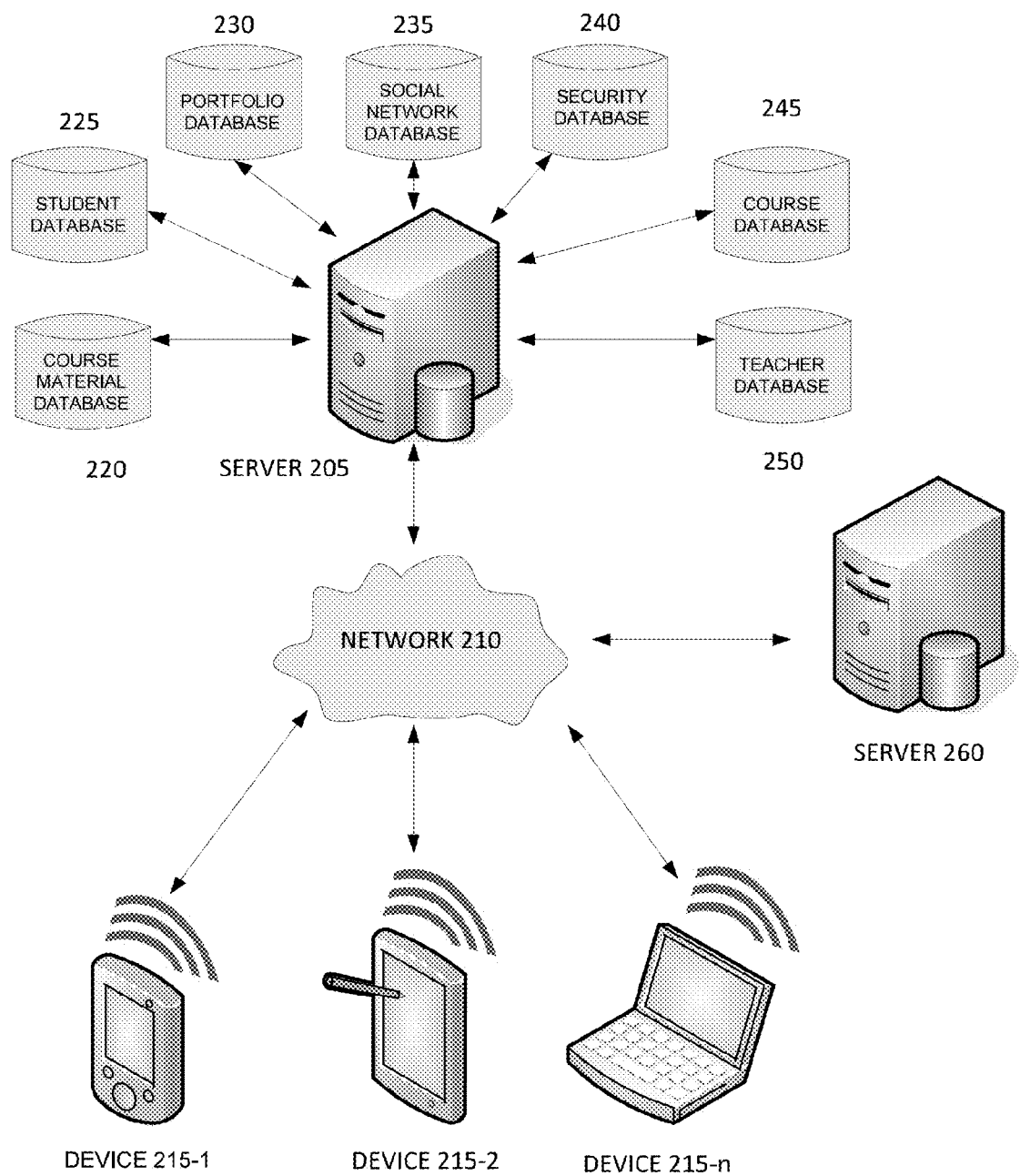
FIG. 2 depicts an exemplary educational system in accordance with one or more embodiments.

FIG. 2 depicts an exemplary educational system 200 in accordance with one or more embodiments. In one embodiment, users of devices 215-1 through 215-n may register within a particular learning system or institution and may connect to a network 210 (e.g. the Internet). Each of devices 215-1 through 215-n may be a computer, workstation, mobile device, a PDA, an iPad, or a laptop computer. A server 205 may be maintained by the school/university or a third party vendor. Education system 200 may also include a server 260. Server 260 may include any combination of features of server 205. Server 260 may also be connected to the other parts of education system 200 through network 210. Server 260 may be located on the same network as server 205 or on a different network as server 205. Server 260 may run or operate other instances the software used to provide the online education system. Server 260 may be run or operated by other institutions, either foreign or domestic. Server 260 may be run or operated by the same institution but in separate locations, either foreign or domestic. Education system 200 may include any number of additional servers, user devices, or network connections.

Server 205 may be connected to or include a number of databases, including a course material database 220, a student database 225, a portfolio database 230, a social network database 235, a security database 240, a course database 245, a teacher database 250, or any combination thereof. The course material database 220 may store any information about course materials. The course material database 220 may store, for each course, weekly schedules, syllabi, assignments, resources, due dates, discussions, reflections, content summaries, content reviews, quizzes, tests, midterms, finals, any other course material information, or any combination thereof.

Student database 225 may store any information about students using the system. Student database 225 may store an inventory of all users that are affiliated with the particular learning program or institution. In one embodiment, such users are associated with network address, e.g., IP addresses, that may be stored in a user's profile. Student database 225 may store information about the students' names, class year, programs of study, locations, addresses, information about the student entered by the students, activities and interests of the students, education of the students, work experiences of the students, pictures of the users, or any combination thereof.

Portfolio database 230 may store information about student portfolios. Student portfolios include information about student progress in the courses. Portfolio database 230 may store information about courses the students have completed, activities the students have completed, examples of work products the students have completed, grades, evaluations, rankings, or any combination thereof.

Social network database 235 may store social networking information about the users of the system. Social networking information may include contacts of the users to which the students are connected, circles of the users, chat connections of the users, chat histories of the users, communities of the users, courses associated with the users, or any combination thereof. As used herein, a circle of a user means a set of other users associated with a user in the system. In one embodiment, a user's circles may be set by the user. As used herein, a community of the user may include any group or association of which the user is a part as identified by the system. Communities are different from contacts and circles because communities cannot be directly modified by users. Communities may be disbanded once a course ends, or past communities may be maintained. Social network database 235 may also store any other information related to the social networking information.

Security database 240 may store security information for the system. Security information may include usernames of the users, passwords of the users, security questions used for verifying the identity of the users, answers to security questions, which parts of the system the users are able to access, or any combination thereof.

Course database 245 may store any information about the courses offered by educational system 200. Course database 245 may store course names, course identifiers, course numbers, course descriptions, course teachers, course teaching assistants, course schedules, course enrollment including students enrolled in the courses, past course offerings, future course offerings, number of users allowed to enroll in a course, course structure, course prerequisites, or any combination thereof.

Teacher database 250 may store any information about the teachers using educational system 200. In one embodiment, teachers are associated with network address, e.g., IP addresses, that may be stored in a teacher's profile. Teacher database 250 may store information about the teachers' names, years teaching, programs involved with, locations, addresses, information about the teacher entered by the users, activities and interests of the teachers, education of the teachers, work experiences of the teachers, pictures of the teachers, or any combination thereof.

Figure 3:
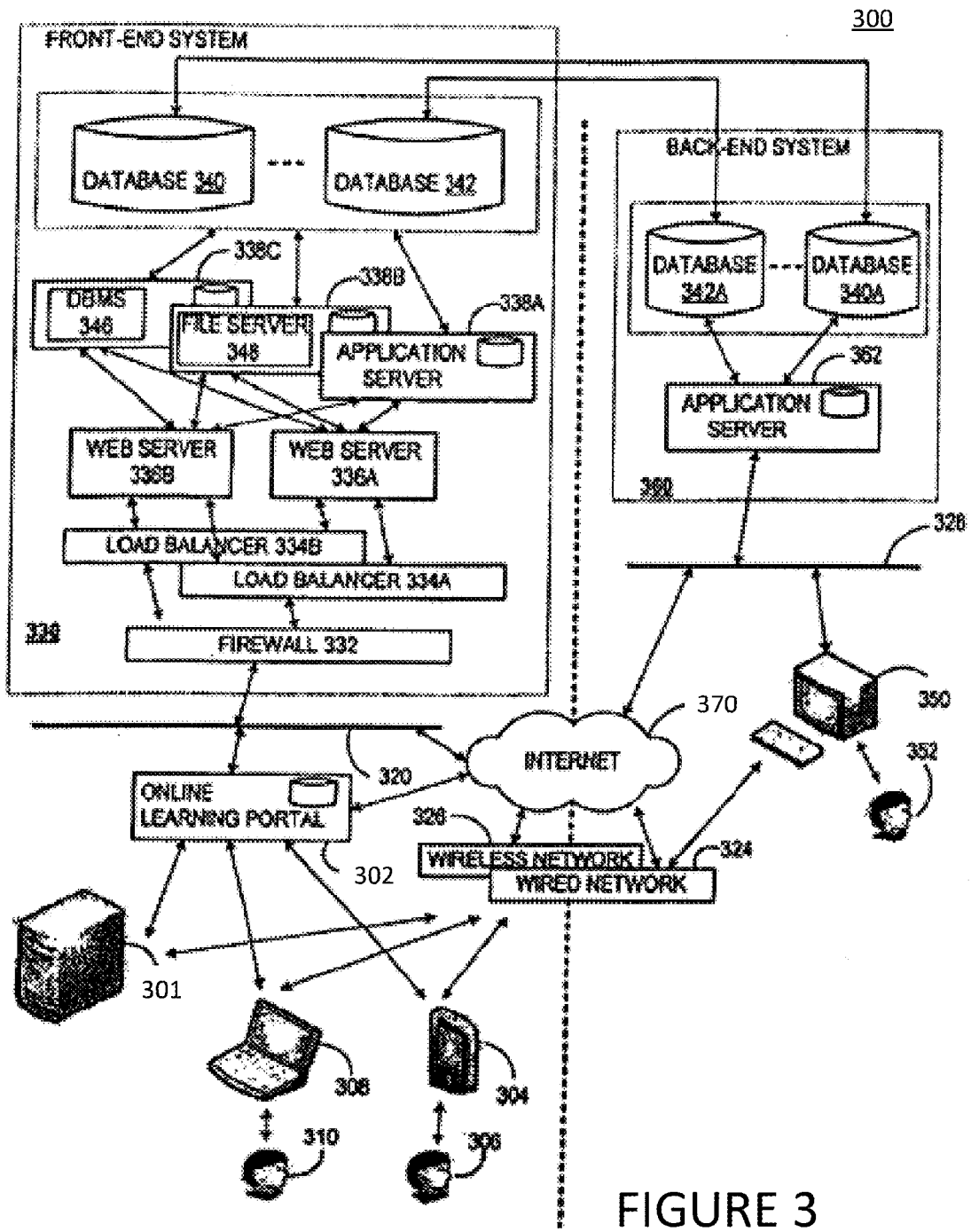
FIG. 3 depicts an exemplary block diagram of a network having a front-end system and a back-end system in accordance with one or more embodiments.

FIG. 3 depicts an exemplary block diagram 300 of a network having a front-end system and a back-end system in accordance with one or more embodiments. The front-end system 330 includes a firewall 332, which is coupled to one or more load balancers 334a, 334b. Load balancers 334a-b are in turn coupled to one or more web servers 336a-b. To provide online learning sessions, the web servers 336a-b are coupled to one or more application servers 338a-c, each of which includes and/or accesses one or more front-end databases 340, 342, which may be central or distributed databases. The application servers serve various modules used for interaction between the different users and the learning system, including instructional enrollment module, course registration module, learning session management module, content delivery module, proximity module, event module, a social networking tool, connection layer module, external portfolio module, internal portfolio module, a presentation module, or any combination thereof. These modules may be run independently of each other based on corresponding teacher, student, geolocation and event profiles, as further described below.

Web servers 336a-b provide various user portals, including student, teacher, and event portals. The user portals may include various web interfaces. The servers 336a-b are coupled to load balancers 334a-b, which perform load balancing functions for providing optimum online session performance by transferring client user requests to one or more of the application servers 338a-c according to a series of semantics and/or rules. The application servers 338a-c may include a database management system (DBMS) 346 and/or a file server 348, which manage access to one or more databases 340, 342. In the exemplary embodiment depicted in FIG. 4, the application servers 338a and/or 338b provide instructional content to the users 306, 310 which include electronic interfaces, progress reports, student profiles, teacher profiles, event profiles, as well as instructional content correlated with a student, teacher, course, school, expressive avatar information or event as processed by the server. Some of the instructional content is generated via code stored either on the application servers 338a and/or 338b, while some other information and content, such as student profiles, instructional material, teacher schedule, or other information, which is presented dynamically to the user, is retrieved along with the necessary data from the databases 340, 342 via application server 338c. The application server 338b may also provide users 306, 306 access to executable files which can be downloaded and installed on user devices 304, 310 for creating an appropriate learning environments and sessions, with branding and or marketing features that are tailored for a particular application, client or customer.

The central or distributed database 340, 342, stores, among other things, the web content and instructional material deliverable to the students. The central or distributed database 340, 342, may store information stored in course material database 220, student database 225, portfolio database 230, social network database 235, security database 240, course database 245, teacher database 250, or any combination thereof. The central or distributed database 340, 342 may also store retrievable information relating to or associated with students, teachers, responsible authorities, parents, learning centers, profiles (student, facilitator, teacher, faculty, course developer, assessor, etc.), billing information, schedules, statistical data, attendance data, enrollment data, teacher attributes, student attributes, historical data, demographic data, compliance data, certification data, billing rules, third party contract rules, educational district requirements, expressive avatar information, etc. Any or all of the foregoing data can be processed and associated as necessary for achieving a desired learning objective or a business objective associated with operating the system of the disclosed embodiments.

Updated program code and data are transferred from the back-end system 360 to the front-end system 330 to synchronize data between databases 340, 342 of the front-end system and databases 340a, 342a of the back-end system. Further, web servers 336a, 336b, which may be coupled to application servers 338a-c, may also be updated periodically via the same process. The back-end system 360 interfaces with a user device 350 such as a workstation, enabling interactive access for a system user 352, who may be, for example, a developer or a system administrator. The workstation 350 may be coupled to the back-end system 360 via a local network 328. Alternatively, the workstation 350 may be coupled to the back-end system 360 via the Internet 370 through the wired network 324 and/or the wireless network 326.

The back-end system 360 includes an application server 362, which may also include a file server or a database management system (DBMS). The application server 362 allows a user 352 to develop or modify application code or update other data, e.g., electronic content and electronic instructional material, in databases 340a, 342a. According to one embodiment, interactive client-side applications on the internet execute on a variety of internet delivery devices such as a web-browser, smart phones, and tablet devices such as the iPad, to provide an improved core student experience.

Figure 4:
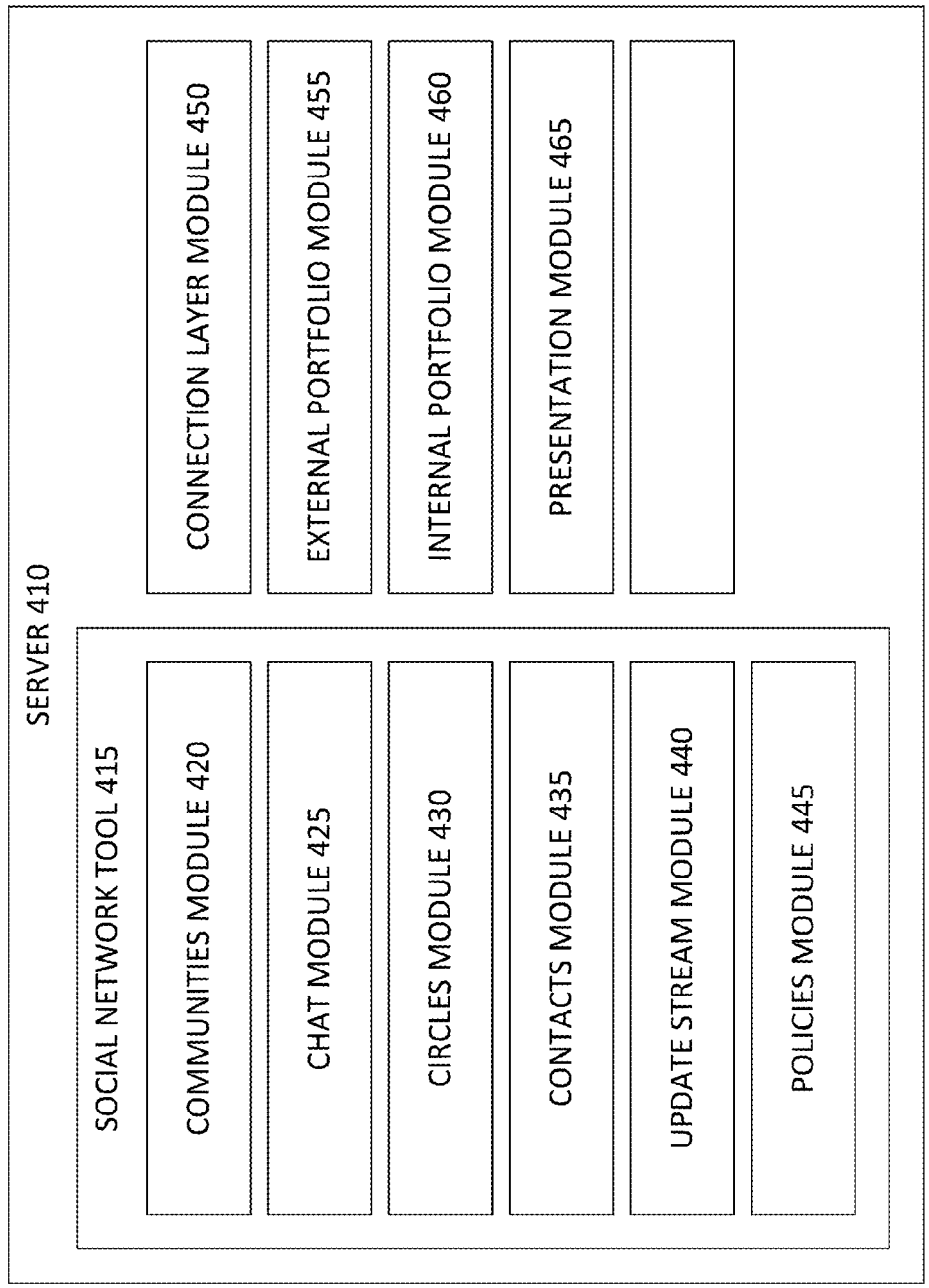
FIG. 4 depicts an exemplary server in accordance with one or more embodiments.

FIG. 4 depicts an exemplary server 410 in accordance with one or more embodiments. Server 410 may include a social network tool 415, a connection layer module 450, an external portfolio module 455, an internal portfolio module 460, a presentation module 465, or any combination thereof. Social network tool 415 may include a communities module 420, a chat module 425, a circles module 430, a contacts module 435, an update stream module 440, a policies module 445, or any combination thereof. The modules may provide the functionalities as further described below.

Login Management

Figure 5:
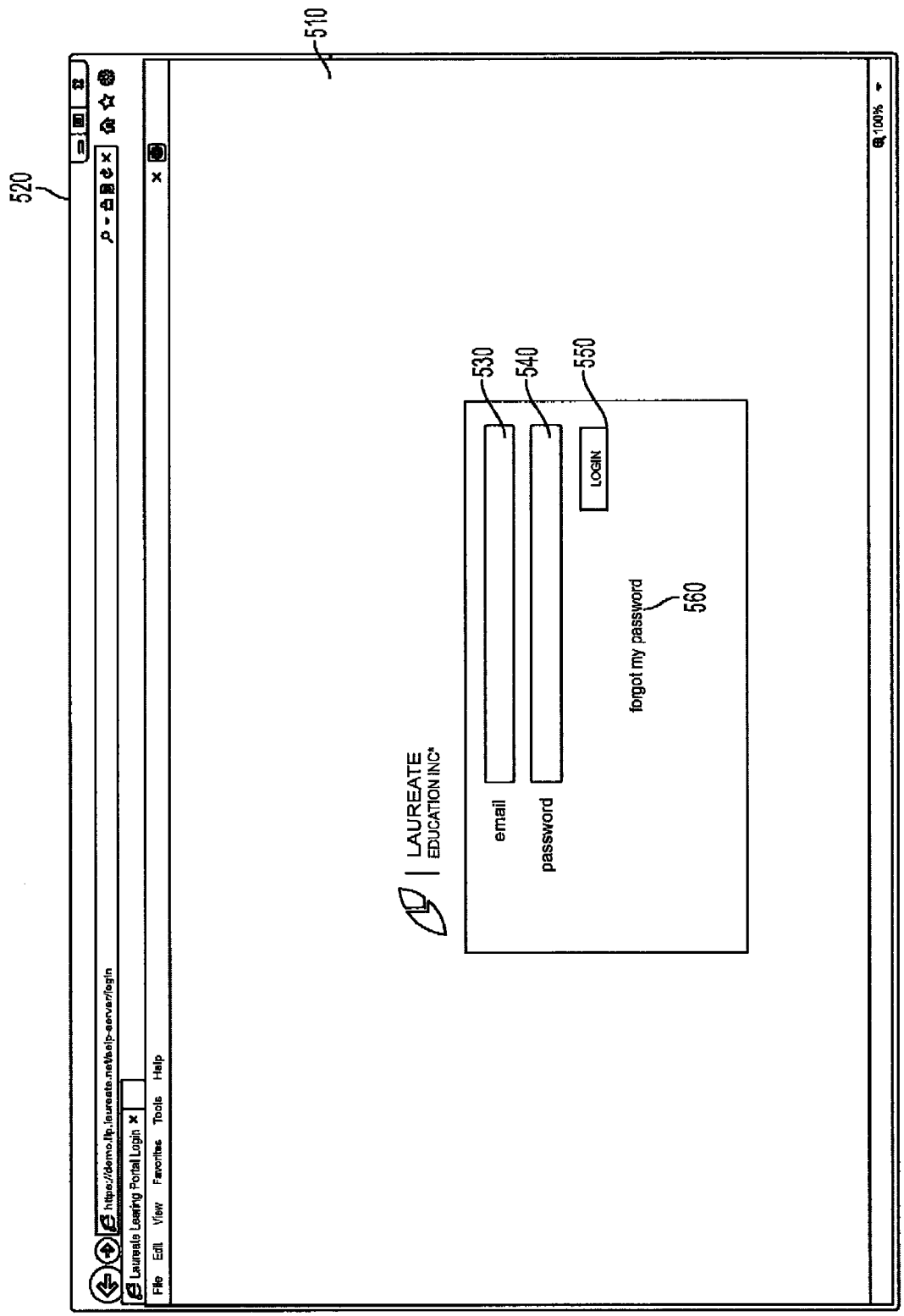

FIG. 5 depicts an exemplary login interface 510 in accordance with one or more embodiments. Login interface 510, as well as the other interfaces described herein, may be presented in browser window 520. Login interface 510 may include an user ID entry field 530, a password entry field 540, a login button 550, a forgotten password link 560, or combinations thereof. The user may enter a user ID into user ID entry field 530. The user ID may be an email address or any other string used to identify users of educational system 200. The user may also enter a password into the password entry field 540. When the user enters a valid user ID and password combination, activating login button 550 may allow the user to gain entry to the course content provided by educational system 200. A user may activate the forgotten password link 560, which may provide the user with further instructions on how to obtain a recovery password. Access to educational system 200 may be control by policies module 445 based on system settings. Educational system 200 may also have an auto-logout feature, in which after a specified period of time or of inactive time, e.g. 30 minutes, a user is disconnected from the system and must login again in order to access educational system 200.

Course Dashboard

Figure 6:
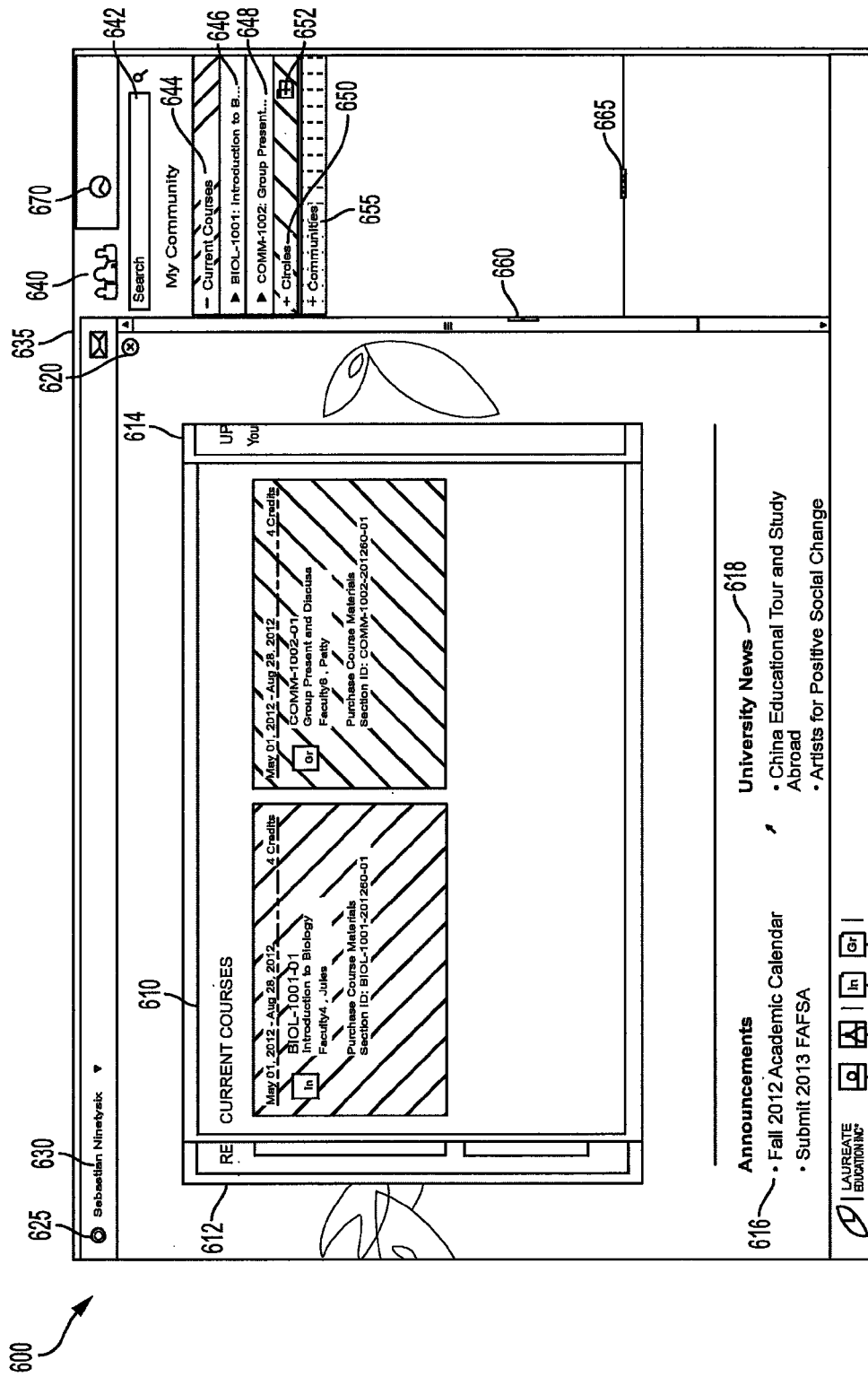

FIG. 6 depicts an exemplary interface 600 in accordance with one or more embodiments. Interface 600 may include dashboard button 605, current courses display 610, recent courses display 612, upcoming courses display 614, announcements area 616, news area 618, close button 620, or any combination thereof. Dashboard button 605 may be present on any interface of educational system 200. When a user activates dashboard button 605, the educational system 200 will display current courses display 610, recent courses display 612, upcoming courses display 614, announcements area 616, news area 618, close button 620, or any combination thereof. The portion of the browser window containing these elements may change while the other portions of the browser window, for example, the contacts display, may remain unaltered. Presentation module 465 may manage the elements presented for display as described herein.

Current courses display 610 may display, in any format, a list of courses in which a user in currently enrolled. The current courses display 610 may include links that link to the course pages and a place for obtaining course materials. Any number of currently enrolled courses may be presented on current courses display 610. Current courses display 610 may be hidden by recent courses display 612 or upcoming courses display 614 in a similar manner in which dashboard interface 600 shows recent courses display 612 and upcoming courses display 614 being hidden by current courses display 610. In one embodiment, the currently selected course panel, i.e., current courses display 610, recent courses display 612, or upcoming courses display 614, will hide all or portions of the two non-selected course panels. Clicking or activating a hidden course panel may cause that course panel to come to the foreground and hide the other two course panels. Recent courses display 612 and upcoming courses display 614 may display the same types of information as current courses display 610. However, recent courses display 612 may any number of courses already completed by the user. Upcoming courses display 614 may display courses that the user has not yet started but in which the user may be enrolled. Announcements area 616 may display announcements from the system or other source. The announcements may be any type of content including text, images, video, links, or any combination thereof. News area 618 may display news from the system or other source. The news may be any type of content including text, images, video, links, or any combination thereof. When activated, close button 620 may hide the portion of the browser window containing current courses display 610, recent courses display 612, upcoming courses display 614, announcements area 616, news area 618, close button 620. The portion of the browser window may then display a default page, a blank page, another portion of content presented by educational system 200, for example, a page showing information about a user, or content presented from another source.

Interface 600 may include availability indicator 625, user status button 630, email button 635, or any combination thereof. Availability indicator 625 may be a graphical or textual symbol that represents the status of the user currently using the system. Availability indicator 625 may be a colored light, with different colors representing different statuses. In one embodiment, a green light may indicate that the user is available, a red light may indicate that the user is busy, and a grey light may indicate that the user is invisible. User status button 630 may be a button that displays identifying information about the user currently logged in. User status button 630 may display the user's name, user ID, email address, any information that identifies the user, or any combination thereof. When a user activates email button 635, the user may be redirected to an email program. The email program may be integrated with educational system 200 or external to educational system 200. The email program may start composing a new email with some or all of the content currently being presented by educational system 200 in the browser. Availability indicator 625, user status button 630, and email button 635 may be present on any or all of the other interfaces presented by educational system 200.

Social Pane

Interface 600 may include contacts button 640, search field 642, current courses section 644, course button 646, course button 648, circles section 650, add circles button 652, communities section 655, hide social pane button 660, social pane adjustor 665, stream button 670, or any combination thereof. Contacts button 640, when activated, causes the social pane to be shown. The social pane may include search field 642, current courses section 644, course button 646, course button 648, circles section 650, add circles button 652, communities section 655, hide social pane button 660, and social pane adjustor 665. When a user enters a query into search field 642, a search dialog may appear providing a real-time list of results provided by the contacts module 435 that match the user's query.

Current courses section 644 may list the current courses in which a user is enrolled and the other users that may also be enrolled in those courses. By activating the current courses section 644, which may include clicking on current courses section 644, the user may toggle hiding the list of courses and users and showing the list of courses and users. In one embodiment, the user is enrolled in two courses, as shown by course button 646 and course button 648. When the user toggles course button 646, the list of users also enrolled in course may be displayed. For an example of the expanded list of users, see FIG. 9. Contacts module 435 may provide educational system 200 with the list of contacts currently enrolled in the course. The current courses section 644 may also display the instructors associated with each course. Any number of courses may be presented in any order in the current courses section 644.

Circles section 650 may list the current circles that a user created and the other users that are a part of those circles. By activating the circles section 650, which includes clicking on circles section 650, the user may toggle hiding the list of circles and users and showing the list of circles and users. A user's circles may be presented logically by circle similar to how the courses were presented logically by course in current courses section 644. For an example of the expanded list of circles, see FIG. 22. Add circles button 652 may be used by a user to add new circles. Any number of circles may be presented in any order in the circles section 650. Circles module 430 may provide educational system 200 with the list of the user's circles and users associated with the circles.

Communities section 655 may list the current communities with which a user is associated and the other users that may also be associated with those communities. By activating the communities section 655, which includes clicking on communities section 655, the user may toggle hiding the list of communities and users and showing the list of communities and users. A user's communities may be presented logically by community similar to how the courses were presented logically by course in current courses section 644. For an example of the expanded list of communities, see FIG. 22. Communities module 420 may provide educational system 200 with the list of the user's communities and users associated with the communities.

Hide social pane button 660 may be used to hide the social pane or resize the horizontal dimensions of the social pane. Social pane adjustor 665 may be used to adjust the verticle size of the social pane. Below the social pane adjustor 665 may be a space for open chat sessions. In some embodiments, when a user hides the social pane with hide social pane button 660, educational system 200 changes the user's status to busy. When the user unhides the social pane with hide social pane button 660, educational system 200 changes the user's status to available. This technique allows the user to simultaneously hide the social pane when wanting to focus on course materials while indicating to contacts that the user is busy and might not respond to chats. Hide social pane button 660 may allow the user to hide the social pane with a single click.

Interface 600 may include places button 680, tools button 682, course button 684, course button 686, or any combination thereof. Places button 680, tools button 682, course button 684, or course button 686 may displayed in the taskbar area of any page, not only on the page displayed in interface 600. When activated by the user, pages button 680 reveals a pop-up window that gives the student the option to link to other parts of the application provided by educational system 200. In some embodiments, the links include a link to student services pages and a link to a communities page. When activated by the user, tools button 682 reveals a pop-up window that gives the student the option to link to other parts of the application provided by educational system 200. In some embodiments, the links include a link to an email tool.

Course buttons 684 and 686 represent courses that a user is associated with. When activated by the user, course button 684 opens a course page provided by educational system 200. There may be any number of course buttons in the taskbar area. Educational system 200 or a user may determine that a course should be placed as a course button in the taskbar area, reordered in the taskbar area, or removed from the taskbar area. In some embodiments, one or more users may be prevented by educational system 200 from making alterations to the course buttons in the taskbar area. Course button 684 and 686 can be used to return to that course if the student has been working in other areas and overlain the course in the workspace.

Course button 686 may function in any of the ways course button 684 functions for a separate course, the same course, or a separate portion of the same course.

User Status Options Window

Figure 7:
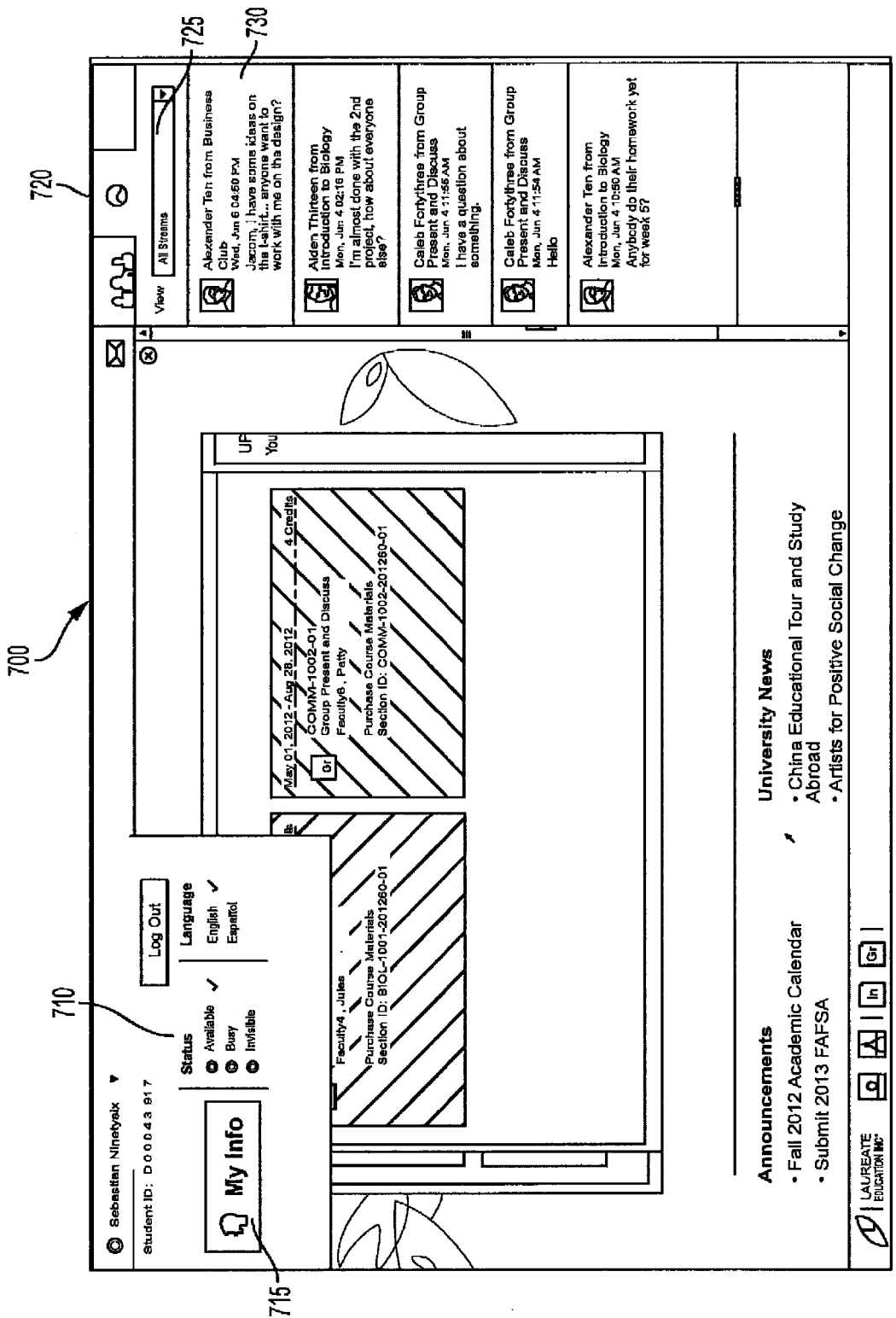

FIG. 7 depicts an exemplary interface 700 in accordance with one or more embodiments. When user status button 630 is activated, a user status options window 710 appears. User status options window 710 may include user info button 715, status selection options, language selection options, student information, a logout button, or any combination thereof. Activating the user info button 715 will allow the user to edit the user's information as described herein. The status selection options may allow the user to make changes to the user's status. The language selection options may allow the user to make changes to the preferred language for receiving content. The logout button may allow the user to end the session with educational system 200.

Updates Stream

Interface 700 may include stream button 720, filter bar 725, and stream section 730. When a user activates the stream button 720, filter bar 725, stream section 730, or any combination thereof may be displayed. Stream section 730 may display a stream of updates associated with courses, communities, circles, or any combination thereof. Updates may include updates on other users' chat statuses or new information associated with other people. Stream section 730 may display, for each update, the source of the update, who posted the updated, the time of the update, a message, a content item, or any combination thereof. Update stream module 440 may provide educational system 200 with updates and information relating to the user's stream.

Filter bar 725 may provide a drop-down menu that may allow a user to filter the user's stream by various options, including filtering by community, a course, circle, contact, user, status, location, any other filtering option described herein, or any combination thereof. When a filtering option is chosen from the filter bar 725, the stream section 730 may be updated to display those stream items that met the filtering options. Education system 200 may detect that the user has selected a particular filter, and then only push to the user updates that satisfy the filter. The update viewing section may be a truncated area in a panel which can be left open while the user browses the system, or may be a full page area that may be navigated away from. Update stream module 440 may provide educational system 200 with updates and information relating to the user's stream.

Education system 200 may filter updates based upon other criteria. The system may filter updates based on those users currently on-screen. Filtering may be based upon the focus of the portal. For example, if a History course is selected, the user may see a certain group of student status updates for the users in History course. When the user switches to an English course, the History course updates may be removed. The filtering described herein allows educational system 200 to avoid sending updates or buddy lists that are not being used because the updates or users have been filtered out. As a result, the server may avoid sending extraneous data regarding updates, e.g., updates about people, when the user will not even see the updates. Update stream module 440 may provide educational system 200 with updates and information relating to the user's stream.

Student-Selected Contacts and Mandatory Contacts

A networked computer system provides various services for assisting users in locating, and establishing contact relationships with, other users. For example, in one embodiment, users can identify other users based on their affiliations with particular schools or other organizations. The system also provides a mechanism for a user to selectively establish contact relationships or connections with other users, and to grant permissions for such other users to view personal information of the user. The system may also include features for enabling users to identify contacts of their respective contacts. In addition, the system may automatically notify users of personal information updates made by their respective contacts.

A network service comprises a platform that builds a plurality of networks of related users. Such network service platform may be presented to the users via a website served by servers, such as those disclosed in connection with FIGS. 2-4. Network services allow for creation of user profile pages that may include pictures and user information.

The users may be related based on shared interests in learning a subject. For example, the related users can be students taking the same course or classes. The related users can comprise students and faculty responsible for mediating instructional material for a course of study. The related users can be students having shared interest in learning about a specific subject that is offered by a learning institution, or various learning activities. The related users can comprise students and other users that have real-life connections with the students. Such real-life connections can be based on friendship, ethnical backgrounds, etc.

A learning management system may comprise a database, a learning system, and a networking service. The database, such as any one or more of those depicted in FIGS. 2 and 3 or otherwise described herein, may store electronic addresses for a plurality of contacts associated with the student. The student's contacts may be any other system user that is associated with the user. As discussed above, a user's contact may be in a community with the user, a circle with the user, a course with the user, or any combination thereof. A student may be associated with a set of student's contacts, i.e. contacts of the student. The set of student's contacts may comprise at least one student-selected contact and at least one mandatory contact. The student-selected contact may be a contact designated by the student to be in the set of the student's contacts. For example, the student-selected contact may a member of a circle of the student, another user added by the student to the student's contact list, or any other contact otherwise identified by the student as the student's contact. In some embodiments, the student-selected contact may a member of a contact group that is subject to a group approval, such as a community.

The mandatory contact may be a contact that is not designated by the student to be in the set of the student's contacts, but is still one of the student's contacts. For example, a mandatory contact may be a classmate that is enrolled in the same course with the student, a course instructor assigned to the course, an assessor of student performance of the course, a course developer assigned to a course, a member of a contact group that is subject to group approval (e.g. a member of a community), or any other contact not selected, designated, and/or identified by the student to be in the set of student's contacts. Courses, as a type of association of contacts, may refer to groups of connected users (e.g. students, teachers, teaching assistants) that are involved in the same course. Membership in a course may be mandatory in that any person involved with a course may automatically be included in the course group, and the user may not have the ability to opt-out of the course group. Similarly, a mandatory contact, or compulsory contact, of the student may be automatically included in the student's contacts, and the student may not be able to remove the mandatory contact from the student's contacts. The identification, selection, or assignment of mandatory contacts of a student, e.g. members of a course group, may be provided by a registrar, another source of course enrollment data, or any other source on the system.

The learning system may be configured to deliver one or more instructional materials to the student. The one or more instructional materials may be any of those discussed herein.

The networking service may be in communication with the learning management system, and the networking service may be configured to provide a user interface that enables the student to communicate messages with the student-selected contact and the mandatory contact. The user interface may be any of those depicted herein, e.g. interfaces provided for chatting, posting updates, etc.

In some embodiments, the user interface may enable the student to selectively communicate messages with the student-selected contact and mandatory contact during a learning session. For example, a user may send or receive messages, updates, chats, feed information, status updates, presence updates, or any other communication from the student-selected contact and/or the mandatory contact during a learning session. For example, the communications could be the updates depicted in FIG. 7.

In some embodiments, the one or more instructional materials are associated with a course of study, and the mandatory contact is associated with a course contact. For example, the mandatory contact may be associated with another student taking the course, a course instructor assigned to the course, an assessor of student performance in the course, a course developer assigned to the course, or any combination thereof.

Streams

A network computer system, such as the ones described herein, may include social networking features that allow students, faculty, or other users to communicate with one other while using other features provided by the system. When using the social networking services, a user may receive updates about social networking contacts. Updates may include updates on other users' chat statuses or new information associated with other people. The updates may be displayed as a stream. In some embodiments, the updates may appear as a live stream, i.e., in which new updates are displayed as they occur on a real-time basis, or, where users' activities are streamed as soon as they happen. A stream may display, for each update, the source of the update, who posted the updated, the time of the update, a message, a content item, or any combination thereof. The stream may be displayed while users are interacting with other parts of the system.

Because a stream may include an overwhelming amount of information, the items of a stream may be filtered. As discussed herein, a user may have the option of filtering updates in the stream to include only those updates meeting specified criteria, such as membership in one or more courses, circles, communities.

Additionally or alternatively, smart filtering may also be used, in which filtering is performed automatically by the system based on a user's interactions.

Figure 14:
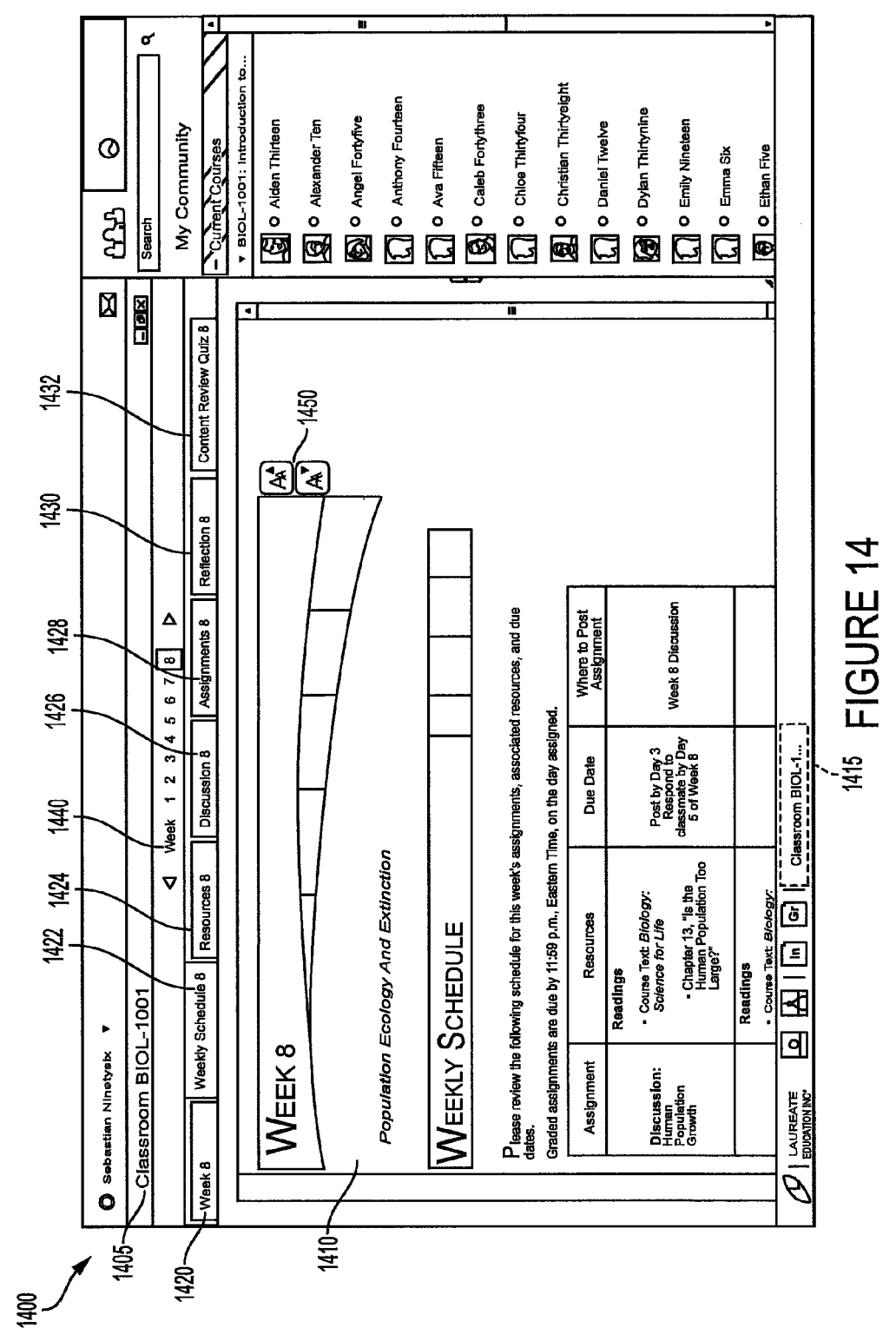

In the learning management system, a server configured to create a learning environment on a remote student workstation or accessible by a remote workstation for delivery of instructional material to a student after the server authenticates a student log-in. The created learning environment displays a user interface to the student on the remote student workstation, such as the interfaces described herein. The user interface may also be used to interact with an instructional material when the student enters into a learning session associated with a course. The learning session may refer to when a student interacts with an instructional material. If the student does not interact with instructional material, then there is no learning session. FIG. 14, which will be described in more detail below, depicts an example of a learning session in which instructional materials are presented to a student and the student interacts with the instructional material.

A database, such as any of those discussed herein, may store electronic addresses for a plurality of contacts associated with the student. The plurality of contacts may comprise any of the contact types disclosed herein. The student may be associated with a set of student's contacts comprising a first contact associated with the first course and a second contact.

A networking service in communication with the server may be configured to display to the student, within the learning environment, a first activity stream associated with the first contact and a second activity stream associated with the second contact, wherein upon detection of student's entry into the learning session, the first activity stream is displayed without displaying the second activity stream. For example, a user may be enrolled in and receive activity stream updates from contacts in four classes. The system may detect that a user is currently working on a lessons for a first class, and based on that information, remove from the activity stream updates from the other three classes. When the user later switches to working on lessons for a second class, updates from the first class may be removed from being displayed, and the activity stream updates from the second class may be displayed to the user. Although in this example the second activity stream is associated with a second class, the second activity stream may be any activity stream. For example, the activity stream may correspond to updates from a community, a circle, or any other organizational structure recognized by the system.

Many possible configurations for displaying the activity streams are possible. For example, upon detection of the student's exit from the learning session (e.g. the student leaves the instructional material to visit a different class or group), the second activity stream may be displayed. The second activity stream may be displayed concurrently with the displaying of the first activity stream, e.g. after the user exited the learning session, the user's contacts associated with learning session may be displayed with all of the other contacts of the student. Alternatively, the second activity stream may displayed without displaying the first activity stream. The first activity stream may comprises a first message from the first contact, the second activity stream may comprises a second message from the second contact, or any combination thereof. At least one of the first activity stream or second activity stream may comprises a message transmitted from the student. The first activity stream may comprise a first status update from the first contact, the second activity stream may comprise a second status update from the second contact, or any combination thereof.

The instructional material may be concurrently displayed with the first activity stream. For example, the user may view the activity stream of updates from classmates displayed on an interface while interacting with instructional materials, e.g. a lecture, presentation, etc., that are also displayed on the interface.

The first contact may be associated with another course student, a course instructor, a course performance assessor, a course developer, or a course administrator. The second contact may be associated with a student-selected contact. At least one of the first or second activity streams may comprise a live stream, in which updates are received in a real-time basis as they occur. A message corresponding to the second activity stream is transmitted to the student upon detection of student's exit from the learning session.

In some embodiments, a server, such as any of those discussed herein, may be configured to create a first learning environment on a remote student workstation or accessible by a remote student workstation for delivery of a first instructional material to a student after the server authenticates a student log-in and a second learning environment on the remote student workstation or accessible on the remote student workstation for delivery of a second instructional material to the student after the server authenticates the student log-in. The created first learning environment may display a first user interface to the student on the remote student workstation. The first user interface may be used to interact with the first instructional material when the student enters into a first learning session associated with the first course. The created second learning environment may display a second user interface to the student on the remote student workstation. The second user interface may be used to interact with the second instructional material when the student enters into a second learning session associated with a second course.

A database, such as any of those discussed herein, may store electronic addresses for a plurality of contacts associated with the student. The student may be associated with a set of student's contacts comprising a first contact associated with the first course and a second contact associated with the second course. For example, the first contact may be a classmate of the student in the first course, and the second contact may be an instructor of the student in the second course. However, the first and second contacts could be any type of contact associated with the first and second courses, respectively.

A networking service in communication with the server may be configured to display to the student, within the first learning environment, a first activity stream associated with the first contact, and configured to display to the student, within the second learning environment, a second activity stream associated with the second contact. Upon detection of student's entry into the first learning session, the first activity stream may be displayed without displaying the second activity stream, and upon detection of student's entry into the second learning session, the second activity stream may be displayed without displaying the first activity stream.

This type of filtering may be implemented according to one or more of the following configurations. In some embodiments, the first activity stream may comprise a first message transmitted from the first contact, the second activity streams comprises a second message transmitted from the second contact, or any combination thereof. The first message may be transmitted from the first contact to the student, the second message may be transmitted from the second contact to the student, or any combination thereof. A message corresponding to the second activity stream may be transmitted to the student upon detection of student's exit from the learning session. At least one of the first activity stream or second activity stream may comprise a message transmitted from the student. The first activity stream may comprise a first status update from the first contact, the second activity stream comprises a second status update from the second contact, or any combination thereof. The first instructional material may be concurrently displayed with the first activity stream, the second instructional material may be concurrently displayed with the second activity stream, or any combination thereof. The first contact may be associated with another first course student, a first course instructor, a first course performance assessor, a first course developer, or a first course administrator. The second contact may be associated with a second course student, a second course instructor, a second course performance assessor, a second course developer, or a second course administrator. The first activity stream may comprise a live stream, the second activity stream or comprise a live stream, or any combination thereof.

Either type of filtering, i.e. filtering by the student or filtering by the system, may allow the system to avoid sending updates or buddy lists that are not being used because the updates or users have been filtered out. As a result, the system may avoid sending extraneous data regarding updates that the user will not even see.

Editing User Information

Figure 8:
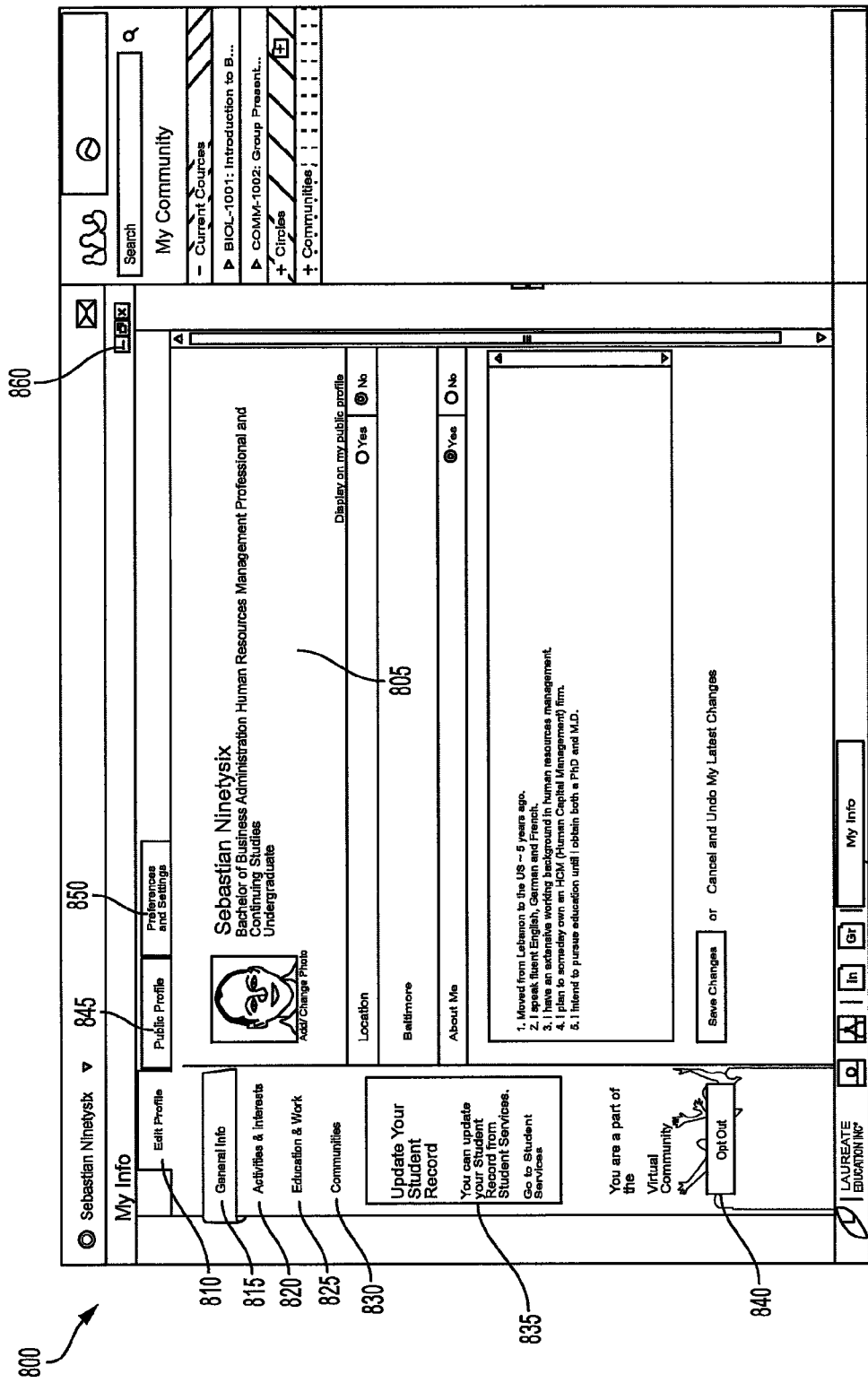

FIG. 8 depicts an exemplary interface 800 in accordance with one or more embodiments. Interface 800 may include a "My Info" section, which includes content area 805, edit profile tab 810, public profile tab 845, settings tab 850, or any combination thereof. Content area 805 may change based on the current tabs selected. Edit profile tab 810 may include general info tab 815, activities tab 820, education/work tab 825, communities tab 830, update record section 835, and opt-out button 840. When general info tab 815 is selected, the user may be presented in content area 805 with options for changing information about the user's profile. The user may change or add a profile picture, whether the user's location is displayed on the user's public profile, whether an "about me" section is displayed on the public profile, and the information contained in an "about me" section. The user may also have the options of saving changes, canceling the editing operations, or undoing the latest changes. When activities tab 820 is selected, the user may be presented in content area 805 with options for changing information about the user's activities and interests. The user may edit a description about the user's activities and interests, and whether or not to display this information on the user's public profile. The user may also have the options of saving changes, canceling the editing operations, or undoing the latest changes. When education/work tab 825 is selected, the user may be presented in content area 805 with options for changing information about the user's educational background and work experience. The user may edit a description about the user's educational background, work experience, and whether or not to display the educational background and work history on the user's public profile. The user may also have the options of saving changes, canceling the editing operations, or undoing the latest changes. When communities tab 830 is selected, the user may be presented in content area 805 with the option of whether or not to display the user's communities on the user's public profile. The user may also have the options of saving changes, canceling the editing operations, or undoing the latest changes. The user may also be presented in content area 805 with a list of the communities to which the user belongs. The list may include links to more specific information about the communities, e.g., the official page for the community. When the public profile tab 845 is selected, content area 805 may display the public profile of the user. Displaying the public profile will be discussed in conjunction with FIG. 9. When the settings tab 850 is selected, content area 805 may display options for changing the user's preferences and settings. Managing the user's preferences and settings will be discussed in conjunction with FIGS. 10-13. Interface 800 may include a taskbar item 855 and a window control widget 860.

Taskbar item 855 may be displayed in the taskbar of interface 800 and is a method for easily returning to the "My Info" section. Window control widget 860 may be used to close the "My Info" section, minimize the "My Info" section such that taskbar item 855 is the only on-screen representation of the "My Info" section, or scale the "My Info" section into a window size smaller than the portion it is currently shown to occupy. Additional taskbar items may be used for other interface elements of educational system 200. For example, when a course is open, the course may have a taskbar item associated with it. An example is disclosed in FIG. 14, taskbar item 1415. As more content pages are open, additional taskbar items may be added to the taskbar. Similarly, window control widget 860 may be used with other content pages in the manner disclosed herein.

Public Profile

Figure 9:
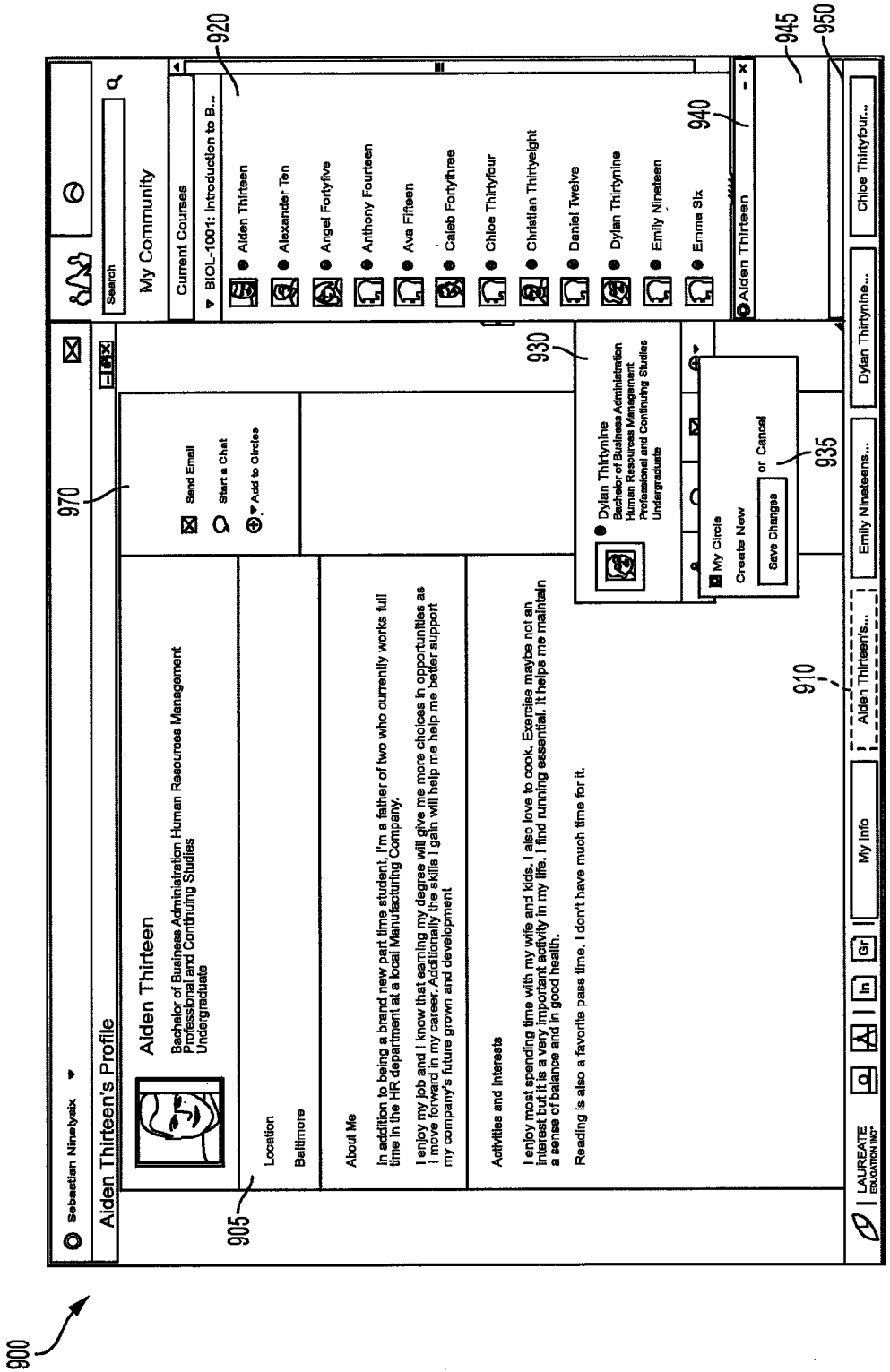

FIG. 9 depicts an exemplary interface 900 in accordance with one or more embodiments. Interface 900 may include content section 905 and contact widget 970. Content section 905 may display the public profile for a user of the system. The public profile for a user may include any combination information viewable by other members of the system. In one embodiment, the public profile may include a user's name, email address, track or tracks of study, course year, location, description, "about me," activities, interests, and communities. The public profile for a user may be displayed when a user clicks on the user in the social pane or update stream. For example, clicking on user 920 may cause that user's public profile to be displayed in content section 905.

Contact widget 970 may provide links to different ways of contacting the person associated with the contact widget 970. Contact widget 970 may include links to initiate sending an email to the user, starting a chat with the user, or adding the user to a circle. Contact widget 970 may be associated with any user and may appear alongside content of any page displayed by educational system 200.

When a user hovers over an entry in the social pane or update stream, a summary window 930 may be displayed. Summary window 930 may display a user's picture, name, status, area of study, any other information available to other users in the system, or any combination thereof. Summary window 930 may also display buttons that, when selected, enable a user to view the user's profile, chat with the user, initiate sending an email to the user, or adding the user to a circle. In some embodiments, summary window 930 may be displayed anytime a user hovers over another user's name anywhere on the site.

Simultaneous Add and Designate Contacts

Summary window 930 may include link for quickly adding a contact to a particular circle. When the add to contact link is selected, quick add window 935 may appear. Quick add window 935 may be displayed as a pop-up or full-sized window. Quick add window 935 allows the user to check one or many boxes associated with one or more circles. The user can create a new circle by clicking on the "create new" link, entering the name of the new circle, and clicking save. After the user chooses one or more circles, the user selects save changes, and the contact is added to those circles of the user. This mechanism for quickly and unobtrusively placing contacts in circles allows users to update their circles without having to change the underlying content windows. This allows users to continue performing activities on educational system 200 with only a minimal interruption of a few keystrokes to update their circles. Circles module 430 may facilitate adding contacts to and managing the user's circles.

Chat

Chat module 425 may facilitating users chatting via instant messaging sessions on educational system 200. Chat may be enabled by any chat protocol, including XMPP chat protocol. When a user selects a link to chat with a contact, a chat window 940 may appear. Chat window 940 may include chat history 945 and input field 950. As the user chats with a contact, the record of the chat may be displayed in chat history 945. The user enters text or chat content into input field 950. When the user presses the return key on the keyboard, the message entered into input field 950 is sent to the contact.

Security Settings

Figure 10:
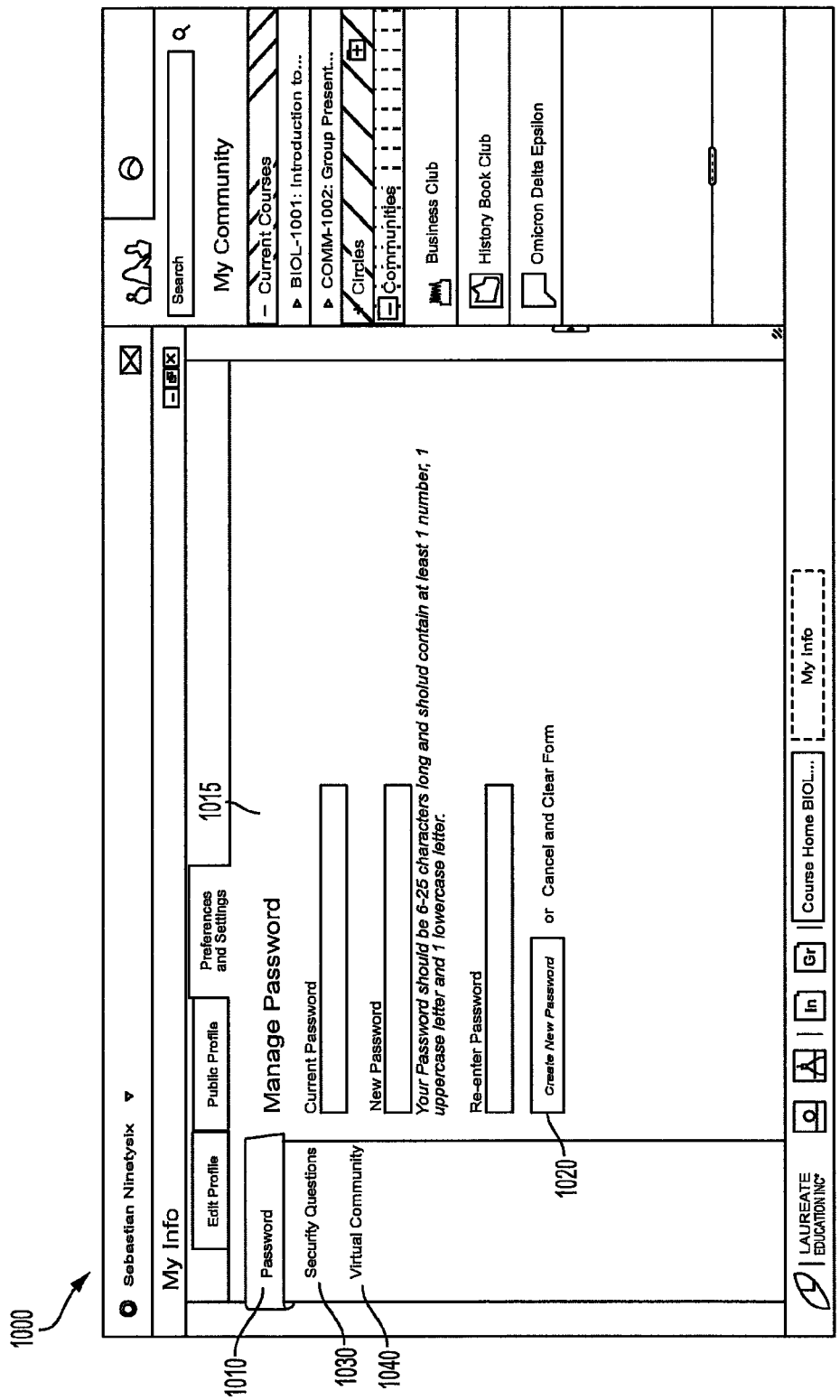

FIG. 10 depicts an exemplary interface 1000 in accordance with one or more embodiments. Interface 1000 may include a password tab 1010, a content area 1015, a set of options 1020, a security questions tab 1030, a virtual community tab 1040, or any combination thereof. Selecting password tab 1010, security questions tab 1030, or virtual community tab 1040 may change the content displayed in content area 1015. When password tab 1010 is selected, a manage password screen may be displayed in content area 1015. The manage password screen may include a field to enter a current password, a new password, and a field to re-enter the password. Content area 1015 may also include a set of password options 1020, which may include the option to create the new password or an option to cancel and clear the form. When a user enters the current correct password, the new and re-entered passwords match, and the create new password option is chosen, policies module 445 will change the user's password to the new password entered.

Figure 11:
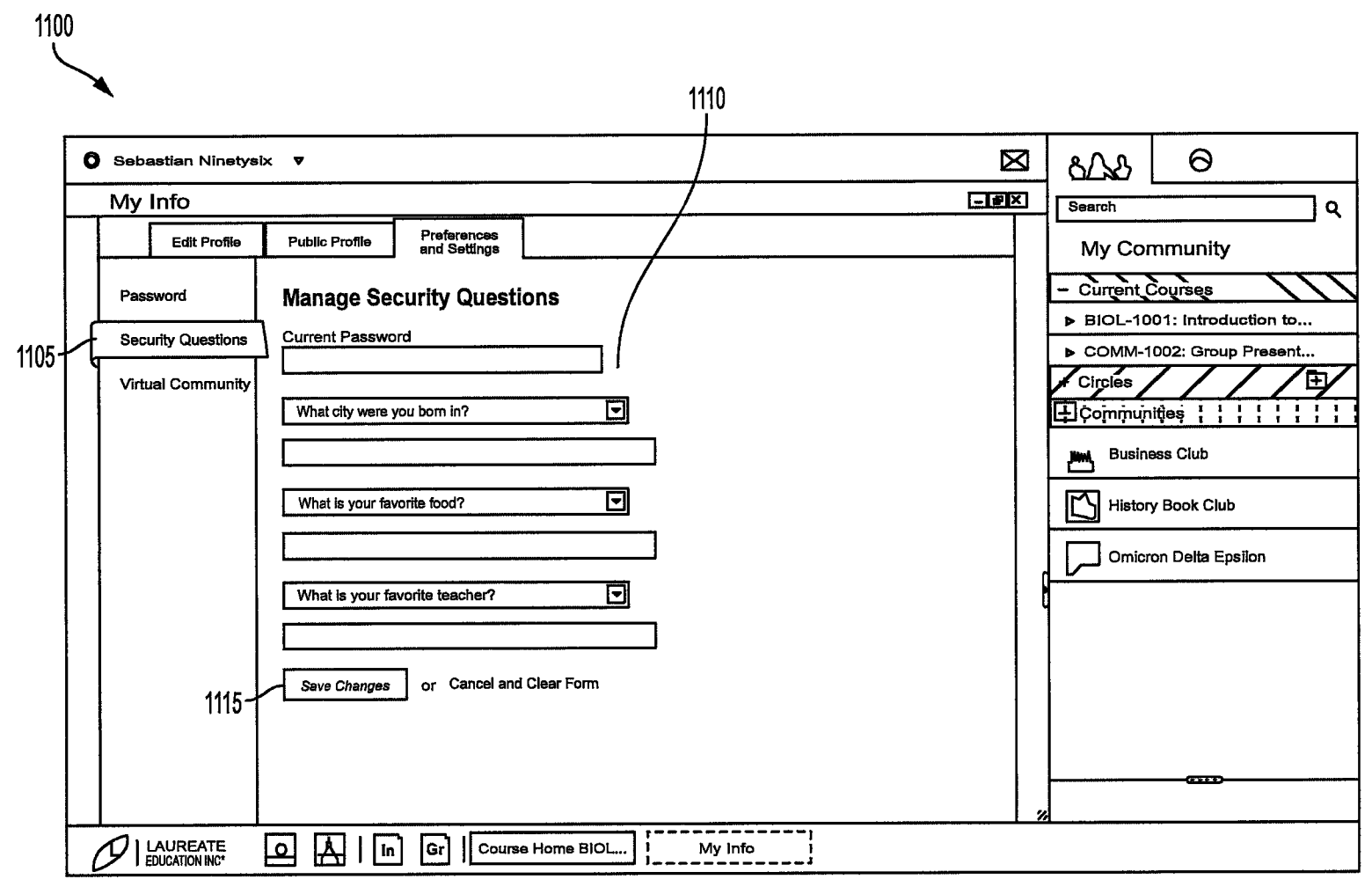

FIG. 11 depicts an exemplary interface 1100 in accordance with one or more embodiments. Interface 1100 may include a security questions tab 1105, a content area 1110, a set of options 1115, or any combination thereof. Selecting security questions tab 1105 may change the content displayed in content area 1110. When security questions tab 1105 is selected, a manage security questions screen may be displayed in content area 1110. The manage security questions screen may include a field to enter a current password, one or more drop down menus that enable a user to select different security questions, and one or more fields to answer questions that of the corresponding drop down menus. Content area 1110 may also include a set of security question options 1115, which may include the option to save changes or an option to cancel and clear the form. When a user enters the current correct password and a set of answers to the selected security questions, policies module 445 will store the user's answers to the security questions.

Figure 12:
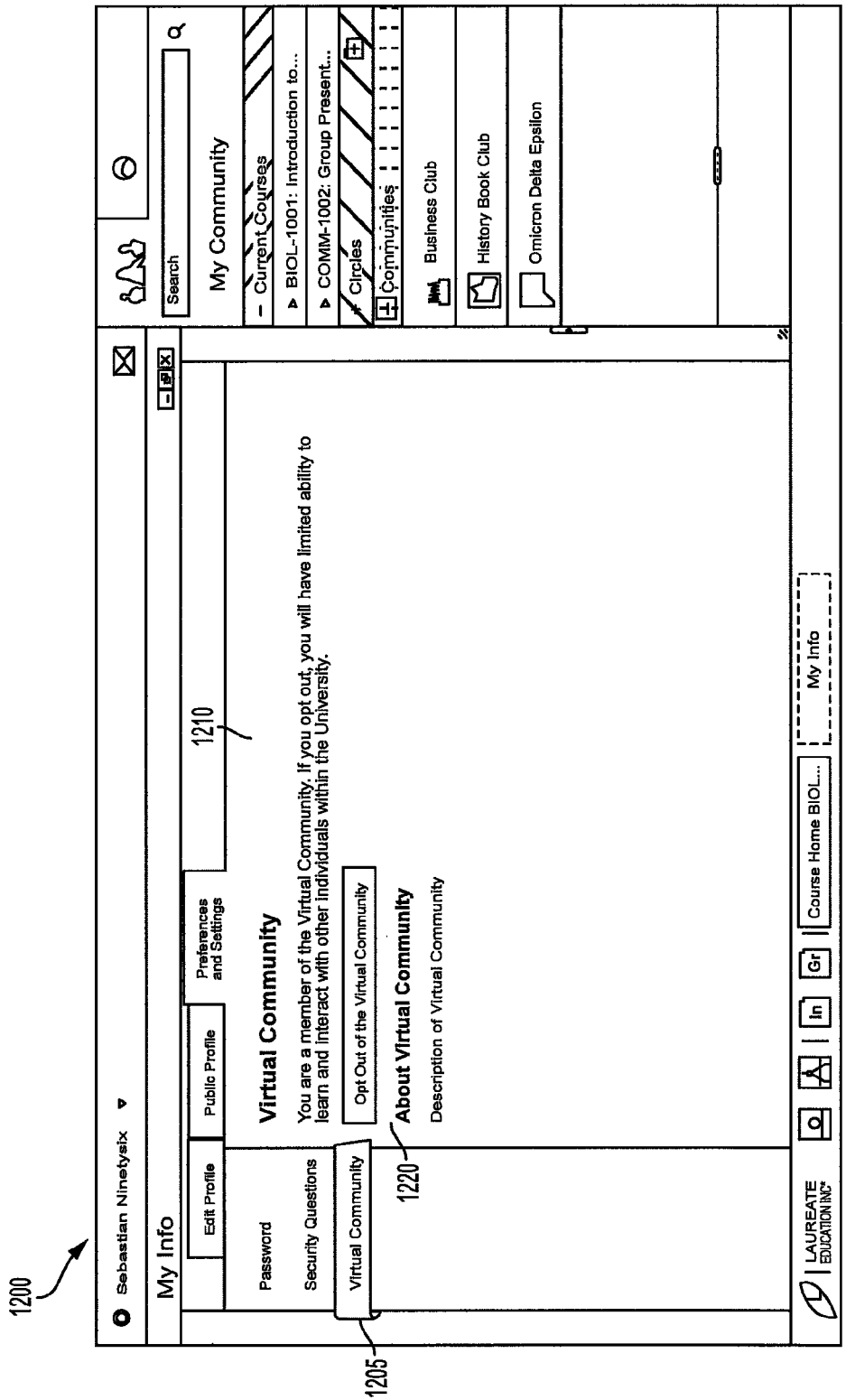
Figure 13:
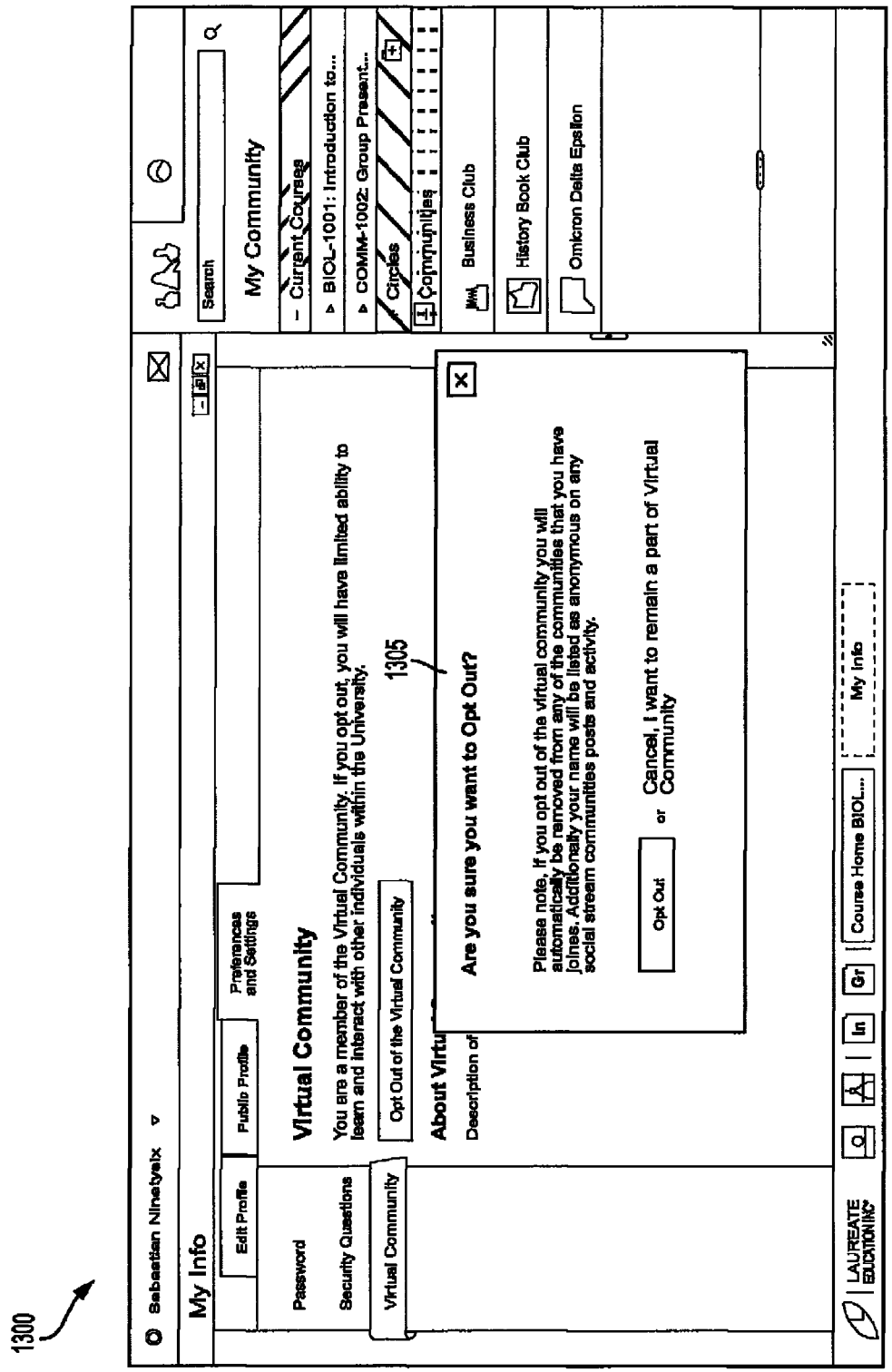

FIG. 12 depicts an exemplary interface 1200 in accordance with one or more embodiments. FIG. 13 depicts exemplary interface 1300 in accordance with one or more embodiments. Interface 1200 may include virtual community tab 1205, content area 1210, opt out button 1220, or any combination thereof. When a user selects opt out button 1220, the user may be presented with the opt out screen 1305 from interface 1300. Opt out screen 1305 may provide notice to the user about the process of opting-out of the virtual communities, and asks for a confirmation in order to opt out. If a user opts out of the virtual communities, one or more of the following may occur: the user may be automatically removed from any of the communities that the user joined; or the user's name will be listed as anonymous on any social stream communities, posts, and activities. When the user confirms an opt out of the virtual communities, communities module 420 sets the data in the social network database 235 to reflect those changes.

Classroom Sites

FIG. 14 depicts an exemplary interface 1400 in accordance with one or more embodiments. Interface 1400 depicts a classroom site in accordance with one or more embodiments. Interface 1400 may include a class identifier 1405, a content area 1410, a taskbar item 1415, an overview tab 1420, a schedule tab 1422, a resources tab 1424, a discussion tab 1426, an assignments tab 1428, a reflection tab 1430, a content review tab 1432, a timeframe selector 1440, a font scaler widget 1450, or any combination thereof. Class identifier 1405 indicates the current course selected. Content area 1410 displays the course materials associated with the currently selected tab. Taskbar item 1415 may be used to access the classroom site when the site is minimized or hidden by other sites. Timeframe selector 1440 may be used to indicate the current selected time frame. In some embodiments, the timeframe is a week and timeframe selector 1440 will display the number of weeks in the course with links to each week's materials. The timeframe may be any measure of time, including days, weeks, months, years, or semesters. The tabs may correspond to the materials for a selected timeframe. In some embodiments, the timeframe is a week and the tabs will show the materials limited to the selected week. For example, interface 1400 shows tabs corresponding to a weekly timeframe. Timeframe selector 1440 may also be used to jump to a specific timeframe in the course. For example, if a user selected the '2' in the timeframe indicator 1440, content area 1410 may display content associated with week 2. Further, the tabs may display indicia representing week 2 instead of week 8. Font scaler widget 1450 may be used to increase or decrease the size of the font of the content displayed on the classroom site.

When overview tab 1420 is selected, content area 1410 displays the course materials associated with an overview for the timeframe, which may include an overview for the timeframe, learning outcomes, any other information associated with an overview for the timeframe, or any combination thereof. When schedule tab 1422 is selected, content area 1410 displays the course materials associated with a schedule for the timeframe, which may include a schedule of classes, a schedule of assignments, a schedule for resources, dues dates, any other information associated with a schedule for the timeframe, or any combination thereof. When resources tab 1424 is selected, content area 1410 displays the course materials associated with resources for the timeframe, which may include readings, optional resources, any other information associated with resources for the timeframe, or any combination thereof. When discussion tab 1426 is selected, content area 1410 displays the course materials associated with a discussion for the timeframe, which may include an discussions associated with the timeframe, any other information associated with discussions for the course during the timeframe, or any combination thereof. When assignments tab 1428 is selected, content area 1410 displays the course materials associated with assignments for the timeframe, which may include a list of assignments for the timeframe, learning outcomes, any other information associated with assignments for the timeframe, or any combination thereof. When reflection tab 1430 is selected, content area 1410 displays the course materials associated with reflections for the timeframe. When content review tab 1432 is selected, content area 1410 displays the course materials associated with content reviews for the timeframe, which may include tests, quizzes, reviews, any other information associated with reviews for the timeframe, or any combination thereof.

Student Services

Figure 15:
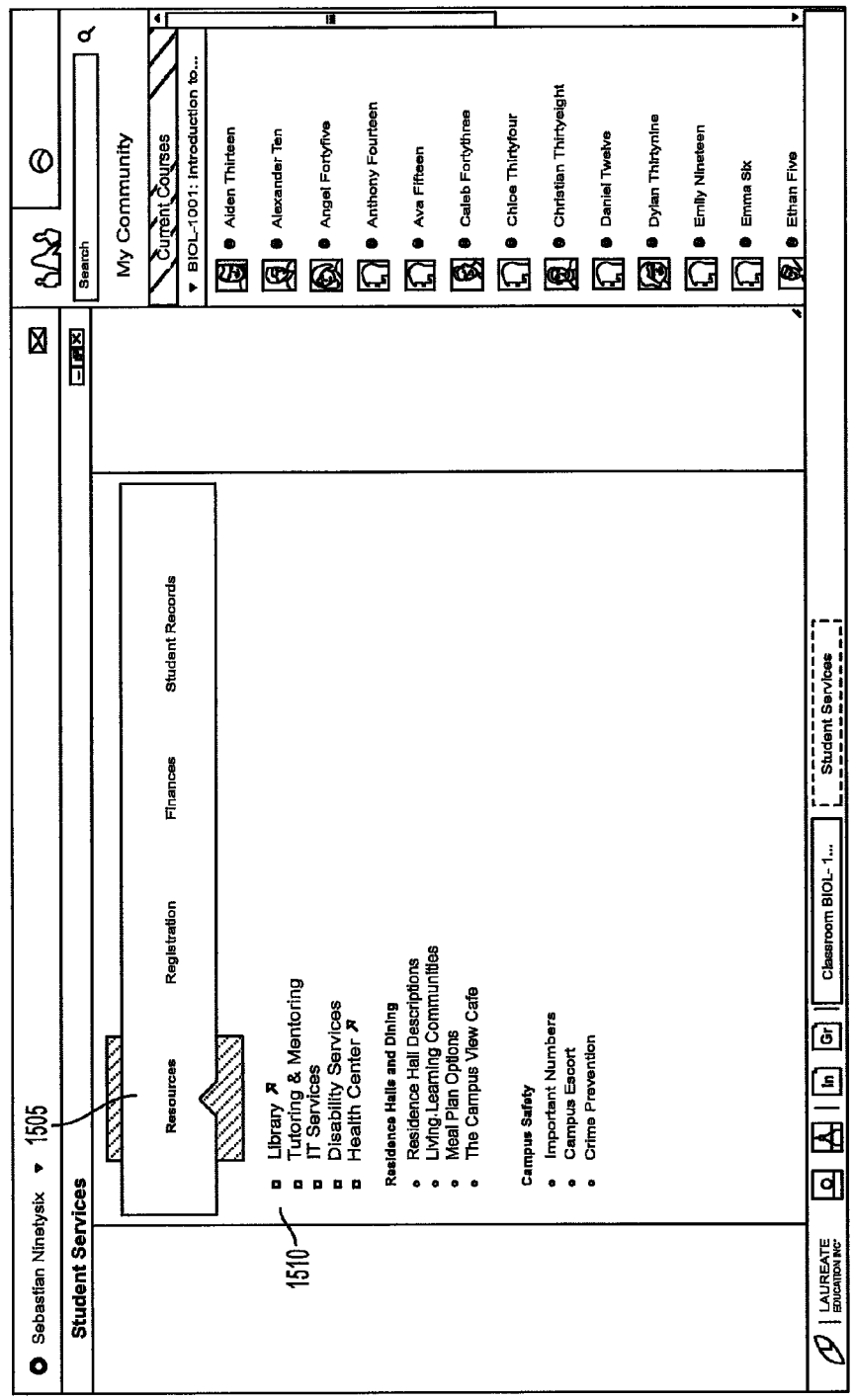
Figure 16:
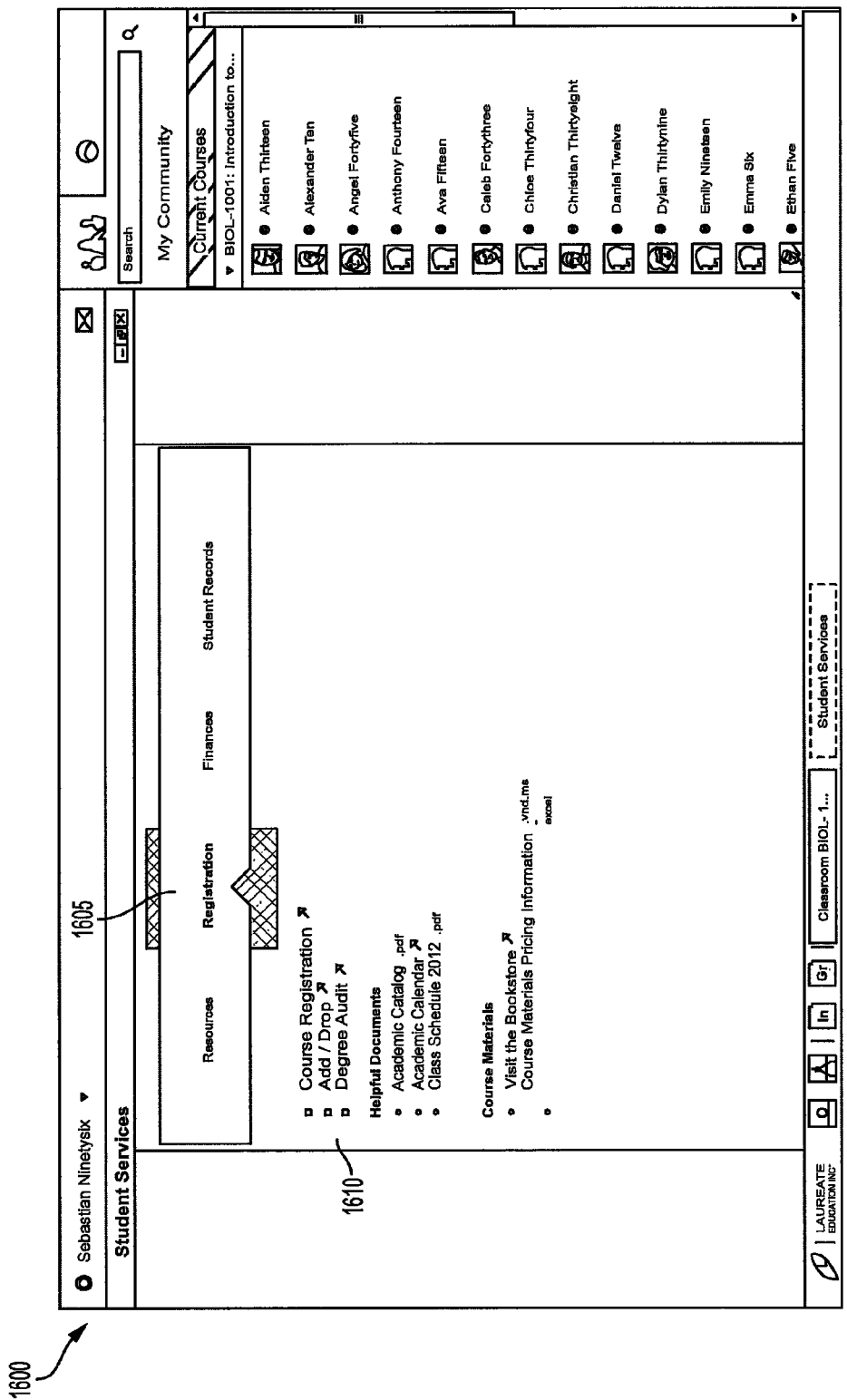
Figure 17:
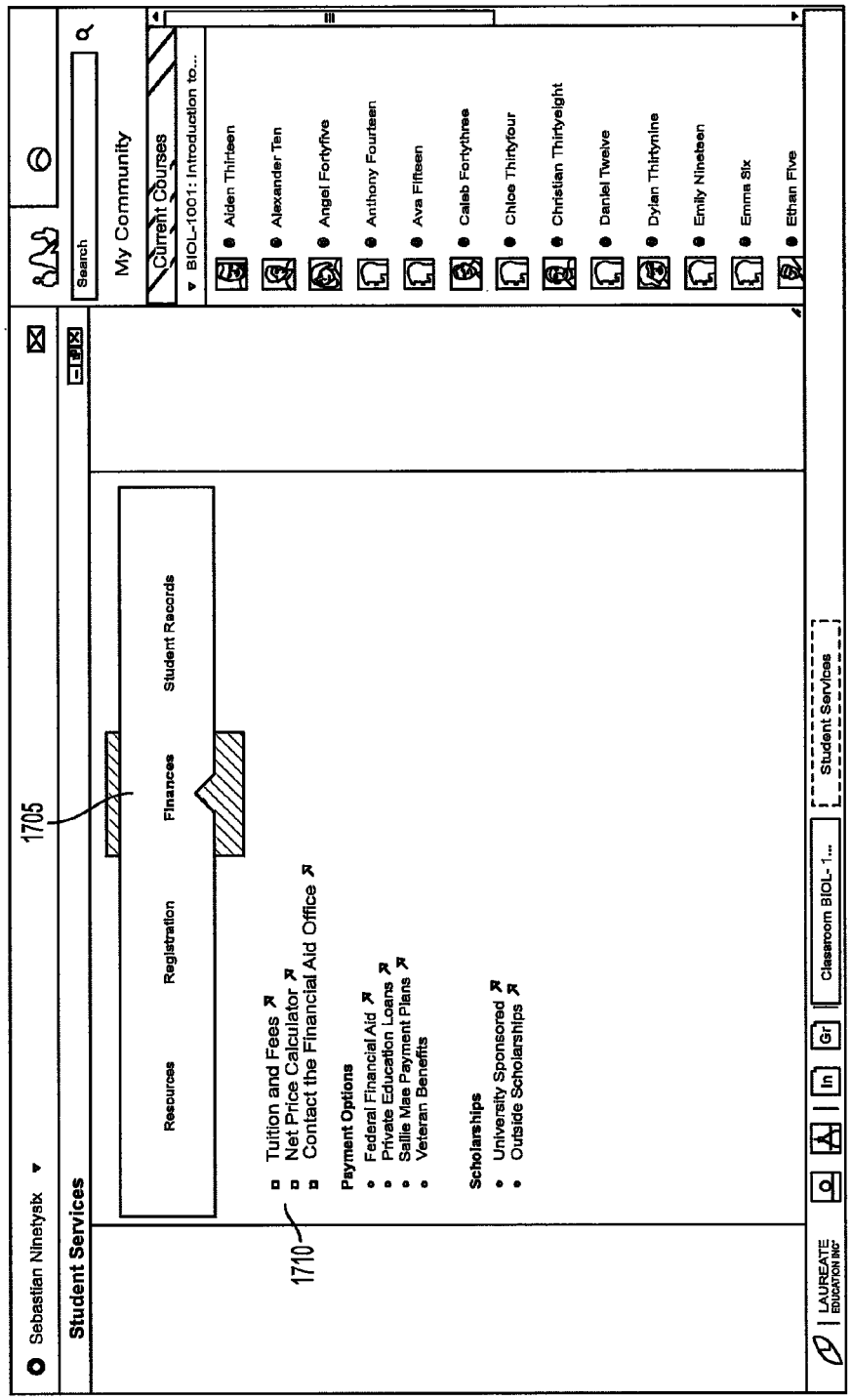
Figure 18:
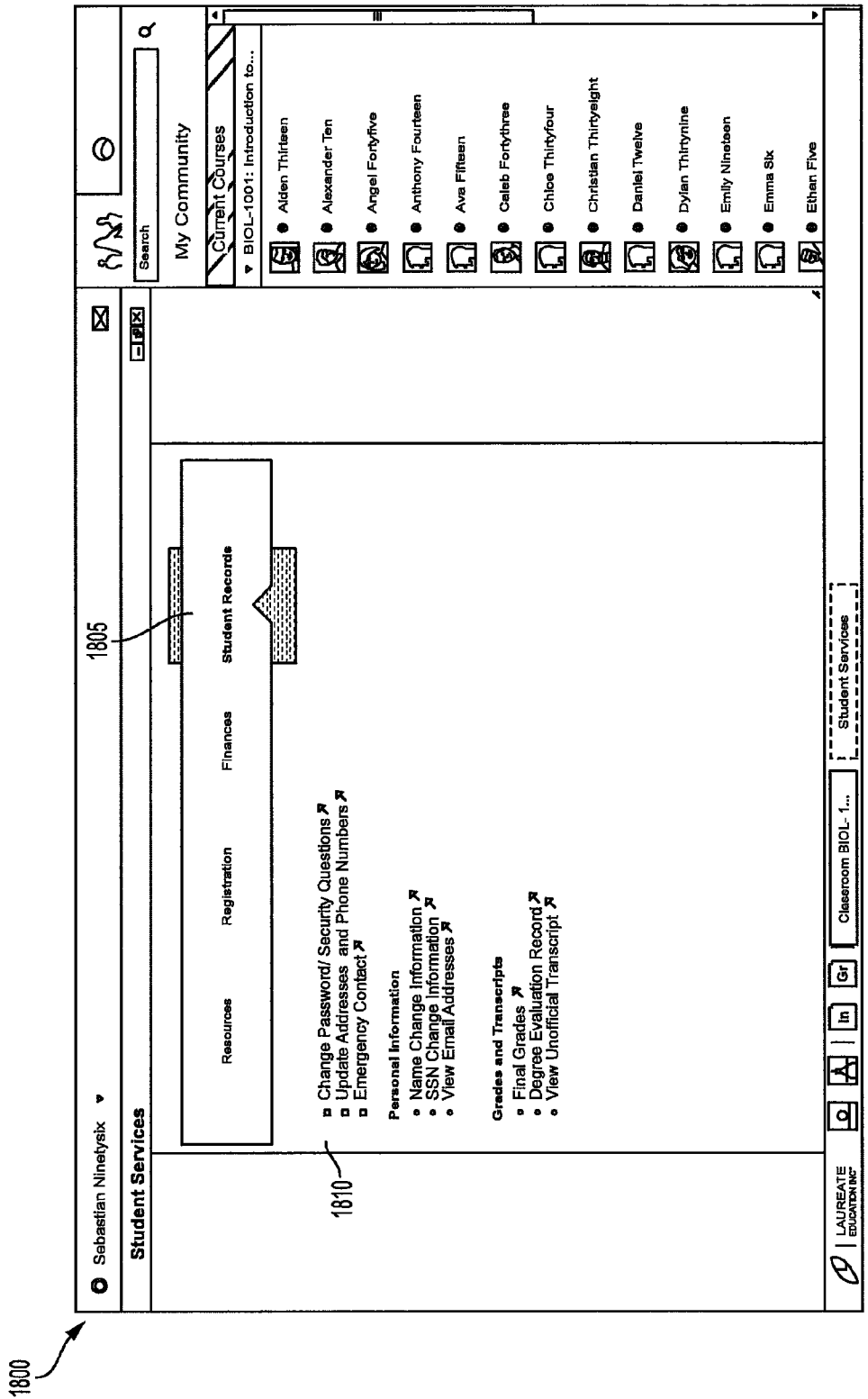

FIG. 15 depicts an exemplary interface 1500 in accordance with one or more embodiments. FIG. 16 depicts an exemplary interface 1600 in accordance with one or more embodiments. FIG. 17 depicts an exemplary interface 1700 in accordance with one or more embodiments. FIG. 18 depicts an exemplary interface 1800 in accordance with one or more embodiments. Interfaces 1500, 1600, 1700, and 1800 depict various embodiments of a student services site. Interface 1500 may include content area 1510. When resources link 1505 is selected, content area 1510 may display information about or links to student services. In some embodiments the student services information includes links to the library, tutoring and mentoring services, IT services, disability services, health center, residence halls and dining, and campus safety information.

Interface 1600 may include content area 1610. When registration link 1605 is selected, content area 1610 may display information about or links to registration services. In some embodiments the registration services information includes links to course registration, adding and dropping courses, academic catalogs, academic calendars, class schedules, and course materials.

Interface 1700 may include content area 1710. When finances link 1705 is selected, content area 1710 may display information about or links to financial services. In some embodiments the financial services information includes links to tuition and fee information, net price calculator, contact the financial aid office, payment options, and scholarship information.

Interface 1800 may include content area 1810. When student records link 1805 is selected, content area 1810 may display information about or links to student records services. In some embodiments the student records services information includes links to change password or security questions, update addresses and phone numbers, emergency contact, name changes, social security number changes, view email address, grades and transcripts, external portfolio settings or information, and internal portfolio settings or information.

Community Searching and Creation

Figure 19:
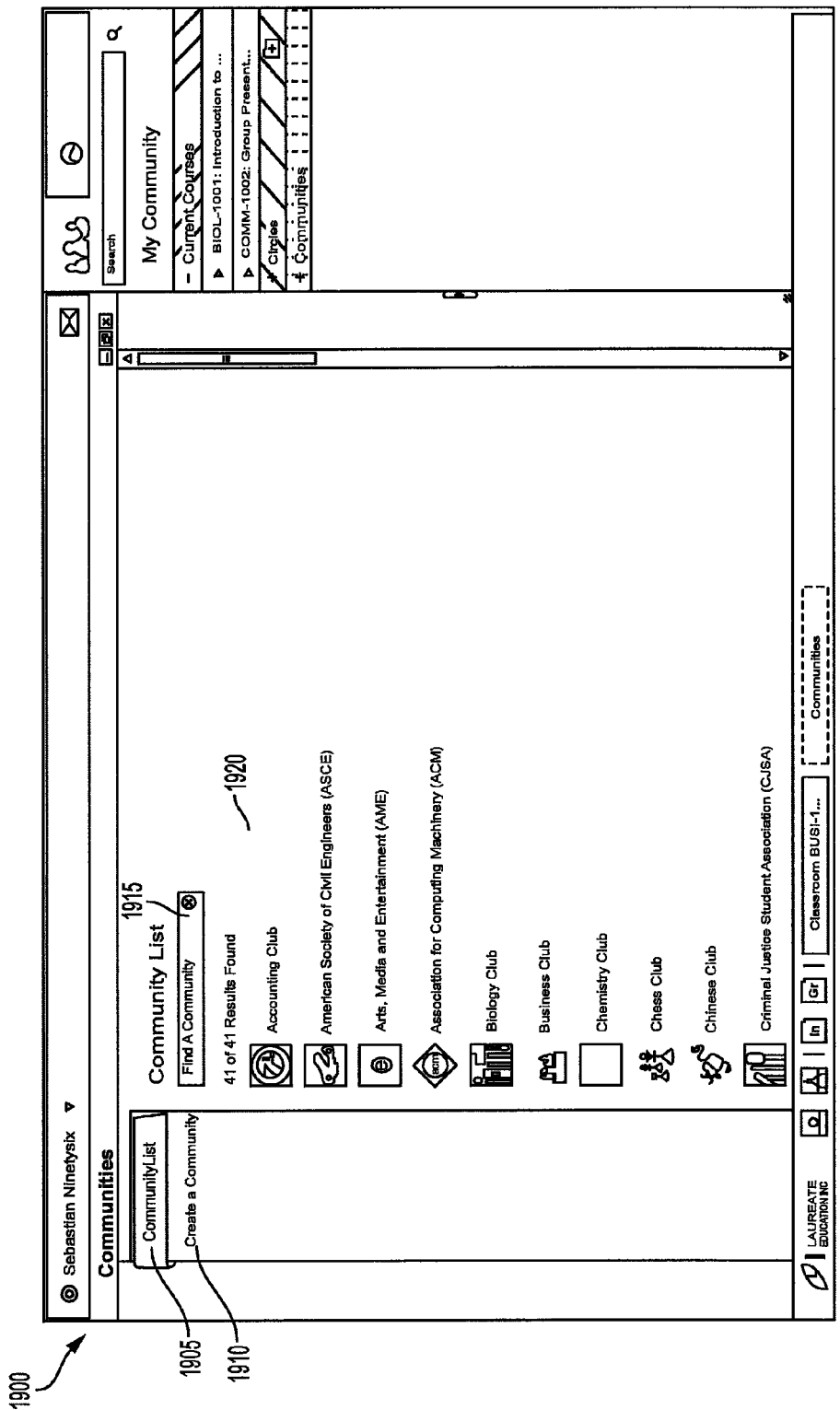

FIG. 19 depicts an exemplary interface 1900 in accordance with one or more embodiments. Interface 1900 may include a community list tab 1905, a create a community tab 1910, search field 1915, content area 1920, or any combination thereof. When community list tab 1905 is selected, content area 1920 may display search field 1915 and a list of communities. The list of communities may include the community names, descriptions, pictures, any information associated with the community, or any combination thereof. Clicking on one of the listed communities may take the user to a community page. The details of the community pages are detailed in the description of FIGS. 21-23. As a user enters text into search field 1915, the list of communities displayed in content area 1920 may be filtered to display only those communities that meet the search criteria.

Figure 20:
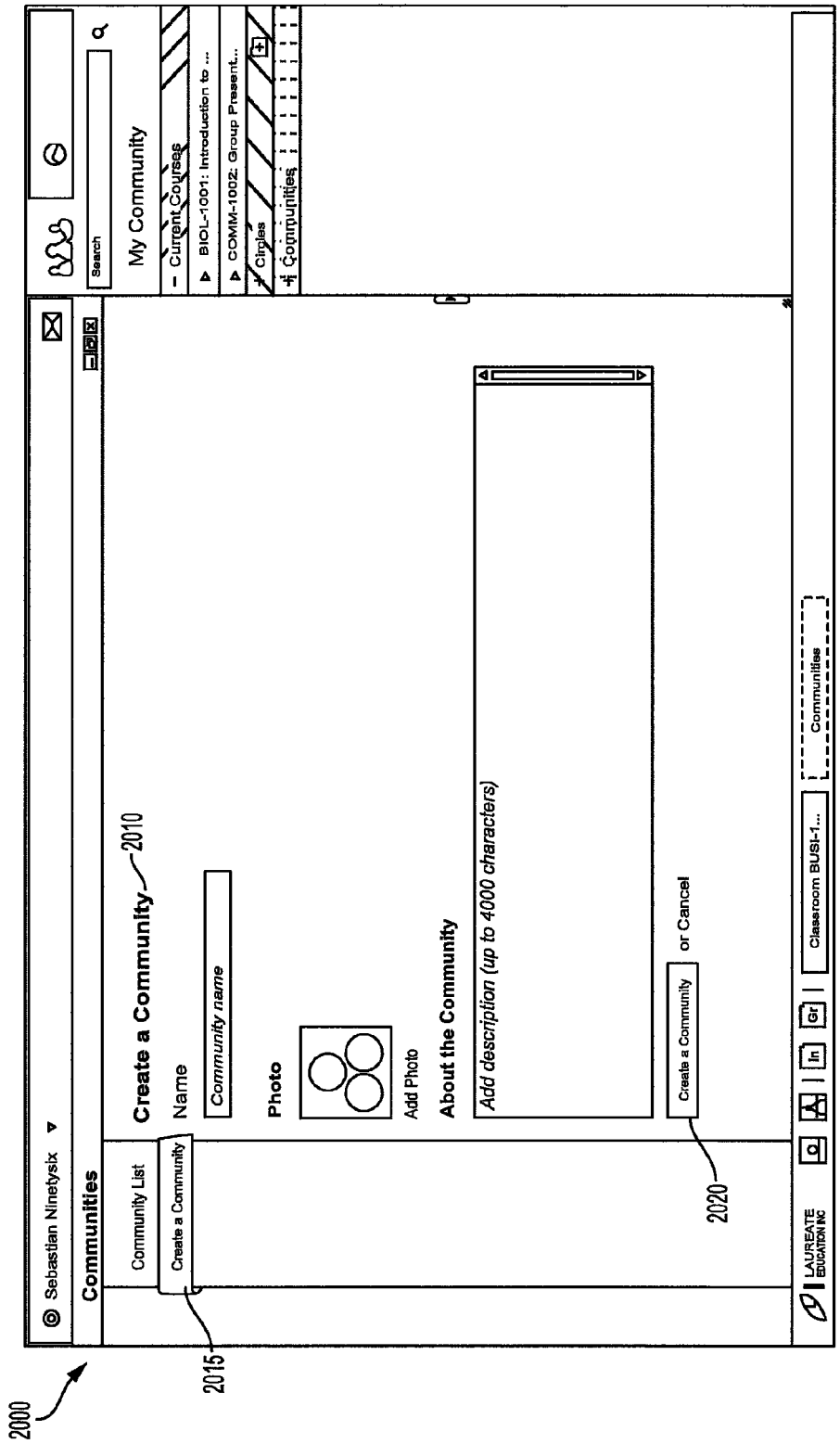

FIG. 20 depicts an exemplary interface 2000 in accordance with one or more embodiments. Interface 2000 may include content area 2010, create a community tab 2015, button 2020, or combinations thereof. When create a community tab 2015 is selected, content area 2010 may display a set of input fields with descriptions for creating a new community. The user may have the option to enter a name for the community, add a picture for the community, add a description for the community in the input fields displayed in content area 2010. The user may select the button 2020, which may instruct educational system 200 to create a community based on the information entered into the input fields displayed in content area 2010.

Community Sites

Figure 21:
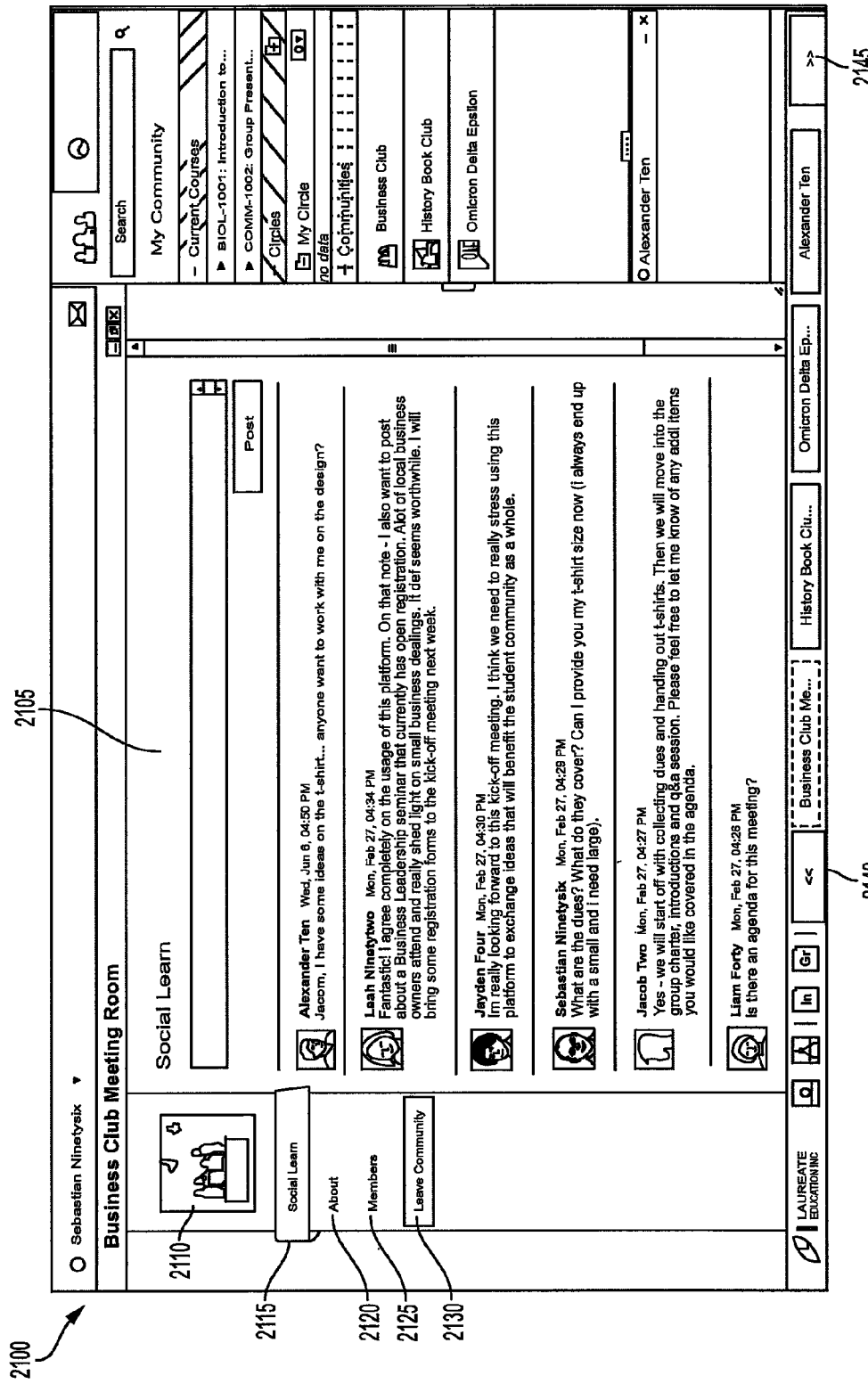

FIG. 21 depicts an exemplary interface 2100 in accordance with one or more embodiments. Interface 2100 may include content area 2105, community picture 2110, social learn tab 2115, about tab 2120, members tab 2125, leave/join community button 2130, or combinations thereof. When social learn tab 2115 is selected, content area 2105 may display social learning content. The social learning content are posts specific to the community. The posts may be created by the entering information into a text field in content area 2105 and either entering a keyboard return or selecting a post button in the content area 2105. A list of previous posts may be displayed in content area 2105.

The functionality of the leave/join community button 2130 may depend on the user's status. If a user is already a member of the community, leave/join community button 2130 will display text or a graphic indicating that the button may be used to leave the community. In this case, when the user selects the leave/join community button 2130, a request is sent to the educational system 200 and communities module 420 to remove the user from the community. Educational system 200 or an administrator may decide whether to allow the user to be removed from the community and whether to remove the user from the community. If a user is not a member of the community, leave/join community button 2130 will display text or a graphic indicating that the button may be used to join the community. In this case, when the user selects the leave/join community button 2130, a request is sent to the educational system 200 and communities module 420 to add the user to the community. Educational system 200 or an administrator may decide whether to allow the user to join the community and whether to add the user to the community.

Interface 2100 may include scroll buttons 2140 and 2145. Scrollbars may always be displayed or may only be displayed when there are too many taskbar items displayed in the taskbar to be viewed at the same time. Scroll buttons 2140 and 2145 may be used on any of the sites described herein in the same manner as described regarding interface 2100.

Figure 22:
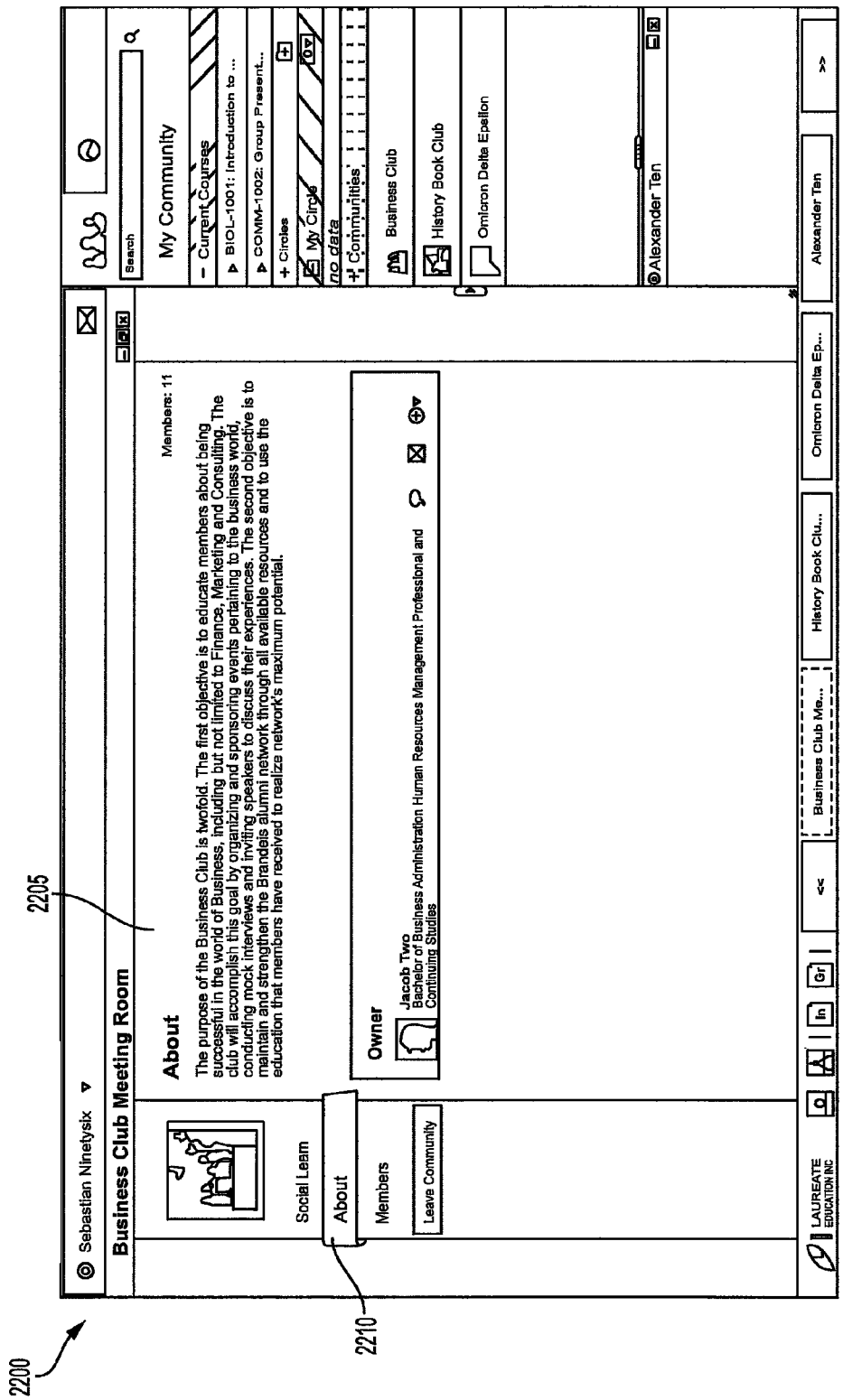

FIG. 22 depicts an exemplary interface 2200 in accordance with one or more embodiments. Interface 2200 may include content area 2205, about tab 2210, or combinations thereof. When about tab 2210 is selected, content area 2205 may display information about the community. Information about the club may include the name of the community, a picture symbolizing the community, information about the owner assigned to the community, or combinations thereof.

Figure 23:
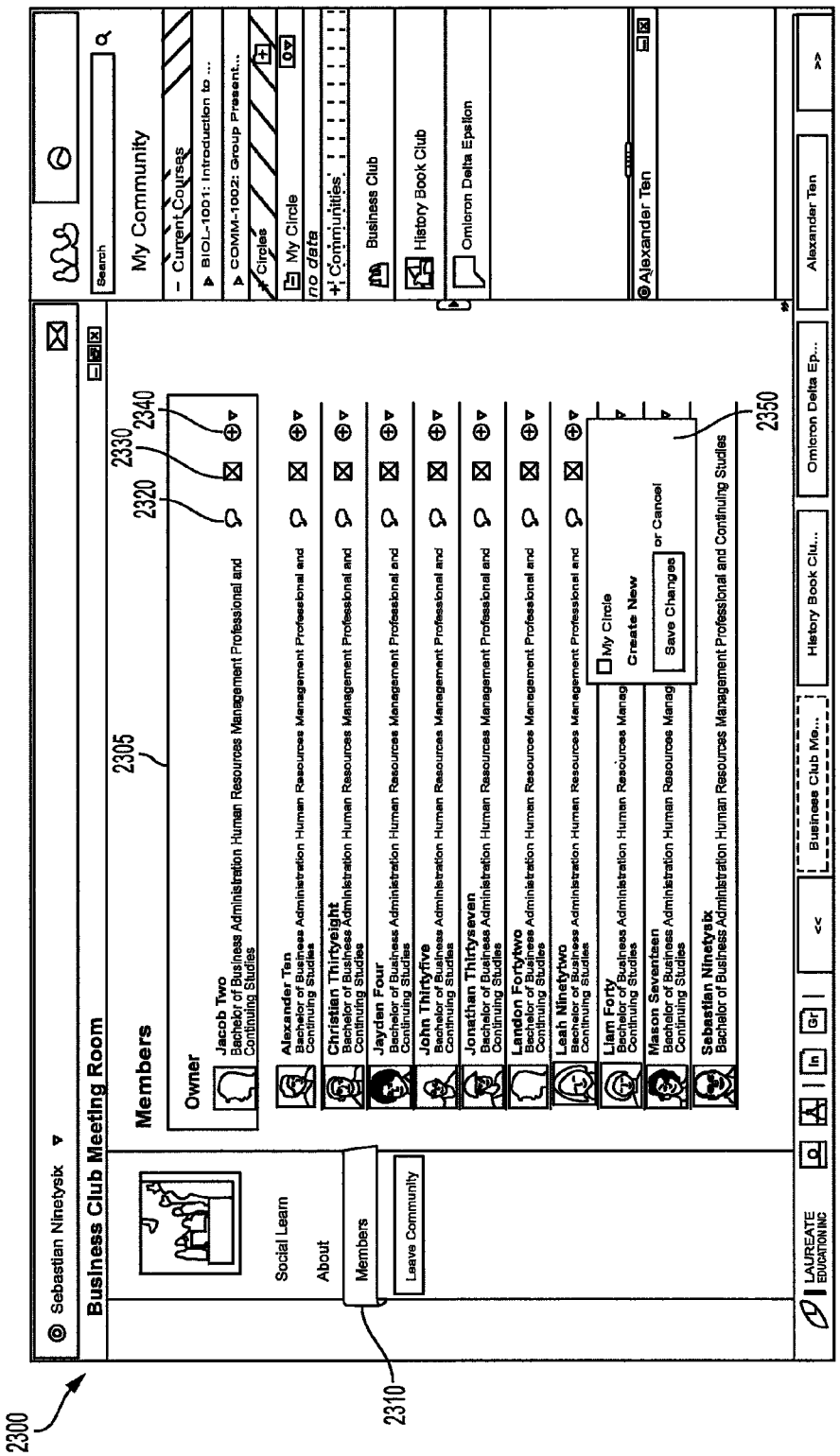

FIG. 23 depicts an exemplary interface 2300 in accordance with one or more embodiments. Interface 2300 may include content area 2305, members tab 2310, chat icon 2320, email icon 2330, circles icon 2340, quick add window 2350, or combinations thereof. When members tab 2310 is selected, content area 2305 may display information about the members of the group. In some embodiments, a roster of the members of the group is displayed. The roster includes pictures of each of the group members, names of the group members, descriptions of the group members, chat icon 2320, email icon 2330, and circles icon 2340. Selecting chat icon 2320 may start a chat associated with chat icon 2320. Selecting email icon 2330 may initiate the process of sending an email to the user associated with email icon 2330. Selecting circle icon 2340 may cause a quick add window 2350 to appear. Quick add window 2350 may function identically to quick add window 935 as previously described herein.

Course Navigator

Figure 24:
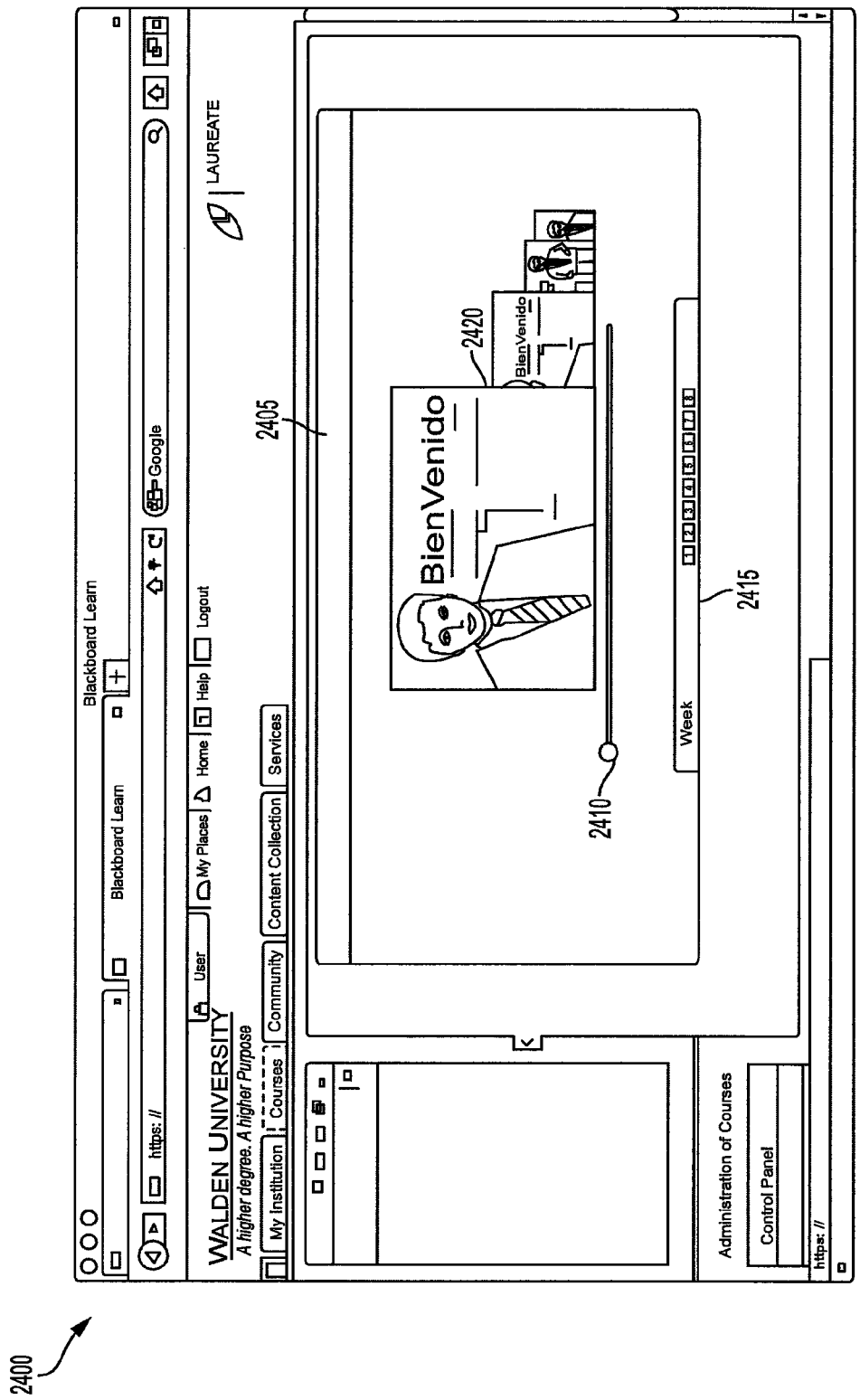

FIG. 24 depicts an exemplary interface 2400 in accordance with one or more embodiments. Interface 2400 may include course navigator window 2405, slider 2410, numbered links 2415, thumbnails 2420, or any combination thereof. Thumbnails 2420 may include one or more thumbnail images or video that each represent a unit of a timeframe for the course. For example, as shown in interface 2400, each image of thumbnails 2420 may represent a week in a course. The unit of a timeframe may be any measure of time. Clicking on or selecting any of the images of thumbnails 2420 may redirect the user to a course page associated with the unit of time of the course associated with the image.

When slider 2410 is moved by the user, thumbnails 2420 changes to reflect the movement of slider 2410. For example, when slider 2410 is moved one increment to the right, the next image of thumbnails 2420 may move to the foreground of course navigator window 2405 and may increase in size. The previous foreground image may decrease in size to reflect that it is not the focus designated by slider 2410.

Numbered links 2415 may allow a user to navigate to a to a course page associated with the point in time of the course associated with item selected. For example, as shown in interface 2400, the number of weeks of the course are displayed in numbered links 2415. If the user were to click on or select 8, the user would be redirected to the portion of the course page containing materials for week 8. Numbered links 2415 may allow students that are unable to interact with slider 2410 or thumbnails 2420, such as students with disabilities, to easily and directly access course materials for a given timeframe.

Calendar Dashboard

Figure 25:
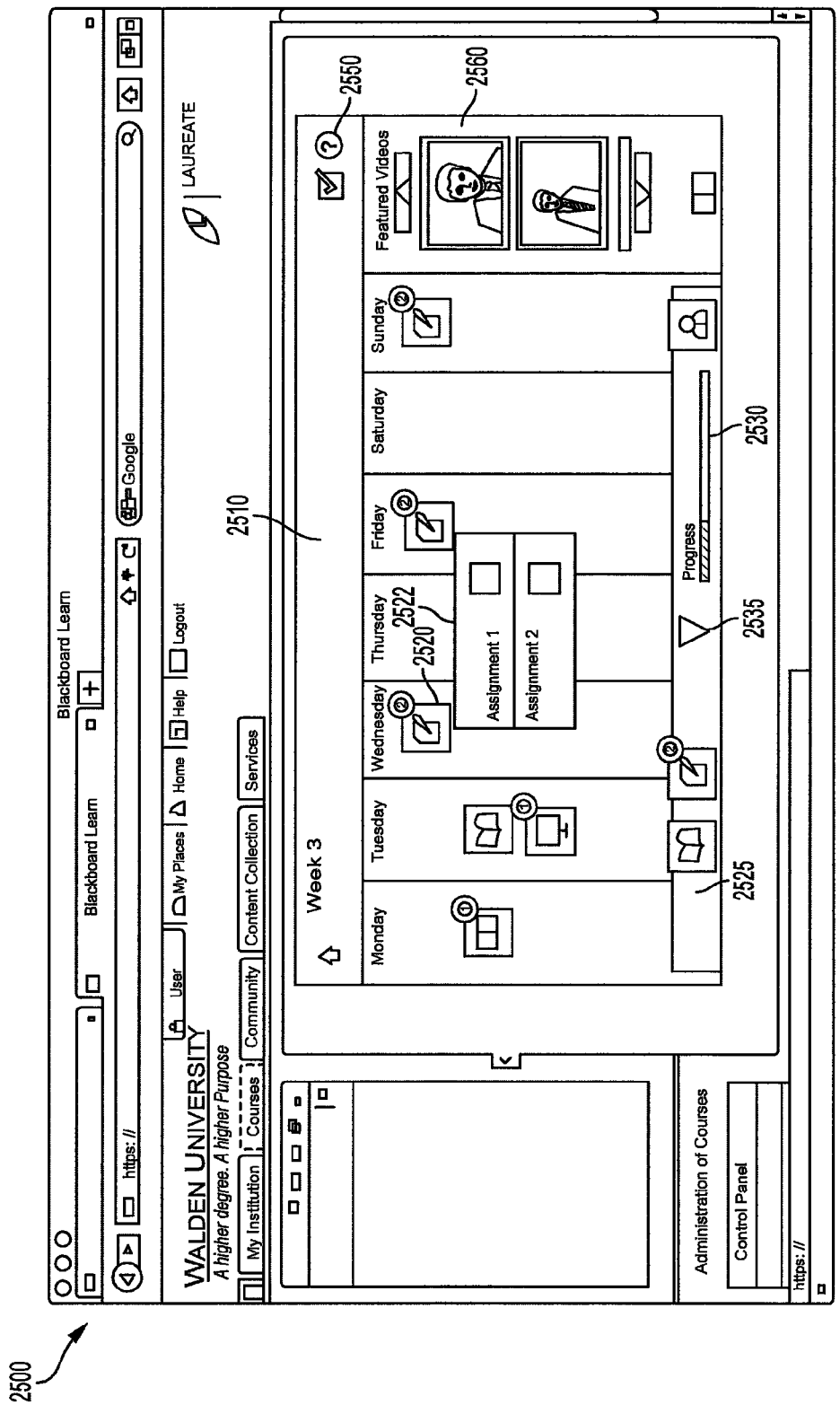

FIG. 25 depicts an exemplary interface 2500 in accordance with one or more embodiments. Interface 2500 may include calendar dashboard 2510, calendar icon 2520, details window 2522, status bar 2525, progress bar 2530, download button 2535, help button 2550, video display 2560, or any combination thereof. Calendar dashboard 2510 may display a calendar. The calendar may display items using any timeframe with any number of subdivisions, including but not limited to showing a week divided by days, a month divided by days, a day divided by hours, or any number of days divided by days, e.g., 3 days shown in day segments. For example, interface 2500 displays a week 3 of a course divided by days. Presenting course materials in a calendar format helps students to manage their assigned work throughout each week of the course.

Calendar dashboard 2510 may display one or more calendar icons, of which calendar icon 2520 is an example. Each calendar icon may include the properties or features discussed herein regarding calendar icon 2520. Calendar icon 2520 may have a graphic that indicates the type of content associated with calendar icon 2520. For example, interface 2500 depicts three types of graphics: a book, a video screen, and a paper and pencil. Each of these graphics may correspond to an activity. For example, the book may correspond to a reading, the video screen may correspond to a video, and the paper and pencil may correspond to an assignment or exercise. The graphic displayed by calendar icon 2520 may include these graphics or any other graphics that correspond activities associated with the course materials.

Calendar icon 2520 may include a badge. A badge may be an indicator attached to calendar icon 2520 that displays additional information, including a number, text, an icon, or any combination thereof. For example, in interface 2500 calendar icon 2520 includes a badge with the number '2' therein. A number within the badge may indicate the number of items of the type of course material associated with calendar icon 2520 that have yet to be completed, that have yet to be started, or any combination thereof. For example, in interface 2500 the badge on calendar icon 2520 may indicate that there are two assignments due and that have not been completed on Wednesday of week 3. Information about the status of course materials, including the amount of interaction a user has had with the course materials, may be stored in course material database 220, student database 225, portfolio database 230, or any combination thereof. Educational system 200 may update a user's status regarding course materials as the user interacts with or makes changes to the course materials. Because progress information is stored by educational system 200, users can work on multiple computers and in multiple browsers and receive accurate and up-to-date information about their progress.

Selecting or clicking calendar icon 2520 may cause details window 2522 to be displayed. Details window 2522 may contain a checklist of the activities associated with calendar icon 2520. For example, in interface 2500 details window 2522 may display the two assignments associated with calendar icon 2520. If the user clicks on the box containing the activity, a check may appear in the box associated with the activity, the badge on calendar icon 2520 may be decremented to reflect the change in the number of outstanding items or disappear complete if all the items associated with calendar icon 2520 have been completed, progress bar 2530 may be updated to reflect the change in status of the activity, educational system 200 may store the status in one of the databases, or any combination thereof. Selecting an already completed activity may have the reverse effect of incrementing the number on the badge, updating progress bar 2530 to reflect the change in status of the activity, educational system 200 may store the status in one of the databases, or any combination thereof. Additionally or alternatively, clicking on calendar icon 2520 may cause the user to open the related content in a new window or tab.

Status bar 2525 may include a set of calendar icons that represent types of activities that are associated with the timeframe. For example, in interface 2500 there are two calendar icons representing two types of activities associated with week 3. Progress bar 2530 may indicate a user's progress in completing activities. Progress bar 2530 may indicate the user's progress with activities associated with the currently selected timeframe, another timeframe, progress in the course, or any combination thereof. As a user interacts with educational system 200, including interacting with the elements described in interface 2500, progress bar 2530 may change to reflect the corresponding change in progress.

Download button 2535 may be displayed anywhere on calendar dashboard 2510. When download button 2535 is selected, educational system 200 may provide the user with a set of materials for the selected timeframe to download. For example, in interface 2500 the user may receive a download of all the course materials associated with week 3. The download may include a checklist that lists all of the assignments or activities associated with the timeframe, a zipped file of all of the available course materials associated with the timeframe, or any combination thereof. The ability to easily and quickly download course materials with as little as one click is particularly useful for users that may have limited access to the network or lack reliable network access. The ability to efficiently download course materials for a given timeframe also allows the user to utilize the materials without having to be connected to educational system 200.

When help button 2550 is selected, educational system 200 may provide the user with access to tutorials about the interface. The tutorials may take the form of videos, web pages, documents, or any combination thereof. The tutorials may be accessible to users anytime throughout the academic program, not only during the student orientation.

Video display 2560 may provide the user access to featured videos. Featured videos may be videos or content that are particularly relevant to the material associated with the selected timeframe displayed in calendar dashboard 2510. Educational system 200 may change the featured videos shown in video display 2560 based on the user's progress, changes in course materials, the user's interactions with elements in interface 2500, or any combination thereof.

A link may be present on any of the pages described herein that allows the user to toggle between two or more of the course home panel, calendar dashboard, course list view, any other course viewing page described herein, or any combination thereof.

Calendar icon 2520 may be moveable by the user anywhere in interface 2500 by the user. For example, in interface 2500 the user may click on calendar icon 2520 and use a mouse or any other input device or technique to move calendar icon 2520 to another day. The user may move calendar icon 2520 so that the user can schedule course activities at a time more conducive to the user's wants or needs. A user may move calendar icon 2520 to any day, the user may be limited to moving calendar icon 2520 to a time earlier than the previously scheduled time, or any combination thereof.

The user may create one or more additional calendar items to the schedule displayed in interface 2500. For example, the user may have an important event, like the user's mother's birthday, on Saturday. The user may press a button to start the creation of another calendar item. The user may then specify a date, time, name, location, any other event or activity information, or any combination thereof. The system will then create a calendar icon corresponding to the entered information. The user may create additional calendar items event so that the user has a better idea of how to schedule course events, and how to manage the user's time to best meet the course objectives as well as personal commitments.

Course Home Panel

Figure 26:
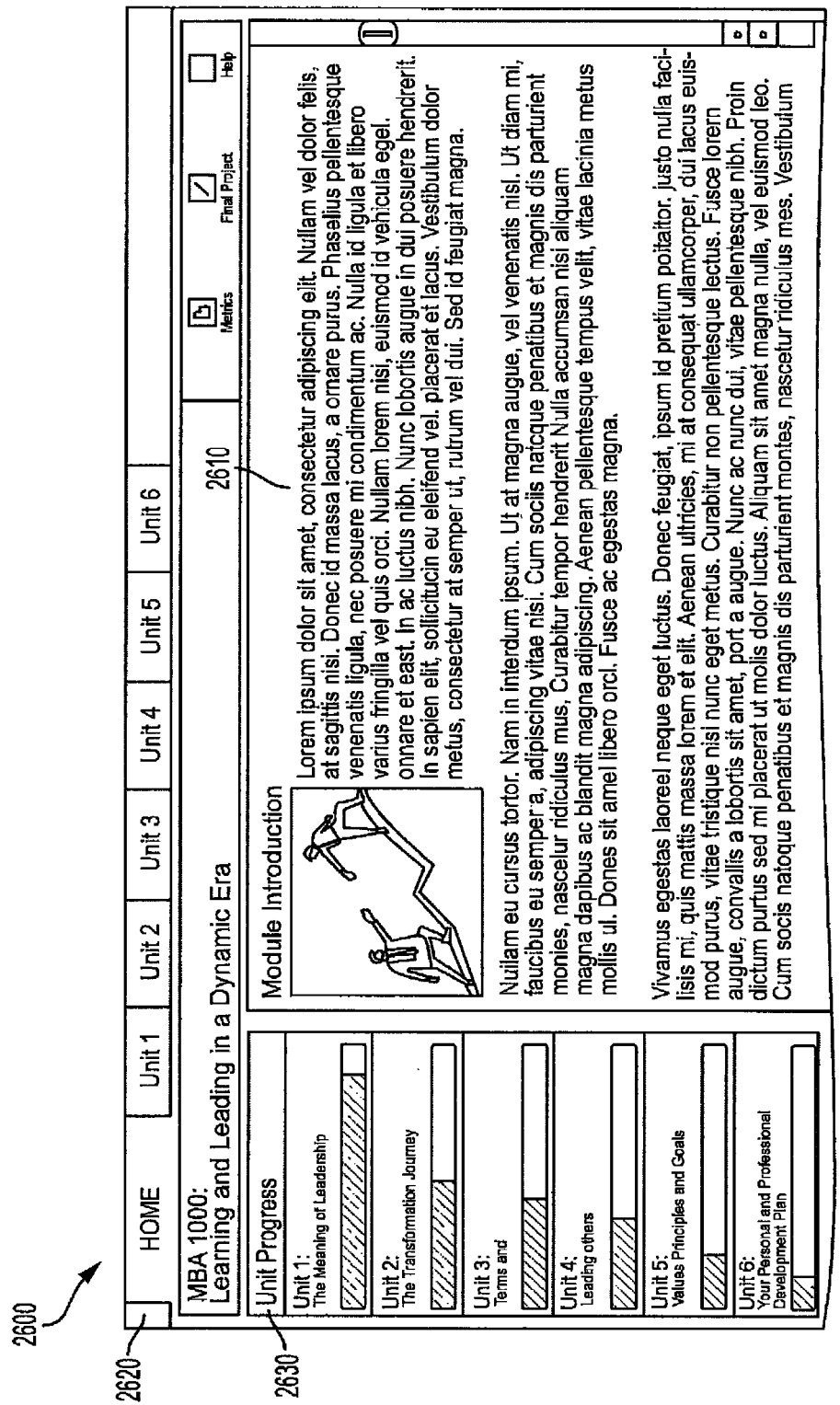

FIG. 26 depicts an exemplary interface 2600 in accordance with one or more embodiments. Interface 2600 may include content display 2610, navigation bar 2620, progress display 2630, or combinations thereof. Navigation bar 2620 may provide a set of links representing a home link to content overview, links to each unit, or any combination thereof. A unit may represent a portion or a segment of a timeframe Content display 2610 may display content associated with the unit or timeframe selected in navigation bar 2620. Progress display 2630 may display a user's progress in completing activities associated with a unit or all of the units. Progress display 2630 may indicate the user's progress with activities associated with the currently selected unit, another unit, progress in the course, or any combination thereof. As a user interacts with educational system 200, including interacting with the elements described in interface 2600, progress display 2630 may change to reflect the corresponding change in progress.

Course List View

Figure 27:
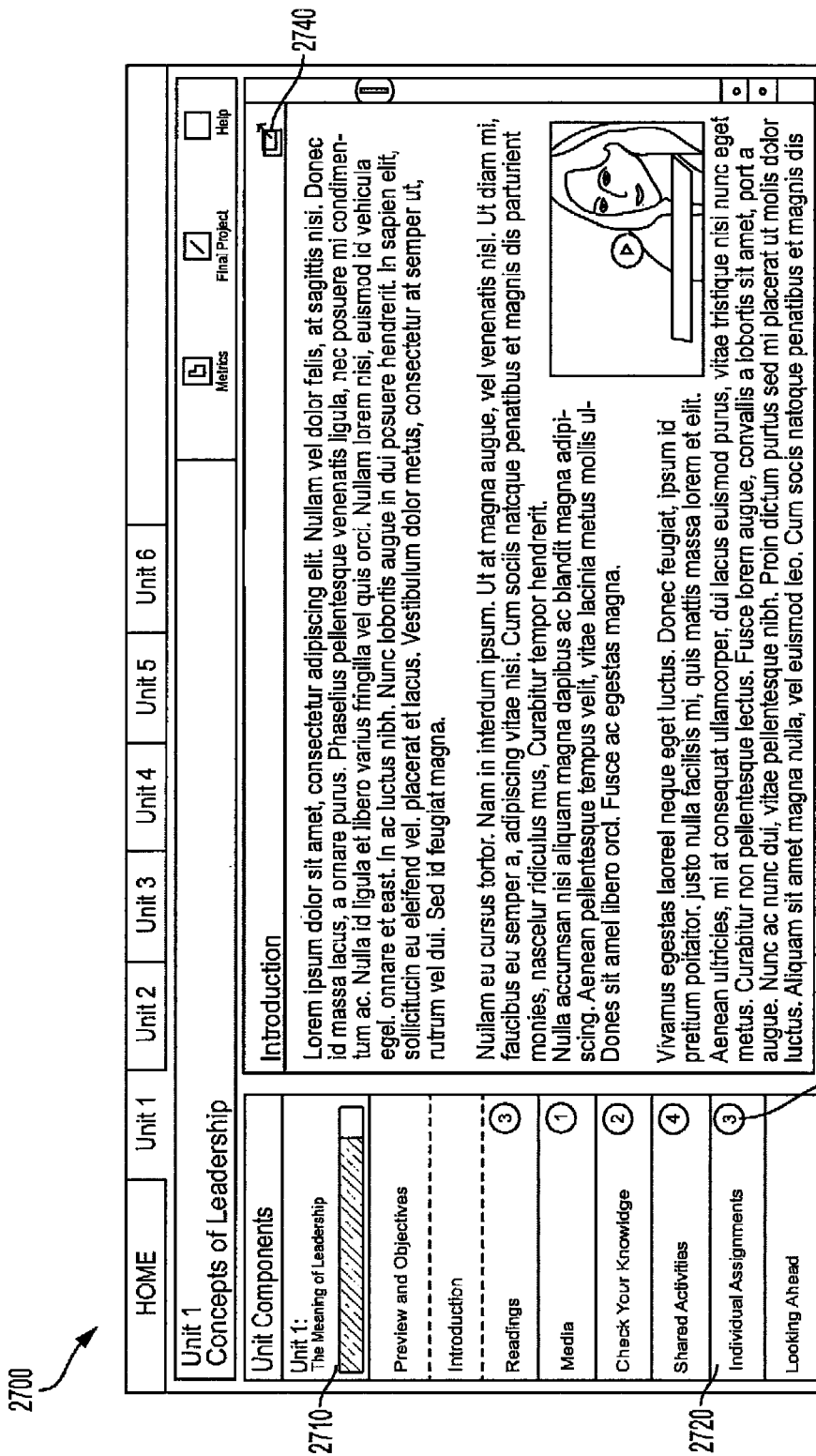

FIG. 27 depicts an exemplary interface 2700 in accordance with one or more embodiments. Interface 2700 includes progress display 2710, activity summary display 2720, badge 2730, pop-out button 2740, or any combination thereof. Progress display 2710 may display a user's progress in completing activities associated with a unit or all of the units. Progress display 2710 may indicate the user's progress with activities associated with the currently selected unit, another unit, progress in the course, or any combination thereof. As a user interacts with educational system 200, including interacting with the elements described in interface 2700, progress display 2710 may change to reflect the corresponding change in progress.

Activity summary display 2720 may display a number of types of activities. The types of activities may include any instructional content or activity offered by educational system 200. Examples of activities include viewing an introduction, readings, media, check your knowledge exercises, shared activities, and individual assignments. Selecting a type activity displayed in activity summary display 2720 may cause the user to be directed to a page that includes the materials associated with the activity type.

Each type of activity displayed may include a badge 2730. Badge 2730 may display additional information, including a number, text, an icon, or any combination thereof. For example, in interface 2700 badge 2730 has a number '3' within it. A number within the badge may indicate the number of items of the type of course material associated activity type that have yet to be completed, that have yet to be started, or any combination thereof. For example, in interface 2700 badge 2730 may indicate that there are three individual assignments due and that have not been completed for Unit 1. Information about the status of course materials, including the amount of interaction a user has had with the course materials, may be stored in course material database 220, student database 225, portfolio database 230, or any combination thereof. Educational system 200 may update a user's status regarding course materials as the user interacts with or makes changes to the course materials. Because progress information is stored by educational system 200, users can work on multiple computers and in multiple browsers and receive accurate and up-to-date information about their progress.

When selected, pop-out button 2740 may cause the content currently being viewed in the pane associated with the pop-out button 2740 to be displayed in a new browser window or tab. Pop-out button 2740 may be present on and used with any of the pages described herein.

In some embodiments, the calendar dashboard, course home panel, and course list view may include any combination of features described in section entitled "Laureate Classroom Navigator and Weekly Dashboard Functional Specifications."

Many of the techniques described herein have focused on displaying information specific to a particular course. In some embodiments, the information displayed using any of the display formats described herein may display any other logical grouping of information. For example, a student may view a number of courses and course activities when using the calendar dashboard, course home panel, course list view, any other interface described herein, or any combination thereof.

Portfolios

Educational system 200 may allow an entity access to portions of a student's educational history. The portfolio may be a collection or summary of a student's work or educational history. In some embodiments, the portfolio would not include all aspects of a student's history, but only a summary of the student's history.

Educational system 200 may provide an external portfolio web site having a URL or other form of internet address. The URL or internet address may be specific to a student or provide general access to student portfolios. A student could use the external portfolio web site to share the student's portfolio with an entity. In some embodiments, the entity could be an employer, a potential employer, another learning institution, alumni, friends, family, any party interested in learning about the student's achievements, or combinations thereof. An entity may use the URL or internet address to access the external portfolio web site. The entity may need to supply credentials, including a username, password, PKI, or combination thereof to access the portfolio associated with the URL or internet address. The credentials may be associated with a particular student. The student may supply the credentials to the entity. Policies module 445 may compare the entered credentials associated with the URL, internet address, or student with credentials associated with the URL, internet address, or student in security database 240. If the credentials match, the entity may be provided access to an web site displaying the student's portfolio. External portfolio module 455 may manage the aspects related to providing an external portfolio as described herein.

Several benefits are provided by providing access to a portfolio to an entity. First, the entity would not have to rely on a student-supplied resume but could instead access a institution-supplied record of student work and progress. Second, because the information would be managed by the institution, the site and portfolio would not be subject to falsification and would provide an authoritative record to the entity about the student.

Educational system 200 may provide an internal portfolio web site having a URL to users of the system. An internal portfolio may store all of the materials a user has worked on for courses. Through the internal portfolio web site, a user can share portions of the portfolios with other users. A user may be presented with an interface that allows the user to select, for each potential portfolio element, whether the item is included or excluded from the portfolio to share. Each user may create any number of portfolios to share. A user, community, or circle may create portfolios to share. A user, community, or circle may share portfolios with another user, community, circle, or combinations thereof. The same techniques for ranking, commenting on, and distributing educational content described in Laureate Education Inc.'s U.S. Patent Publication No. 2009-0311658 A1 may be used to rank, comment on, and distribute portfolios. Users may rank or comment on the usefulness of shared portfolio material, which provides the benefit of allowing users to quickly identify the most useful or most relevant shared portfolio material.

Worldwide Integration

Connection layer module 450 may manage the connection between a network of institutions. As discussed above in the context of educational system 200, the network of institutions may include foreign and domestic institutions. Connection layer module 450 may manage the interactions of users in different institutions or countries based on rules stored in student database 225, social network database 235, or security database 240. In one embodiment, all users may freely communicate with all other users.

In other embodiments, a user may be restricted in a manner from communicating with another user. The restrictions may be based on rules or flags set store in student database 225, social network database 235, or security database 240. The rules or flags may include prohibiting interactions, chatting, viewing profiles, viewing stream updates, any other interaction made possible by education system 200, or any combination thereof. The restriction may be based on a user's age, location, nationality, course of study, progress, institutional policy, any information stored in the databases of the system, or any combination thereof. For example, connection layer module 450 may prevent users from two separate countries from seeing each other's' presence on educational system 200. In another example, the connection layer module 450 may prevent users over a certain age from chatting with users under the certain age.

Connection layer module 450 may translate communications from a first user in a first language into second language for a second user. Connection layer module 450 may review any or all of the communications in educational system 200. Connection layer module 450 may determine that the first user is communicating in a first language based on the communications coming from the first user or from language settings associated with the second user. Connection layer module 450 may determine that the second user is communicating in a second language based on the communications coming from the second user or from language settings associated with the second user. If the connection layer module 450 determines that the first and second languages are different, the connection layer module 450 may use machine translation techniques to transfer messages from the first user into the second language for the second user, to transfer messages from the second user into the first language for the first user, or any combination thereof.

An online learning management system, such as any of those described herein, may provide courses to users that speak different languages or are located in different countries around the world. Based on differences between laws in different regions, business reasons, or other considerations, a user may be restricted in a manner from communicating with another user. The restrictions may be based on rules or flags stored by the system. The rules or flags may include prohibiting interactions, chatting, viewing profiles, viewing stream updates, any other interaction made possible by the system. The restriction may be based on a user's age, location, nationality, course of study, progress, institutional policy, or any other information stored in the databases of the system. For example, the system may prevent users from two separate countries from seeing each other's presence on the educational system. In another example, the system may prevent users over a certain age from chatting with users under the certain age.

The educational system may also translate course materials or communications from a first user in a first language into second language for a second user. The system may review any or all of the communications in system and may determine that the first user is communicating in a first language based on the communications coming from the first user or from language settings associated with the first user. The system may also determine that the second user is communicating in a second language based on the communications coming from the second user or from language settings associated with the second user. If the system determines that the first and second languages are different, the system may use machine translation techniques to translate messages from the first user into the second language for the second user, to translate messages from the second user into the first language for the first user, or any combination thereof.

The education system may comprise a server, a database, and a networking service. The server may be configured to create corresponding learning environments on a plurality of geographically dispersed remote student workstations located in a plurality of regions for delivery of instructional material from the server to a corresponding plurality of students after the server authenticates student log-ins. For example, a first student may be located in a first region, e.g. USA, a second student may be located in a second region, e.g. Russia, a third student may be located in a third region, e.g. Chile, and so on. The region may be any of a country, nation, state, region, province, any geographically identifiable area, or any combination thereof. A region may also be an area defined by a language spoken in the region, by religion, by ethnicity, etc. Each of the created learning environments may display a user interface on a remote student workstation located in a region of the plurality of regions.

The database may store a plurality of region profiles. Each region profile may contain information specifying rules associated with communication of information between a first region and another second region.

The networking service may be in communication with the server and may be configured to communicate messages amongst the geographically dispersed remote student workstations located in the plurality of regions in accordance with the plurality of region profiles. The message may be any type of message or communication, including any of those discussed herein. For example, the messages may include at least one of a message from a student, a message to a student, a student profile, a status of a student, a stream update, or an instructional material.

The profiles provide flexibility in being able to craft policies specific to various regions, and several possible configurations are possible. A rule of at least one region profile may prevent communication of messages between a first student in a first course and a second student in a second course. A rules of at least one region profile may prevent communication of messages between a first student in a first region and a second student in a second region. A rule of at least one region profile may prevent communication of messages between a first student of a first educational institution and a second student of a second educational institution. For example, students from a first college may be prevented from interacting with students in a second college. A rule of at least one region profile may prevent communication of messages between a student over a certain age and a student under the certain age. A rule of at least one region profile may prevent communication of messages between a first country and a second country.

A rule of at least one region profile may cause a message in a first language of a first region to be translated into a second language of a second region. The message may be translated using a machine translation technique, and may occur in real-time. For example, messages of a chat session between two users speaking different languages may be translated by the system during the chat session. Similarly, updates to a stream or activity stream may be translated so that the stream displays the translated messages. Language settings for the user may be set in the user profile.

Policies for Filtering or Analyzing Communications

Policies module 445 may implement policies to filter information that is posted or groups that are created for inappropriate content. Policies module 445 may receive a policy that is stored in student database 225, social network database 235, or security database 240. The policy may specify topics or words that are inappropriate content. Policies module 445 may review any or all of the communications in educational system 200, and if the communication contains inappropriate content as defined by the policy, policies module 445 may alter, redact, remove, replace, or delete the communication.

Policies module 445 may analyze communications to identify topics that students are confused out. In some embodiments, policies module 445 may receive a topic that is stored in student database 225, social network database 235, or security database 240. Policies module 445 may review any or all of the communications in educational system 200, and if a number of communications exceeds a threshold, the policies module 445 may identify the topic as a topic of confusion.

In other embodiments, policies module may determine topics by summarizing content provided one or more users. If a number of instances of topics exceeds a threshold, the policies module 445 may identify the topic as a topic of confusion. Alternatively, the content of the system may also be analyzed by using the summarization techniques described herein. All or portions of the content of educational system 200, including but not limited to course materials, posts, contacts, and emails, may be summarized to provide a number of instances of topics of the educational system 200. If the number of topics exceeds a threshold, and the threshold is given as a different between the number of instances of a topic detected content provided by one or more users and the number of instances of a topic detected when summarizing content of the system, the policies module 445 may identify the topic as a topic of confusion.

If a topic of confusion is identified, policies module 445 my send a communication through educational system 200. The communication may include an email, a post to a stream, a post to a community, a chat with a user, any communication type available for users of the system, or any combination thereof. The communication may be received by a user, an instructor, or educational system 200.

Policies module 445 may discover unauthorized communication between students. The unauthorized communication may include cheating, sharing answers, sharing assignments, sharing other course materials, or any combination thereof. Policies module 445 may receive a policy that is stored in student database 225, social network database 235, or security database 240. The policy may specify objects that are unauthorized content. Unauthorized content may include test answers, tests, course materials, assignments, or any combination thereof. Policies module 445 may review any or all of the communications in educational system 200, and if the communication contains objects that are unauthorized content, policies module 445 may alter, redact, remove, replace, or delete the communication. Further, policies module 445 may send a communication to an instructor or user that the unauthorized communication has been detected. The sent communication may also include an indication of the unauthorized object that had been shared.

Cheating Prevention

An online learning management system, such as any of those described herein, may include social networking features that allow students, faculty, or other users to communicate with one other while using other features provided by the system. The system may include a policy that specifies objects that are unauthorized content. Unauthorized content may include test answers, tests, course materials, or assignments. The system may monitor any or all of the communications in the system, and if the communication contains objects that are unauthorized content, the system may alter, redact, remove, replace, or delete the communication. Further, the system may send a communication to an instructor or user that the unauthorized communication has been detected. The sent communication may also include an indication of the unauthorized object that had been shared.

The learning management system may comprise a server, such as any of those described herein, configured to create a learning environment on a remote student workstation or accessible by a remote station for delivery of instructional material to a student after the server authenticates a student log-in. The created learning environment may display a user interface, such as any of those described herein, to the student on the remote student workstation. The user interface may be used to interact with an instructional material when the student enters into a learning session associated with a course.

A networking service in communication with the server may communicate messages to or from the student from within the learning environment. The messages may comprise any type of communication or message, include any of those or any combination of those described herein. The communication of messages with the student may be monitored to determine whether a message contains an unauthorized content. Unauthorized content may be any item specified by the system as content that is not authorized to be transmitted. Not being authorized may be depended on the content itself, the potential recipient of the content or message, the transmitter of the content or message, or any combination thereof.

Several possible actions may be taken by the system after detecting unauthorized content in messages. The message containing the unauthorized content may be deleted, the message containing the unauthorized content may be redacted, the unauthorized content may be deleted from the message prior to being received by the recipient, the unauthorized content may be redacted from the message prior to being received by the recipient, or any combination thereof.

Upon detection of an unauthorized content, an alert message may be transmitted. For example, an alert message may be transmitted to an instructor associated with the course, an assessor associated with the course, a faculty member associated with the course, a course developer associated with the course, a or any combination thereof. Additionally or alternatively, the alert may be transmitted to the student.

The alert may contain one or more of the following: the unauthorized content, the identity of the sender, the identity of the intended recipient, the identity of any user that may have been exposed to the message and/or unauthorized content, or time and/or date of the communication.

Calendaring Based on Reference Date

An online learning management system, such as any of those described herein, may provide courses to users. The courses may be structured to have particular learning activities performed by the users by particular deadlines, e.g. turning in homework by a certain time, taking a test before a certain date, completing reading assignments, etc. In order to provide flexibility in implementing courses with potentially varying start dates, the system may include a course framework that includes relative deadlines for when tasks are due. The course frameworks may resemble those used in the master course model of developing courses. For example, a relative deadline may specify that a particular homework assignment is due on the third day of the second week of the course. When a user begins a course or a course start date is otherwise determined, the system may transform the relative dates into specific dates. For example, given a course start date of Jan. 6, 2013, the system may translate the relative date mentioned above into Jan. 15, 2013. The system may then provide the course using the specific dates. Course materials with specific dates may also be provided to users as a calendar, e.g. an .ics calendar file. When transforming relative dates into specific dates, the system may schedule around potential conflicts, such as holidays, weekends, breaks, designated reading periods, or any other date specified. For example, the framework may recognize that certain dates fall on or after July 4, and then move each of those dates on or after July 4 ahead one day.

For example, when an individual instructor creates an online course, he/she can specify exact dates when assignments are due. When online courses are centrally created and used for up to 5 years, and when those courses are re-used in multiple classrooms over multiple terms, due-dates become far more complicated. The system may be able to calculate learning activity due dates based on the following values: term-start date, the number of weeks after term-start on which the learning activity is due, the number of days after the beginning of the week on which the learning activity is due, or any combination thereof.

The system may be capable of displaying the learning activity-due dates in a calendar format within the Learning Management System. This system may also be capable of generating calendar files that could be exported to the student's preferred calendaring system, such as Microsoft Outlook or Google Calendar.

When an individual instructor creates an online course, he/she can specify exact dates when learning activities are due. When online courses are centrally created and used for up to 5 years, and when those courses are re-used in multiple classrooms over multiple terms, due-dates become far more complicated. The system is be able to calculate learning activity due dates, e.g. based on the following values: term-start date, the number of weeks after term-start on which the assignment is due, the number of days after the beginning of the week on which the assignment is due, or any combination thereof.

This system would be capable of displaying the learning activity due dates in a calendar format within the Learning Management System. This system would also be capable of generating calendar files that could be exported to the student's preferred calendaring system such as Microsoft Outlook or Google Calendar In some embodiments, a learning management system may comprise a database and a learning system, such as those discussed herein. The database may store a framework, e.g. a course framework. The framework may comprise a sequence of learning units that are associated with a reference calendar for completion of the learning activity relative to a reference date. The reference calendar may specify a reference due date for completing a learning activity associated with a learning unit of the sequence of learning units, in which the reference due date is relative to the reference date. For example, as discussed above, a learning activity may be associated with a reference due date of the second week of a course. A learning activity may be an assignment associated with a learning unit.

Figure 28:
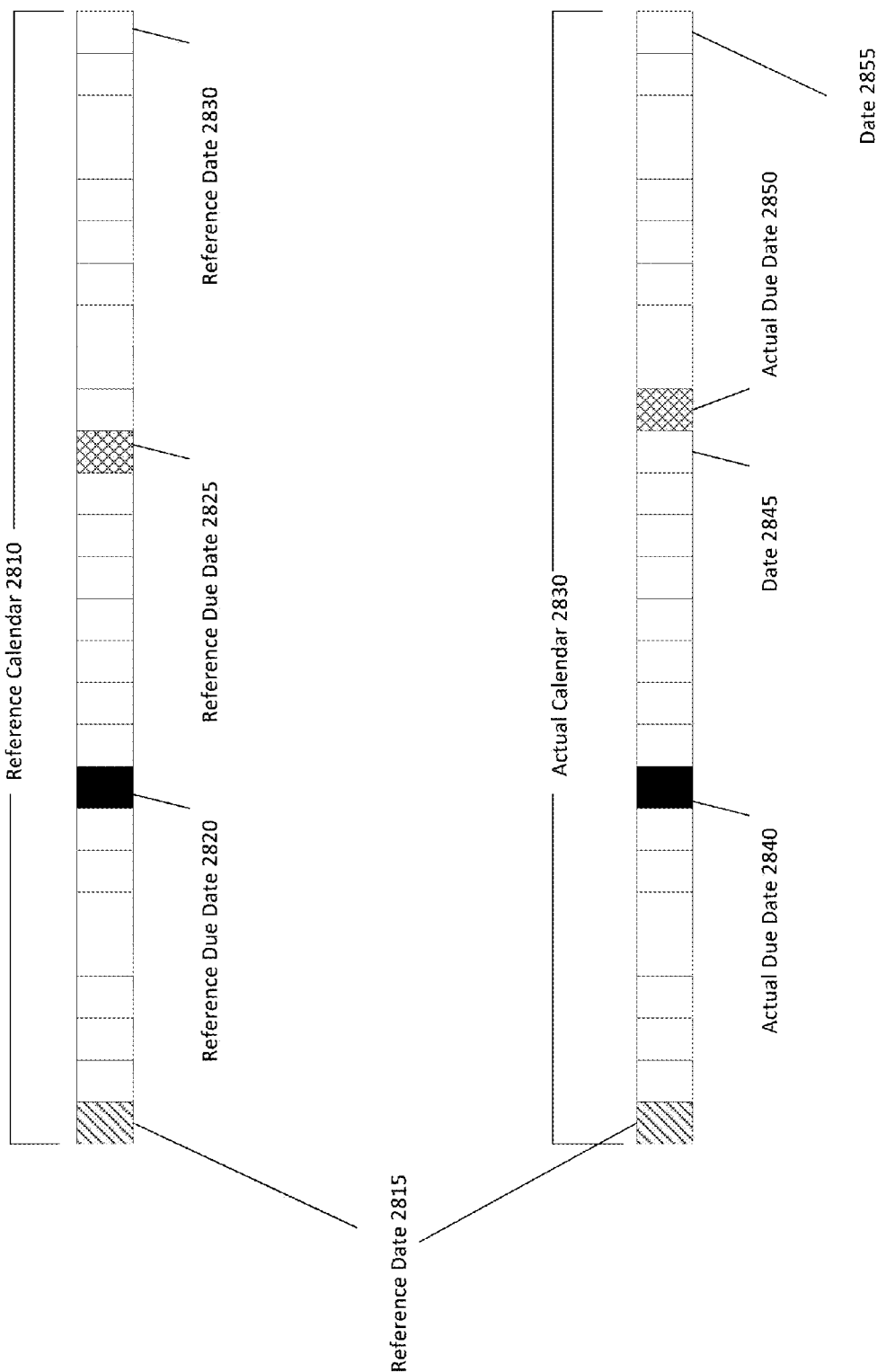
FIG. 28 depicts exemplary calendars in accordance with one or more embodiments.

FIG. 28 depicts exemplary calendars in accordance with one or more embodiments. FIG. 28 may include reference calendar 2810 and actual calendar 2830. Reference calendar may include a plurality of dates, including reference date 2815, reference due date 2820, reference due date 2825, and reference date 2830. Reference date 2815 may provide a frame of reference from which other dates, e.g. reference due dates 2820 and 2825 may be measured. Reference due dates 2820 and 2825 may be dates on which a learning activity is associated. For example, a quiz may be due on reference due date 2820, and an assignment may be due on reference due date 2825. For example, reference due date 2820 may be 8 days after reference due date 2815.

The learning system may be configured to display a learning environment for delivery of instructional material associated with the sequence of learning units to a remote student workstation after the learning system authenticates a student at the remote student workstation. The displayed learning environment comprises a user interface displayed to the student, e.g. any of the user interfaces described herein. The user interface may display an actual due date for completing the learning activity, in which the actual due date is derived from the reference due date.

Deriving the actual due date from the reference due date may be determined in various ways. The actual due date may be determined by adding or subtracting the period of time between the reference due date from the reference date of the reference calendar to the reference date of the actual calendar to arrive at the actual date. Referring to FIG. 28, actual calendar 2830 may include a plurality of dates, including reference date 2815, actual due date 2840, date 2845, actual due date 2850, and date 2855. The dates of actual calendar 2830 may be real calendar dates. For example, date 2845 may correspond to Jul. 4, 2013, date 2850 may correspond to Jul. 5, 2013, and so on. Reference date 2835 may correspond to the beginning of reference calendar 2810, i.e. 2815. Actual due date 2840 may be determined to be the date that is the same amount of time from reference date 2815 as reference due date 2820 is away from date 2815.

In some embodiments, the determined actual due date may be modified based on a an adjustment date. The actual due date may be based on an adjustment date on an actual calendar. For example, the adjustment date may be based on a least one of a day of a week, a day of a month, or a day of the year. For example, the day of a week may be the fifth day of the week, a Tuesday, etc. A day of a month may be the fifth day of the month, the second Tuesday of the month, the first day of the second week of the month, etc. Similarly, a day of the year may be specified using any technique for identifying a day during the year.

The adjustment date may be used in various ways. An adjustment date may specify that a particular day is not to available for scheduling an actual due date. For example, if a relative due date, after being paired with a starting date, would result in the actual due date landing on a holiday, e.g. July 4, then specifying July 4 as an adjustment date may result in the actual date being scheduled on a different day, e.g. July 3 or July 5. In one or more embodiments, an adjustment date may be removed consideration as an actual due date when determining the actual due date.

Referring again to FIG. 28, date 2845 may be an adjustment date. Adjustment date 2845 may be a holiday, e.g. July 4. Adjustment date 2845 may be determined to be the date that is the same amount of time from reference date 2815 as reference due date 2825 is away from date 2815. However, because adjustment date 2845 is a holiday, and is specified as an adjustment date, the assignment corresponding to reference due date 2825 will not be assigned to 2845. Instead, the learning activity corresponding to reference due date 2825 may be mapped to actual due date 2850.

The adjustment date may comprise a holiday on the actual calendar, a weekend day, or any other date specified as such. The adjustment date may be based on at least one of a day of a week, a day of a month or a day of the year. The adjustment date may be specified by a system administrator, a course instructor, a course developer, or any combination thereof.

FIG. 25 depicts an exemplary user interface displaying an actual due date for completing the learning activity, wherein the actual due date is derived from the reference due date. For example, the actual due date may be displayed as the date on which assignment icon 2520 is displayed. Alternatively or additionally, the actual due date may be stored in a calendar file.

In the learning management system, the set of learning activities may be associated with a course, in which the reference calendar defines a reference course completion time period, and in which the user interface displays an actual course completion time period derived from the reference course completion time period. For example, the reference course completion period may be the period on reference calendar 2810 from reference date 2815 to reference due date 2820, and the actual course completion time period may be the period on actual calendar 2830 from reference date 2815 to actual due date 2840.

Further, the course completion time period may be between a reference course start date and a reference course end date, in which the user interface displays at least one of an actual course start date or an actual course end date derived from a respective one of the reference course start date and the reference course end date. For example, the reference course start date may be 2815, the reference course end date may be reference date 2830, the actual course start date may be reference date 2815 on actual calendar 2830, and the actual course completion end date may be date 2855.

Moreover, the course completion time period may be divided into a temporal sequence of reference learning unit completion sub-periods. Each reference learning unit sub-period in the temporal sequence may be associated with a corresponding learning unit in the sequence of learning units. The user interface may display an actual learning unit sub-period derived from a reference learning unit sub-period. For example, the period from reference due date 2825 to reference date 2830 may be reference learning unit sub-period. The period from actual due date 2850 to date 2855 of actual calendar 2830 may be an actual learning unit sub-period derived from the reference learning unit sub-period.

Deriving the actual learning unit sub-period from the reference learning unit sub-period or the actual course completion time period from the reference course completion time period may be performed in various ways, including any of the techniques discussed herein, such as those discussed in reference to deriving an actual due date from a reference due date.

Figure 29:
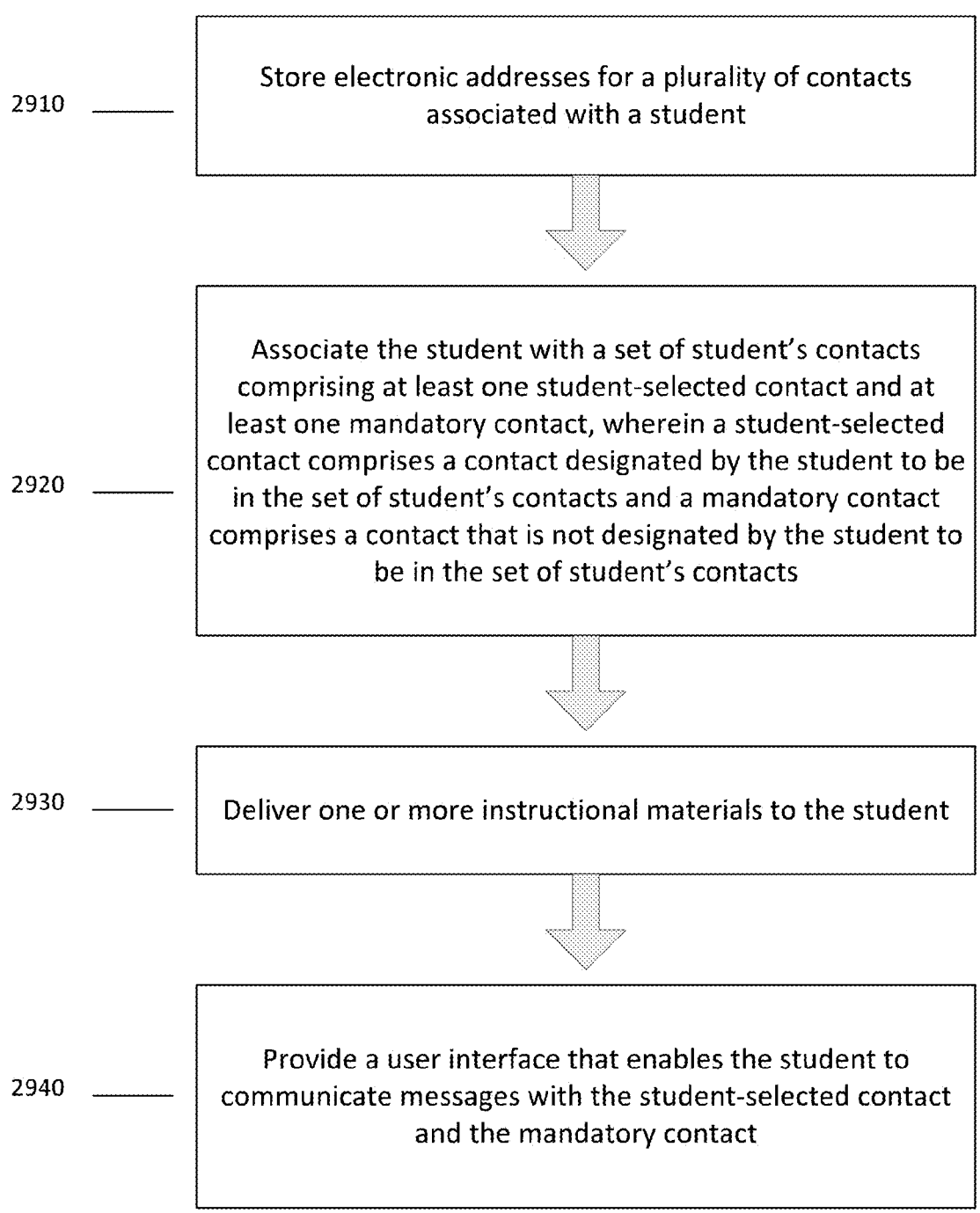
FIGS. 29-33 depict an exemplary logic flows for managing learning in accordance with one or more embodiments.

FIG. 29 depicts an exemplary logic flow for a method of managing learning in accordance with one or more embodiments. In block 2910, electronic addresses for a plurality of contacts associated with a student may be stored. In block 2920, the student may be associated with a set of student's contacts comprising at least one student-selected contact and at least one mandatory contact, wherein a student-selected contact comprises a contact designated by the student to be in the set of student's contacts and a mandatory contact comprises a contact that is not designated by the student to be in the set of student's contacts. In block 2930, one or more instructional materials may be delivered to the student. In block 2940, a user interface that enables the student to communicate messages with the student-selected contact and the mandatory contact may be provided.

Figure 30A:
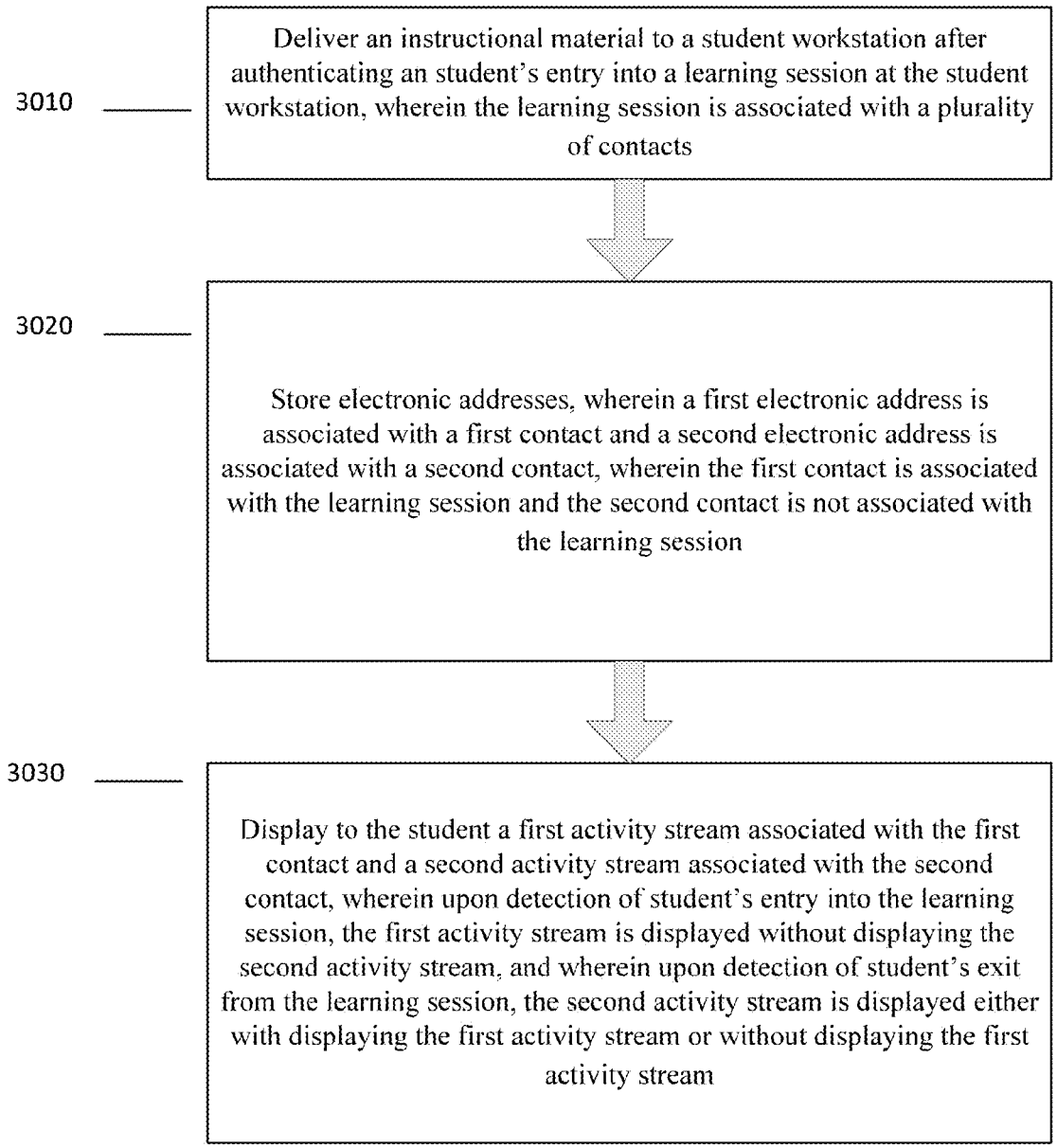

FIG. 30A depicts an exemplary logic flow for a method of managing learning in accordance with one or more embodiments. In block 3010, an instructional material may be delivered to a student workstation after authenticating an student's entry into a learning session at the student workstation, in which the learning session may be associated with a plurality of contacts. In block 3020, electronic addresses may be stored. A first electronic address may be associated with a first contact, and a second electronic address may be associated with a second contact. The first contact may be associated with the learning session and the second contact may not be associated with the learning session. In block 3030, a first activity stream associated with the first contact and a second activity stream associated with the second contact may be displayed to the student. Upon detection of student's entry into the learning session, the first activity stream may be displayed without displaying the second activity stream. Upon detection of student's exit from the learning session, the second activity stream may be displayed either with displaying the first activity stream or without displaying the first activity stream.

Figure 30B:
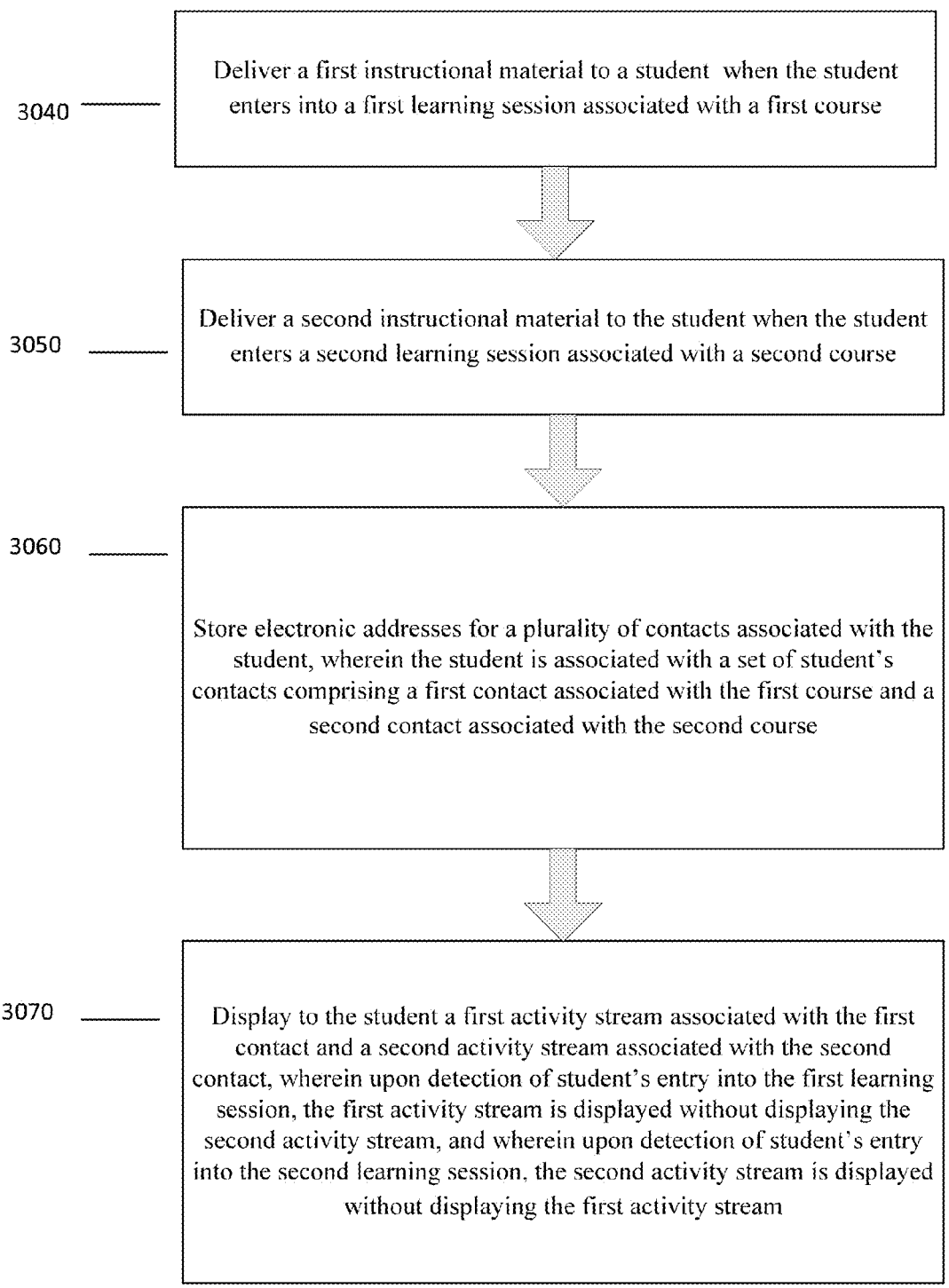

FIG. 30B depicts an exemplary logic flow for a method of managing learning in accordance with one or more embodiments. In block 3040, a first instructional material may be delivered to a student when the student enters into a first learning session associated with a first course. In block 3050, a second instructional material may be delivered to the student when the student enters a second learning session associated with a second course. In block 3060, electronic addresses for a plurality of contacts associated with the student may be stored. The student may be associated with a set of student's contacts comprising a first contact associated with the first course and a second contact associated with the second course. In block 3070, a first activity stream associated with the first contact and a second activity stream associated with the second contact may be displayed to the student. Upon detection of student's entry into the first learning session, the first activity stream may be displayed without displaying the second activity stream. Upon detection of student's entry into the second learning session, the second activity stream may be displayed without displaying the first activity stream.

Figure 31:
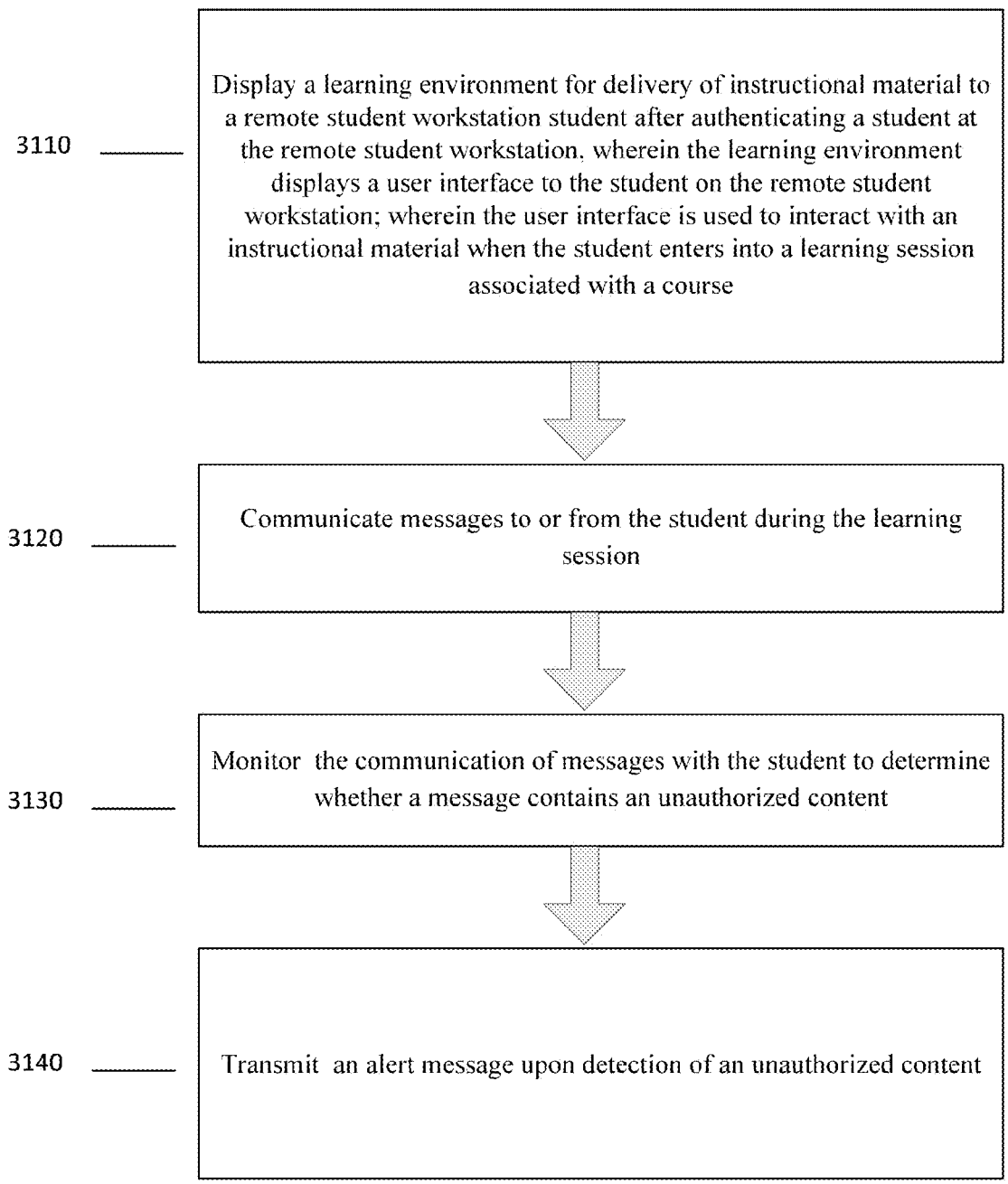

FIG. 31 depicts an exemplary logic flow for a method of managing learning in accordance with one or more embodiments. In block 3110, a learning environment for delivery of instructional material may be displayed to a remote student workstation student after authenticating a student at the remote student workstation. The learning environment may display a user interface to the student on the remote student workstation, in which the user interface may be used to interact with an instructional material when the student enters into a learning session associated with a course. In block 3120, messages may be communicated to or from the student during the learning session. In block 3130, the communication of messages with the student may be monitored to determine whether a message contains an unauthorized content. In block 3140, an alert message may be transmitted upon detection of an unauthorized content.

Figure 32:
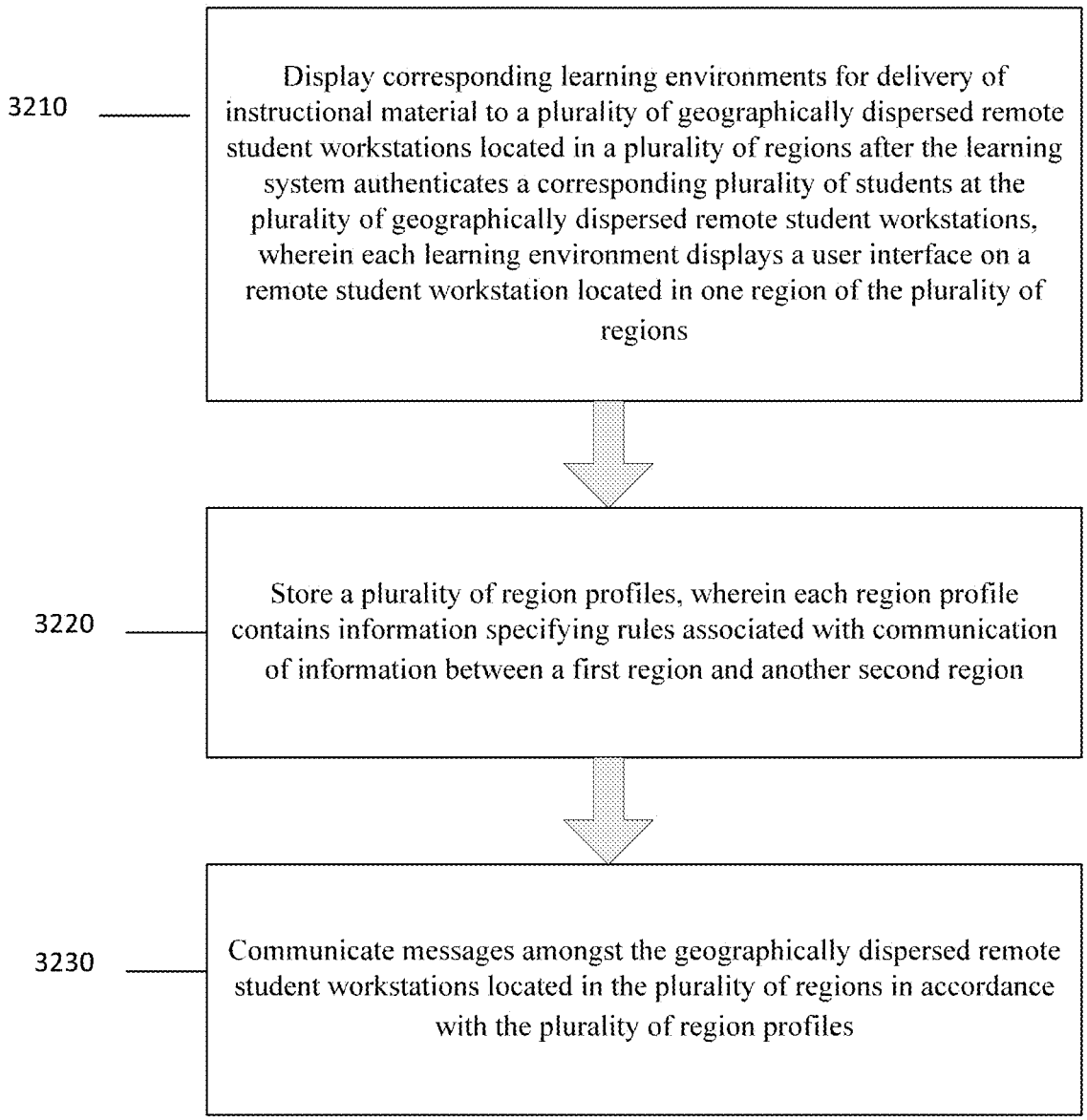

FIG. 32 depicts an exemplary logic flow for a method of managing learning in accordance with one or more embodiments. In block 3210, corresponding learning environments for delivery of instructional material may be displayed to a plurality of geographically dispersed remote student workstations located in a plurality of regions after the learning system authenticates a corresponding plurality of students at the plurality of geographically dispersed remote student workstations. Each learning environment may display a user interface on a remote student workstation located in one region of the plurality of regions. In block 3220, a plurality of region profiles may be stored, in which each region profile contains information specifying rules associated with communication of information between a first region and another second region. In block 3230, messages may be communicated amongst the geographically dispersed remote student workstations located in the plurality of regions in accordance with the plurality of region profiles.

Figure 33:
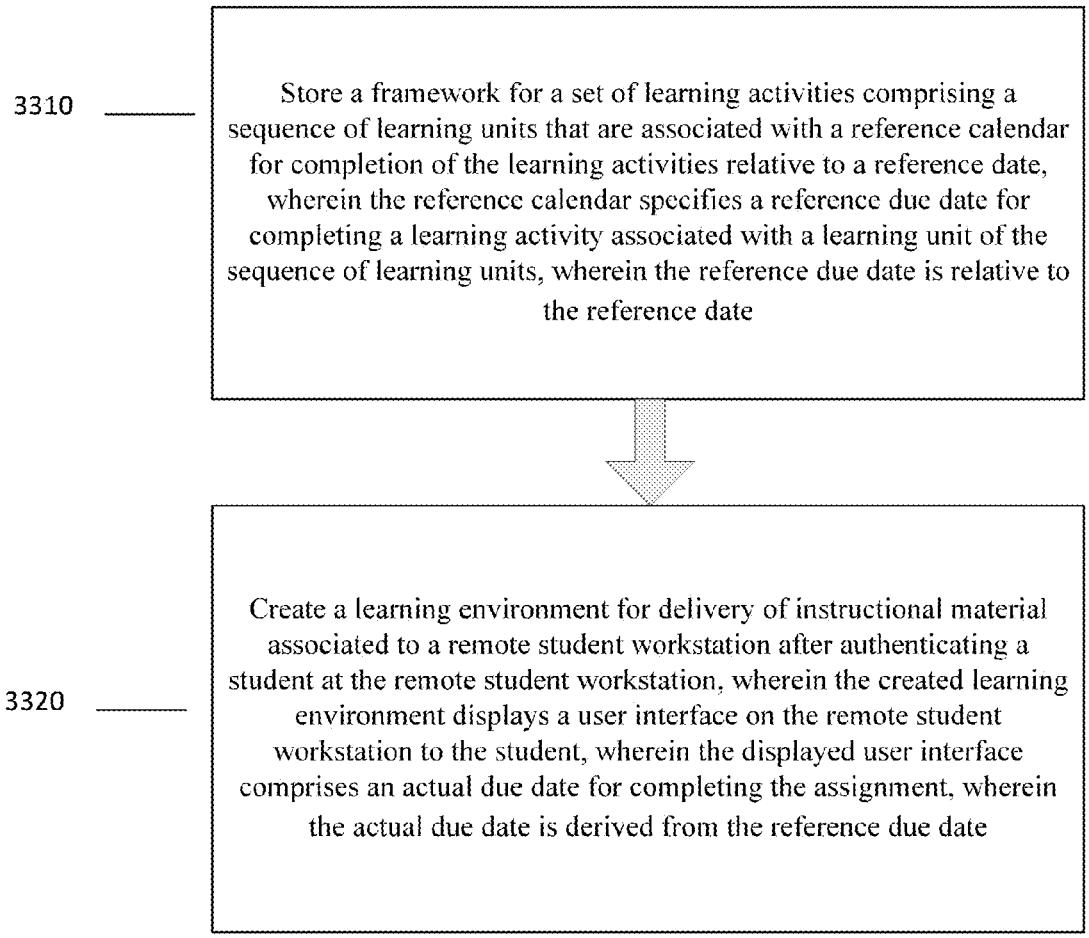

FIG. 33 depicts an exemplary logic flow for a method of managing learning in accordance with one or more embodiments. In block 3310, a framework for a set of learning activities may be stored comprising a sequence of learning units that are associated with a reference calendar for completion of the learning activities relative to a reference date. The reference calendar may specify a reference due date for completing a learning activity associated with a learning unit of the sequence of learning units. The reference due date may be relative to the reference date. In block 3320, a learning environment may be created for delivery of instructional material associated to a remote student workstation after authenticating a student at the remote student workstation. The created learning environment may display a user interface on the remote student workstation to the student. The displayed user interface may comprise an actual due date for completing the assignment, in which the actual due date is derived from the reference due date.

Attached to this specification is an Appendix that contains the functional specification of some aspects of the present invention specifying certain requirements for implementation of the present invention over a computer network, including depictions of various relevant user interfaces.

CONCLUSION

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

Various embodiments may comprise one or more elements. An element may comprise any structure arranged to perform certain operations. Each element may be implemented as hardware, software, or any combination thereof, as desired for a given set of design and/or performance constraints. Although an embodiment may be described with a limited number of elements in a certain topology by way of example, the embodiment may include more or less elements in alternate topologies as desired for a given implementation.

It is worthy to note that any reference to "one embodiment" or "an embodiment" means that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of storage media include hard drives, disk drives, solid state drives, and any other tangible storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a processor, or any combination thereof.

While certain features of the embodiments have been illustrated as described above, many modifications, substitutions, changes and equivalents will now occur to those skilled in the art. Thus, the breadth and scope of the present invention should not be limited by any of the above-described exemplary embodiments, but should instead be defined only in accordance with the claims and their equivalents.

What is claimed is:

1. A learning management system comprising:
   a learning system comprising at least one processor and being configured to deliver an instructional material to a student workstation after authenticating a student's entry into a learning session at the student workstation, wherein the learning session is associated with a plurality of contacts;
   a database that stores electronic addresses, wherein a first electronic address is associated with a first contact and a second electronic address is associated with a second contact, wherein the first contact is directly linked to the learning session and the second contact is not directly linked to the learning session; and a networking service comprising at least one processor and being in communication with the learning system, the networking service being configured to serve to the student workstation within a single learning environment a student page user interface concurrently displaying the instructional material, a first activity stream and a second activity stream, wherein each of the first and second activity streams comprises a live concurrent display of content of the respective first and second contacts, wherein upon authenticating the student's entry into the learning session, the first activity stream is displayed without displaying the second activity stream, and wherein the second activity stream is displayed only when the student is not in the learning session, wherein upon detection of student's exit from the learning session, the second activity stream is displayed, wherein the first contact is a mandatory contact that is not designated by the student to be in the set of contacts associated with the student and the second contact is a student-selected contact that is designated by the student to be in a set of contacts associated with the student, wherein the instructional material is associated with a course of study, wherein the mandatory contact is associated with a course contact, and wherein the networking service is configured to provide a user interface that enables a student profile to communicate messages with the student-selected contact and the mandatory contact, wherein the user interface enables the student to selectively communicate messages with the student-selected contact and mandatory contact during the learning session, and wherein the first and second activity streams comprise activity stream updates from contacts in a plurality of classes, wherein when it is detected that a student is currently working on a lesson for one of the plurality of classes, the activity stream updates from the other of the plurality of classes is removed.

2. The learning management system of claim 1, wherein the first activity stream comprises a first message from the first contact and the second activity stream comprises a second message from the second contact.

3. The learning management system of claim 1, wherein at least one of the first activity stream or second activity streams comprises a message transmitted from the student.

4. The learning management system of claim 1, wherein at least one the first activity stream comprises a first status update from the first contact or the second activity stream comprises a second status update from the second contact.

5. The learning management system of claim 1, wherein the instructional material is concurrently displayed with the first activity stream.

6. The learning management system of claim 1, wherein the first contact is associated with at least one of another course student, a course instructor, a course performance assessor, a course developer, or a course administrator.

7. The learning management system of claim 1, wherein at least one of the first or second activity streams comprises a live stream.

8. The learning management system of claim 1, wherein a message corresponding to the second activity stream is transmitted to the student upon detection of student's exit from the learning session.

9. The learning management system of claim 1, wherein the student-selected contact is a member of a contact group that is subject to a group approval.

10. The learning management system of claim 1, wherein the course contact is associated with one of: another student taking the course, a course instructor assigned to the course, or a course developer assigned to the course.

11. A learning management system comprising:

a learning management module comprising at least one processor, the learning management module being configured to deliver a first instructional material to a student when the student enters into a first learning session associated with a first course and a second instructional material to the student when the student enters a second learning session associated with a second course;

a database that stores electronic addresses for a plurality of contacts associated with the student, wherein the student is associated with a set of student's contacts comprising a first contact directly linked to the first course and a second contact not directly linked to the second course; and a networking service comprising at least one processor and being in communication with the learning management module, the networking service being configured to serve to a student workstation within a single learning environment a student page user interface concurrently displaying the instructional content, a first activity stream and a second activity stream, wherein each of the first and second activity streams comprises a live concurrent display of content of the respective first and second contacts, wherein upon authenticating the student's entry into the first learning session, the first activity stream is displayed without displaying the second activity stream, and wherein upon detection of student's entry into the second learning session, the second activity stream is displayed without displaying the first activity stream, wherein upon detection of student's exit from the learning session, the second activity stream is displayed, wherein the first contact is a mandatory contact that is not designated by the student to be in the set of contacts associated with the student and the second contact is a student-selected contact that is designated by the student to be in a set of contacts associated with the student, wherein the instructional material is associated with a course of study, wherein the mandatory contact is associated with a course contact, wherein the networking service is configured to provide a user interface that enables a student profile to communicate messages with the student-selected contact and the mandatory contact, wherein the user interface enables the student to selectively communicate messages with the student-selected contact and mandatory contact during the learning session, and wherein the first and second activity streams comprise activity stream updates from contacts in a plurality of classes, wherein when it is detected that a student is currently working on a lesson for one of the plurality of classes, the activity stream updates from the other of the plurality of classes is removed.

12. The learning management system of claim 11, wherein at least one of the first activity stream comprises a first message transmitted from the first contact or the second activity streams comprises a second message transmitted from the second contact.

13. The learning management system of claim 12, wherein at least one of the first message is transmitted from the first contact to the student or the second message is transmitted from the second contact to the student.

14. The learning management system of claim 11, wherein a message corresponding to the second activity stream is transmitted to the student upon detection of student's exit from the learning session.

15. The learning management system of claim 11, wherein at least one of the first activity stream or second activity streams comprises a message transmitted from the student.

16. The learning management system of claim 11, wherein at least one of the first activity stream comprises a first status update from the first contact or the second activity stream comprises a second status update from the second contact.

17. The learning management system of claim 11, wherein at least one of the first instructional material is concurrently displayed with the first activity stream or the second instructional material is concurrently displayed with the second activity stream.

18. The learning management system of claim 11, wherein the first contact is associated with another first course student, a first course instructor, a first course performance assessor, a first course developer, or a first course administrator.

19. The learning management system of claim 11, wherein the second contact is associated with another second course student, a second course instructor, a second course performance assessor, a second course developer, or a second course administrator.

20. The learning management system of claim 11, wherein the student-selected contact is a member of a contact group that is subject to a group approval.

21. The learning management system of claim 11, wherein the course contact is associated with one of: another student taking the course, a course instructor assigned to the course, or a course developer assigned to the course.

22. A computer-implemented method of managing learning comprising:
  delivering an instructional material to a student workstation, via a learning system comprising at least one processor, after authenticating an student's entry into a learning session at the student workstation, wherein the learning session is associated with a plurality of contacts;
  storing electronic addresses in a database, wherein a first electronic address is associated with a first contact and a second electronic address is associated with a second contact, wherein the first contact is directly linked to the learning session and the second contact is not directly linked to the learning session; and
  displaying to the student within a single learning environment, via a networking service comprising at least one processor, a student page user interface concurrently displaying the instructional material, a first activity stream and a second activity stream, wherein each of the first and second activity streams comprises a live concurrent display of content of the respective first and second contacts,
  wherein upon authenticating the student's entry into the learning session, the first activity stream is displayed without displaying the second activity stream, and
  wherein upon detection of student's exit from the learning session, the second activity stream is displayed either with displaying the first activity stream or without displaying the first activity stream, wherein upon detection of the student's exit from the learning session, the second activity stream is displayed,
  wherein the first contact is a mandatory contact that is not designated by the student to be in the set of contacts associated with the student and the second contact is a student-selected contact that is designated by the student to be in a set of contacts associated with the student, wherein the instructional material is associated with a course of study, wherein the mandatory contact is associated with a course contact,
  wherein the networking service is configured to provide a user interface that enables a student profile to communicate messages with the student-selected contact and the mandatory contact, wherein the user interface enables the student to selectively communicate messages with the student-selected contact and mandatory contact during the learning session, and
  wherein the first and second activity streams comprise activity stream updates from contacts in a plurality of classes, wherein when it is detected that a student is currently working on a lesson for one of the plurality of classes, the activity stream updates from the other of the plurality of classes is removed.

23. A method for displaying activity streams based on contacts, the method comprising:
  detecting when a student enters into a first learning session associated with a first course;
  delivering a first instructional material, via a learning system comprising at least one processor, to the student when the student enters into the first learning session associated with the first course;
  detecting when the student enters a second learning session associated with a second course;
  delivering a second instructional material, via the learning system, to the student when the student enters the second learning session associated with the second course;
  storing electronic addresses, in a database, for a plurality of contacts associated with the student, wherein the student is associated with a set of student's contacts comprising a first contact directly linked to the first course and a second contact directly linked to the second course;
  displaying to the student within a single learning environment, via a networking service comprising at least one processor, a student page user interface concurrently displaying the instructional material, a first activity stream and a second activity stream, wherein each of the first and second activity streams comprises a live concurrent display of content of the respective first and second contacts;
  upon authenticating the student's entry into the first learning session, displaying the first activity stream without displaying the second activity stream;
  upon detection of student's entry into the second learning session, displaying the second activity stream without displaying the first activity stream upon detection of the student's exit from the first learning session, displaying the second activity stream;
  providing, using the networking service, a user interface that enables a student profile to communicate messages with the second contact and the first contact; and
  enabling, using the user interface, the student to selectively communicate messages with the second contact and first contact during the learning session, wherein the first contact is a mandatory contact that is not designated by the student to be in the set of contacts associated with the student and the second contact is a student-selected contact that is designated by the student to be in a set of contacts associated with the student, wherein the instructional material is associated with a course of study, wherein the mandatory contact is associated with a course contact, and wherein the first and second activity streams comprise activity stream updates from contacts in a plurality of classes, wherein when it is detected that a student is currently working on a lesson for one of the plurality of classes, the activity stream updates from the other of the plurality of classes is removed.

* * * * *